United States Patent
Gong et al.

(10) Patent No.: US 11,054,616 B2
(45) Date of Patent: Jul. 6, 2021

(54) OPTICAL IMAGING LENS

(71) Applicant: GENIUS ELECTRONIC OPTICAL (XIAMEN) CO., LTD., Fujian (CN)

(72) Inventors: Jinhui Gong, Fujian (CN); Meiting He, Fujian (CN); Hai Lin, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 21 days.

(21) Appl. No.: 16/432,938

(22) Filed: Jun. 6, 2019

(65) Prior Publication Data

US 2019/0285862 A1 Sep. 19, 2019

Related U.S. Application Data

(63) Continuation of application No. 15/441,259, filed on Feb. 27, 2017, now Pat. No. 10,365,457.

(30) Foreign Application Priority Data

Dec. 30, 2016 (CN) .......................... 201611253471.9

(51) Int. Cl.
*G02B 13/18* (2006.01)
*G02B 9/64* (2006.01)
*G02B 13/00* (2006.01)

(52) U.S. Cl.
CPC ......... *G02B 13/0045* (2013.01); *G02B 13/18* (2013.01)

(58) Field of Classification Search
CPC ........ G02B 13/0045; G02B 9/64; G02B 3/02; G02B 13/04
USPC ........................................ 359/708, 751, 755
See application file for complete search history.

(56) References Cited

U.S. PATENT DOCUMENTS

| 2014/0253782 A1* | 9/2014 | Tsai | .................... G02B 27/0025 |
|---|---|---|---|
| | | | 348/335 |
| 2016/0241756 A1* | 8/2016 | Chen | .................... G02B 13/002 |
| 2016/0282589 A1 | 9/2016 | Chen | |

FOREIGN PATENT DOCUMENTS

| CN | 104950424 | 9/2015 |
|---|---|---|
| CN | 204832662 | 12/2015 |
| CN | 105319681 | 2/2016 |
| CN | 105829942 | 8/2016 |

(Continued)

*Primary Examiner* — William Choi
(74) *Attorney, Agent, or Firm* — JCIPRNET

(57) ABSTRACT

An optical imaging lens includes a first lens element, a second lens element, a third lens element, a fourth lens element, a fifth lens element, a sixth lens element and a seventh lens element arranged in order from an object side to an image side along an optical axis. Each lens element has an object-side surface and an image-side surface. The object-side surface of the second lens element has a convex portion in a vicinity of the optical axis; the third lens element has negative refracting power, and the object-side surface of the third lens element has a convex portion in a vicinity of the optical axis; the image-side surface of the fourth lens element has a convex portion in a vicinity of the optical axis; the fifth lens element has negative refracting power; the seventh lens element has negative refracting power, and the object-side surface of the seventh lens element has a convex portion in a vicinity of the optical axis; and wherein an Abbe number of the first lens element is greater than a sum of an Abbe number of the second lens element and an Abbe number of the fifth lens element.

20 Claims, 39 Drawing Sheets

(56) References Cited

FOREIGN PATENT DOCUMENTS

| CN | 105866921 | 8/2016 |
|---|---|---|
| CN | 106154513 | 11/2016 |

\* cited by examiner

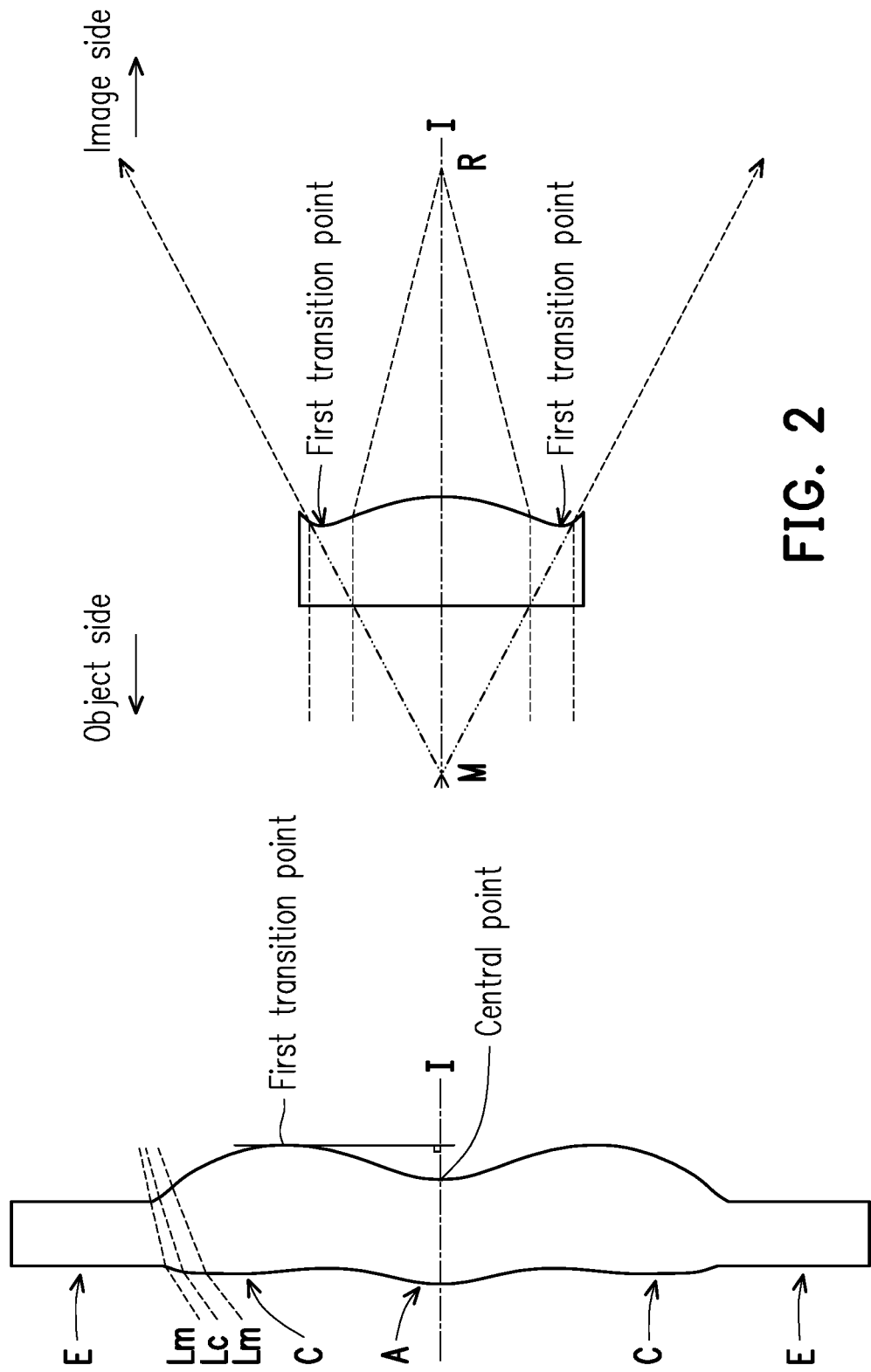

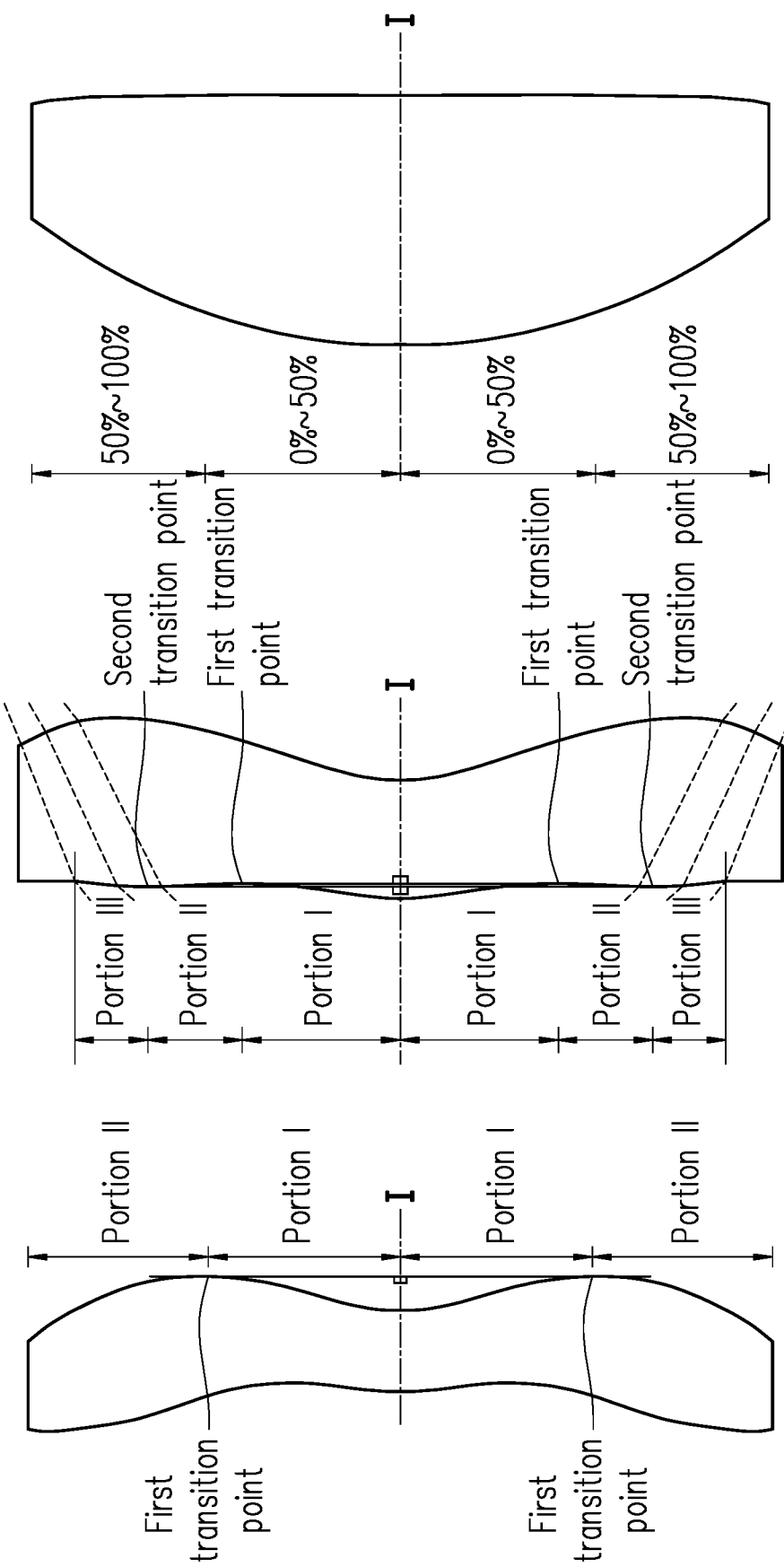

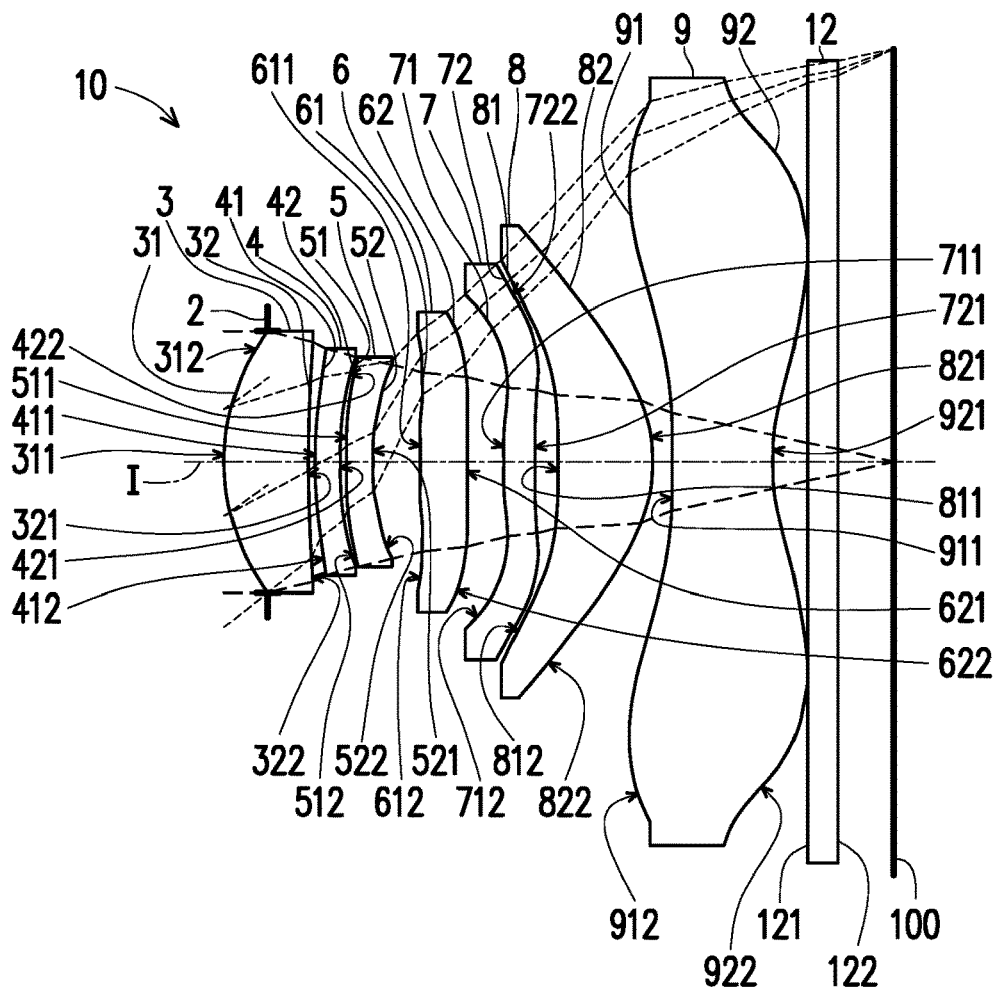
FIG. 6
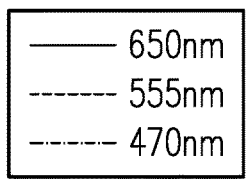
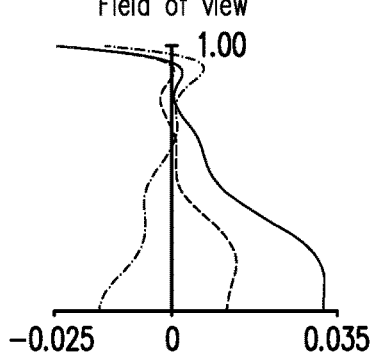
FIG. 7A
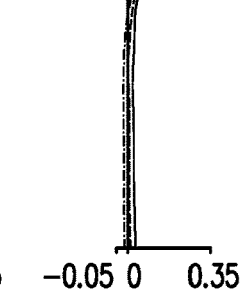
FIG. 7B
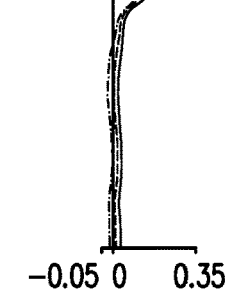
FIG. 7C
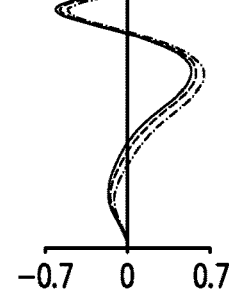
FIG. 7D

| First embodiment |||||||
|---|---|---|---|---|---|---|
| Effective focal length=4.319 mm, Half field of view (HFOV)=37.645°, Fno=2.001, System length=5.405 mm, Image Height=3.33 mm |||||||
| Lens element | Surface | Radius of curvature(mm) | Thickness(mm) | Refractive index | Abbe number | Focal length(mm) |
| Object | | Infinity | Infinity | | | |
| Aperture stop 2 | | Infinity | -0.342 | | | |
| First lens element 3 | Object-side surface 31 | 1.810 | 0.681 | 1.545 | 55.987 | 4.545 |
| | Image-side surface 32 | 5.794 | 0.042 | | | |
| Second lens element 4 | Object-side surface 41 | 2.834 | 0.211 | 1.661 | 20.412 | 15.493 |
| | Image-side surface 42 | 3.788 | 0.045 | | | |
| Third lens element 5 | Object-side surface 51 | 3.802 | 0.215 | 1.661 | 20.412 | -6.222 |
| | Image-side surface 52 | 1.940 | 0.385 | | | |
| Fourth lens element 6 | Object-side surface 61 | 10.711 | 0.388 | 1.535 | 55.690 | 16.074 |
| | Image-side surface 62 | -43.725 | 0.324 | | | |
| Fifth lens element 7 | Object-side surface 71 | 22.371 | 0.242 | 1.661 | 20.412 | -54.480 |
| | Image-side surface 72 | 13.788 | 0.165 | | | |
| Sixth lens element 8 | Object-side surface 81 | -4.215 | 0.761 | 1.545 | 55.987 | 2.746 |
| | Image-side surface 82 | -1.177 | 0.160 | | | |
| Seventh lens element 9 | Object-side surface 91 | -8.877 | 0.803 | 1.535 | 55.690 | -2.264 |
| | Image-side surface 92 | 1.452 | 0.279 | | | |
| Filter 12 | Object-side surface 121 | Infinity | 0.250 | 1.517 | 64.167 | |
| | Image-side surface 122 | Infinity | 0.454 | | | |
| | Image plane 100 | Infinity | | | | |

FIG. 8

| Surface | K | $a_4$ | $a_6$ | $a_8$ | $a_{10}$ |
|---|---|---|---|---|---|
| 31 | 1.207829E-01 | -7.101200E-03 | 3.702721E-02 | -1.160907E-01 | 2.056102E-01 |
| 32 | 3.011203E+00 | -2.464021E-01 | 5.336416E-01 | -8.026162E-01 | 8.626863E-01 |
| 41 | 9.240802E-01 | -2.004323E-01 | 3.671185E-01 | -5.625077E-01 | 6.323705E-01 |
| 42 | 9.375285E+00 | 9.801218E-02 | -2.771625E-01 | 6.284838E-01 | -1.153658E+00 |
| 51 | 6.595783E+00 | 1.583979E-02 | -1.587804E-01 | 5.677520E-01 | -1.246306E+00 |
| 52 | 2.632636E-01 | -1.014467E-01 | 9.130582E-02 | -1.459687E-02 | -1.334415E-01 |
| 61 | -1.668801E+02 | -3.038089E-02 | -1.730057E-03 | -4.299181E-02 | 6.300607E-02 |
| 62 | 1.002432E+02 | -3.417068E-02 | -7.980041E-02 | 1.564954E-01 | -2.106565E-01 |
| 71 | -1.727406E+03 | -3.244164E-02 | -2.179505E-01 | 3.402602E-01 | -3.139998E-01 |
| 72 | -2.303075E+01 | -7.676305E-04 | -2.298012E-01 | 2.988672E-01 | -2.288158E-01 |
| 81 | 3.707865E+00 | 5.059332E-02 | -1.591130E-01 | 1.399392E-01 | -7.505622E-02 |
| 82 | -2.561310E+00 | -1.950120E-02 | -2.704718E-02 | 1.638606E-02 | 1.537841E-03 |
| 91 | -6.228201E+01 | -9.462030E-02 | 5.658885E-02 | -1.770040E-02 | 3.383725E-03 |
| 92 | -7.282679E+00 | -5.993546E-02 | 2.786474E-02 | -9.577843E-03 | 2.075004E-03 |
| Surface | $a_{12}$ | $a_{14}$ | $a_{16}$ | $a_{18}$ | $a_{20}$ |
| 31 | -1.981831E-01 | 9.909169E-02 | -1.989830E-02 | 0.000000E+00 | 0.000000E+00 |
| 32 | -6.157547E-01 | 2.592230E-01 | -5.060852E-02 | 0.000000E+00 | 0.000000E+00 |
| 41 | -4.760666E-01 | 2.021498E-01 | -4.103462E-02 | 0.000000E+00 | 0.000000E+00 |
| 42 | 1.244247E+00 | -6.585723E-01 | 1.235588E-01 | 0.000000E+00 | 0.000000E+00 |
| 51 | 1.450982E+00 | -7.853232E-01 | 1.556992E-01 | 0.000000E+00 | 0.000000E+00 |
| 52 | 2.130115E-01 | -1.228477E-01 | 2.954122E-02 | 0.000000E+00 | 0.000000E+00 |
| 61 | -6.381263E-02 | 3.343931E-02 | -7.406023E-03 | 0.000000E+00 | 0.000000E+00 |
| 62 | 1.555811E-01 | -6.265273E-02 | 1.144170E-02 | 0.000000E+00 | 0.000000E+00 |
| 71 | 1.614893E-01 | -4.236477E-02 | 4.430767E-03 | 0.000000E+00 | 0.000000E+00 |
| 72 | 1.018879E-01 | -2.332262E-02 | 2.102943E-03 | 0.000000E+00 | 0.000000E+00 |
| 81 | 2.692820E-02 | -5.031789E-03 | 3.131395E-04 | 0.000000E+00 | 0.000000E+00 |
| 82 | -2.404119E-03 | 5.769197E-04 | -5.169343E-05 | 0.000000E+00 | 0.000000E+00 |
| 91 | -3.846686E-04 | 2.379274E-05 | -6.160554E-07 | 0.000000E+00 | 0.000000E+00 |
| 92 | -2.779582E-04 | 2.032560E-05 | -6.036218E-07 | 0.000000E+00 | 0.000000E+00 |

FIG. 9

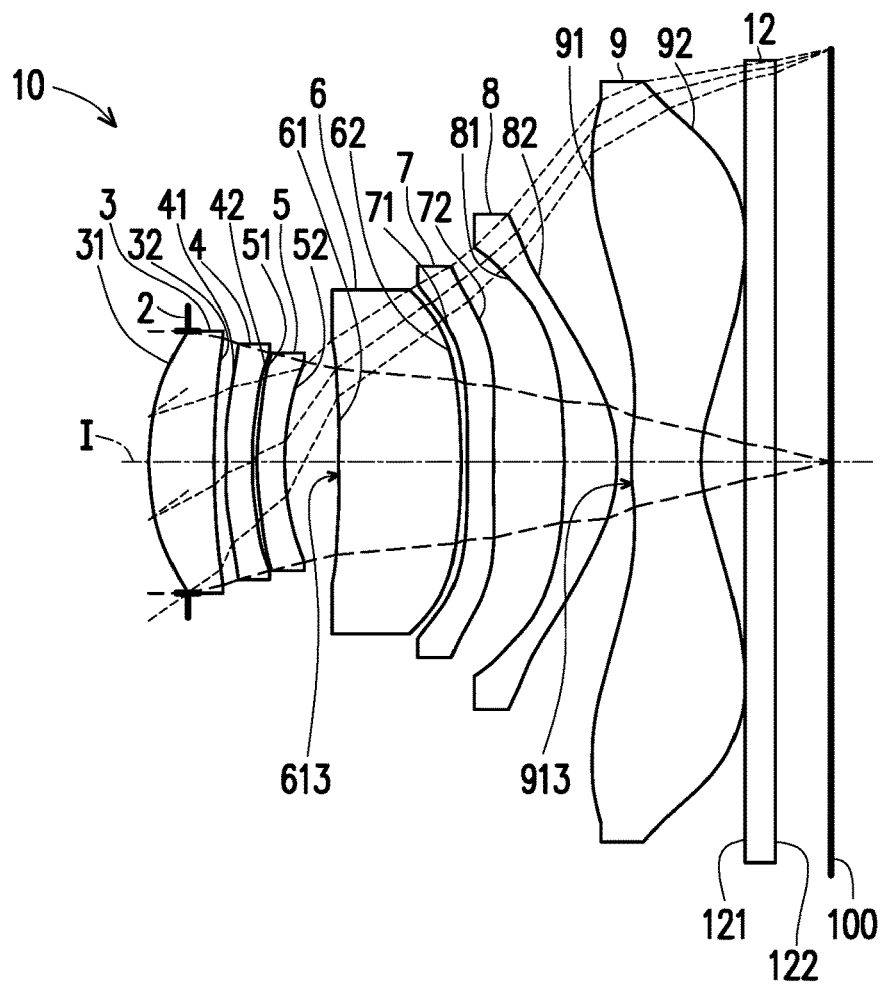
FIG. 10
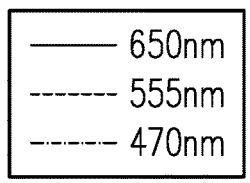
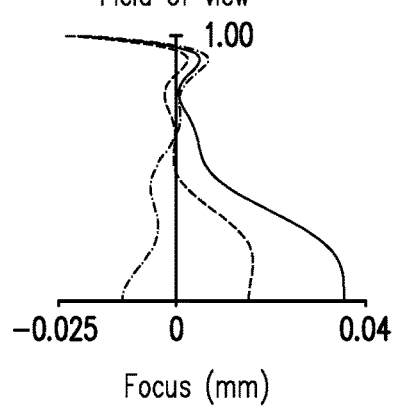
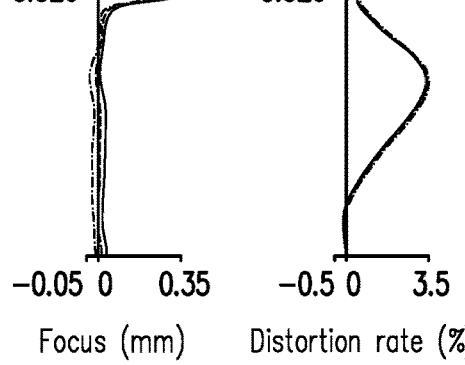
FIG. 11A    FIG. 11B    FIG. 11C    FIG. 11D

| Second embodiment |||||||
|---|---|---|---|---|---|---|
| | Effective focal length=4.329 mm, Half field of view (HFOV)=37.497°, Fno=2.000, System length=5.501 mm, Image Height=3.32 mm |
| Lens element | Surface | Radius of curvature(mm) | Thickness(mm) | Refractive index | Abbe number | Focal length(mm) |
| Object | | Infinity | Infinity | | | |
| Aperture stop 2 | | Infinity | -0.307 | | | |
| First lens element 3 | Object-side surface 31 | 1.965 | 0.569 | 1.545 | 55.987 | 4.688 |
| | Image-side surface 32 | 7.579 | 0.045 | | | |
| Second lens element 4 | Object-side surface 41 | 2.687 | 0.214 | 1.661 | 20.412 | 14.546 |
| | Image-side surface 42 | 3.597 | 0.044 | | | |
| Third lens element 5 | Object-side surface 51 | 3.485 | 0.214 | 1.661 | 20.412 | -6.343 |
| | Image-side surface 52 | 1.864 | 0.430 | | | |
| Fourth lens element 6 | Object-side surface 61 | -199.500 | 0.995 | 1.535 | 55.690 | 10.741 |
| | Image-side surface 62 | -5.612 | 0.047 | | | |
| Fifth lens element 7 | Object-side surface 71 | 303.709 | 0.219 | 1.661 | 20.412 | -33.347 |
| | Image-side surface 72 | 20.724 | 0.569 | | | |
| Sixth lens element 8 | Object-side surface 81 | -4.189 | 0.425 | 1.545 | 55.987 | 2.571 |
| | Image-side surface 82 | -1.090 | 0.152 | | | |
| Seventh lens element 9 | Object-side surface 91 | 293.788 | 0.522 | 1.535 | 55.690 | -2.028 |
| | Image-side surface 92 | 1.084 | 0.350 | | | |
| Filter 12 | Object-side surface 121 | Infinity | 0.250 | 1.517 | 64.167 | |
| | Image-side surface 122 | Infinity | 0.454 | | | |
| | Image plane 100 | Infinity | | | | |

FIG. 12

| Surface | K | $a_4$ | $a_6$ | $a_8$ | $a_{10}$ |
|---|---|---|---|---|---|
| 31 | 1.396171E-01 | -5.996992E-03 | 3.552465E-02 | -1.142994E-01 | 2.038918E-01 |
| 32 | 1.340405E+01 | -2.411926E-01 | 5.231934E-01 | -8.023537E-01 | 8.655043E-01 |
| 41 | 7.719033E-01 | -1.984731E-01 | 3.571384E-01 | -5.664180E-01 | 6.367551E-01 |
| 42 | 8.340877E+00 | 9.761904E-02 | -2.802654E-01 | 6.262257E-01 | -1.155180E+00 |
| 51 | 5.194356E+00 | 6.909429E-03 | -1.542684E-01 | 5.684548E-01 | -1.248639E+00 |
| 52 | -1.146752E-01 | -1.120625E-01 | 8.008163E-02 | -9.639263E-03 | -1.355469E-01 |
| 61 | 0.000000E+00 | -2.599709E-02 | 4.772005E-03 | -5.014153E-02 | 5.916079E-02 |
| 62 | -1.997253E+01 | -2.554766E-02 | -7.750419E-02 | 1.549719E-01 | -2.101460E-01 |
| 71 | 1.860201E+04 | -3.459537E-02 | -2.266244E-01 | 3.463723E-01 | -3.126865E-01 |
| 72 | -2.153712E+03 | -5.947531E-04 | -2.281171E-01 | 2.985628E-01 | -2.287619E-01 |
| 81 | 4.575564E+00 | 7.499949E-02 | -1.575281E-01 | 1.324982E-01 | -7.447486E-02 |
| 82 | -4.312650E+00 | -2.360748E-02 | -2.259084E-02 | 1.479353E-02 | 1.435258E-03 |
| 91 | 5.626044E+03 | -1.106224E-01 | 5.891292E-02 | -1.779999E-02 | 3.379509E-03 |
| 92 | -6.538460E+00 | -6.101830E-02 | 2.780158E-02 | -9.456463E-03 | 2.060624E-03 |
| Surface | $a_{12}$ | $a_{14}$ | $a_{16}$ | $a_{18}$ | $a_{20}$ |
| 31 | -1.981120E-01 | 9.922026E-02 | -1.981826E-02 | 0.000000E+00 | 0.000000E+00 |
| 32 | -6.156651E-01 | 2.607974E-01 | -5.070525E-02 | 0.000000E+00 | 0.000000E+00 |
| 41 | -4.682025E-01 | 2.032566E-01 | -4.308236E-02 | 0.000000E+00 | 0.000000E+00 |
| 42 | 1.244747E+00 | -6.561934E-01 | 1.202057E-01 | 0.000000E+00 | 0.000000E+00 |
| 51 | 1.444632E+00 | -7.885456E-01 | 1.588036E-01 | 0.000000E+00 | 0.000000E+00 |
| 52 | 2.126726E-01 | -1.276501E-01 | 3.098385E-02 | 0.000000E+00 | 0.000000E+00 |
| 61 | -5.398709E-02 | 2.355964E-02 | -6.689061E-03 | 0.000000E+00 | 0.000000E+00 |
| 62 | 1.558020E-01 | -6.187483E-02 | 1.023910E-02 | 0.000000E+00 | 0.000000E+00 |
| 71 | 1.605898E-01 | -4.270526E-02 | 4.723480E-03 | 0.000000E+00 | 0.000000E+00 |
| 72 | 1.019064E-01 | -2.335159E-02 | 2.124657E-03 | 0.000000E+00 | 0.000000E+00 |
| 81 | 2.637958E-02 | -5.085415E-03 | 4.115850E-04 | 0.000000E+00 | 0.000000E+00 |
| 82 | -2.391970E-03 | 5.608041E-04 | -4.416836E-05 | 0.000000E+00 | 0.000000E+00 |
| 91 | -3.852844E-04 | 2.393735E-05 | -6.220775E-07 | 0.000000E+00 | 0.000000E+00 |
| 92 | -2.781917E-04 | 2.031640E-05 | -5.990697E-07 | 0.000000E+00 | 0.000000E+00 |

FIG. 13

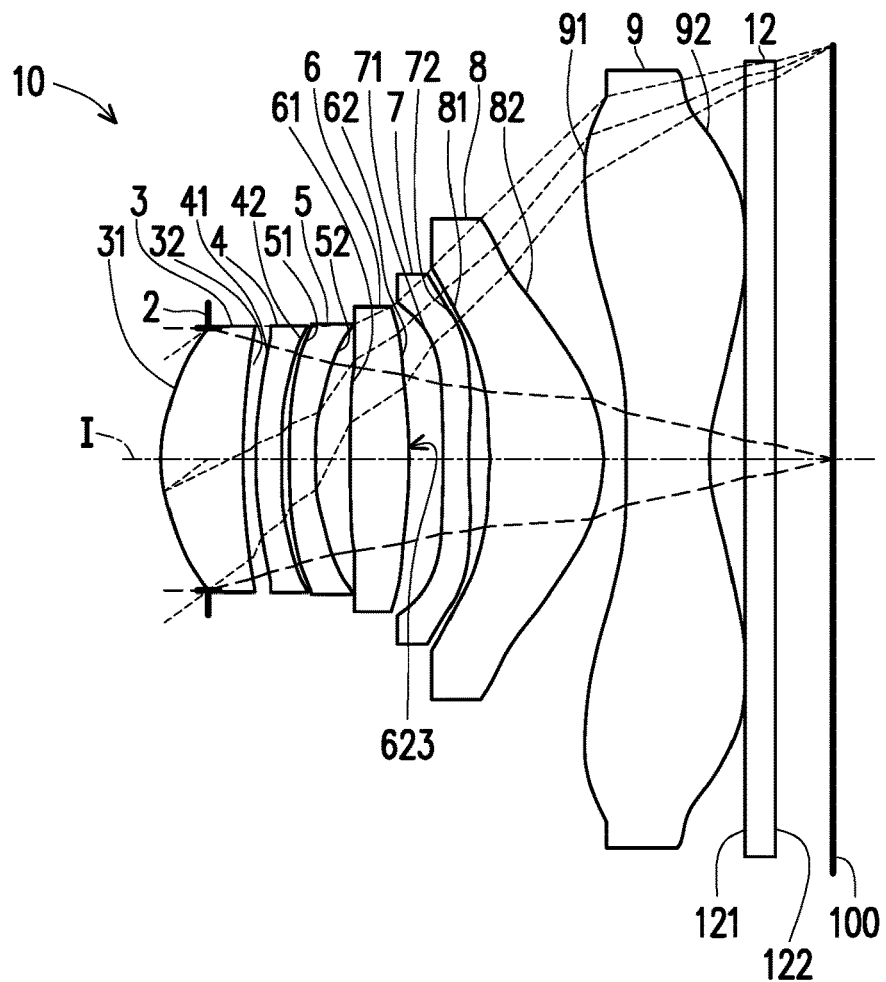
FIG. 14
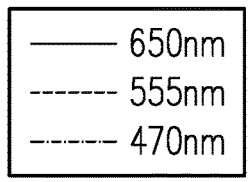
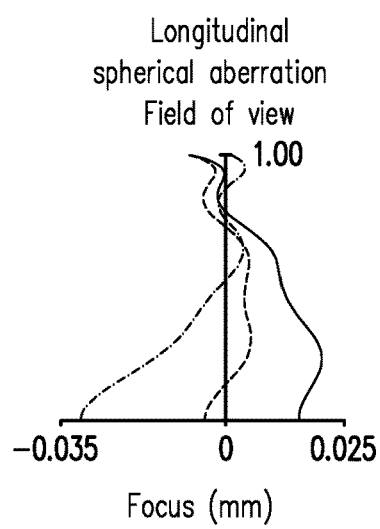
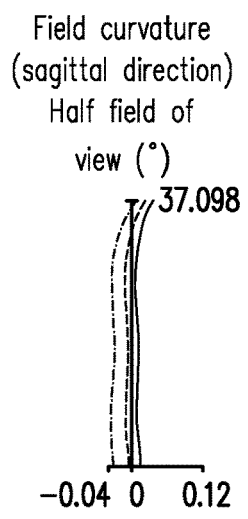
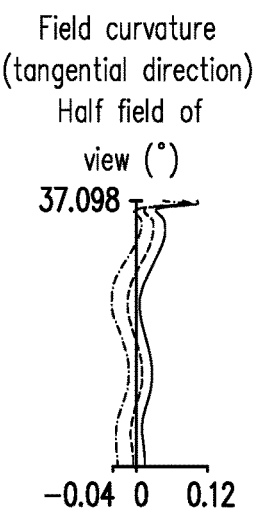
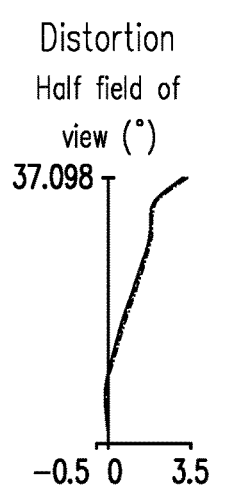
FIG. 15A    FIG. 15B    FIG. 15C    FIG. 15D

| Third embodiment | | | | | | |
|---|---|---|---|---|---|---|
| Effective focal length=4.260 mm, Half field of view (HFOV)=37.098°, Fno=1.994, System length=5.383 mm, Image Height=3.33 mm | | | | | | |
| Lens element | Surface | Radius of curvature(mm) | Thickness(mm) | Refractive index | Abbe number | Focal length(mm) |
| Object | | Infinity | Infinity | | | |
| Aperture stop 2 | | Infinity | -0.354 | | | |
| First lens element 3 | Object-side surface 31 | 1.785 | 0.698 | 1.545 | 55.987 | 4.544 |
| | Image-side surface 32 | 5.472 | 0.039 | | | |
| Second lens element 4 | Object-side surface 41 | 2.773 | 0.201 | 1.661 | 20.412 | 15.666 |
| | Image-side surface 42 | 3.665 | 0.065 | | | |
| Third lens element 5 | Object-side surface 51 | 3.818 | 0.211 | 1.661 | 20.412 | -6.103 |
| | Image-side surface 52 | 1.927 | 0.280 | | | |
| Fourth lens element 6 | Object-side surface 61 | 6.601 | 0.441 | 1.535 | 55.690 | 13.176 |
| | Image-side surface 62 | 97.084 | 0.303 | | | |
| Fifth lens element 7 | Object-side surface 71 | 19.626 | 0.217 | 1.661 | 20.412 | -48.733 |
| | Image-side surface 72 | 12.185 | 0.163 | | | |
| Sixth lens element 8 | Object-side surface 81 | -4.067 | 0.925 | 1.545 | 55.987 | 2.663 |
| | Image-side surface 82 | -1.158 | 0.183 | | | |
| Seventh lens element 9 | Object-side surface 91 | -12.568 | 0.666 | 1.535 | 55.690 | -2.258 |
| | Image-side surface 92 | 1.366 | 0.286 | | | |
| Filter 12 | Object-side surface 121 | Infinity | 0.250 | 1.517 | 64.167 | |
| | Image-side surface 122 | Infinity | 0.454 | | | |
| | Image plane 100 | Infinity | | | | |

FIG. 16

| Surface | K | $a_4$ | $a_6$ | $a_8$ | $a_{10}$ |
|---|---|---|---|---|---|
| 31 | 1.204591E-01 | -7.157884E-03 | 3.742419E-02 | -1.161232E-01 | 2.058117E-01 |
| 32 | 3.965767E+00 | -2.454653E-01 | 5.339880E-01 | -8.017596E-01 | 8.632990E-01 |
| 41 | 9.761928E-01 | -1.996485E-01 | 3.671461E-01 | -5.635315E-01 | 6.320449E-01 |
| 42 | 8.928881E+00 | 9.615049E-02 | -2.790409E-01 | 6.264842E-01 | -1.154809E+00 |
| 51 | 6.522985E+00 | 1.620884E-02 | -1.597442E-01 | 5.667524E-01 | -1.247422E+00 |
| 52 | 2.318010E-01 | -1.024533E-01 | 9.109226E-02 | -1.431546E-02 | -1.334225E-01 |
| 61 | -6.199615E+01 | -1.735433E-02 | 8.138034E-03 | -3.844953E-02 | 6.543950E-02 |
| 62 | 0.000000E+00 | -2.897240E-02 | -7.426056E-02 | 1.606621E-01 | -2.094925E-01 |
| 71 | -1.940291E+03 | -4.274371E-02 | -2.262078E-01 | 3.370955E-01 | -3.143800E-01 |
| 72 | -9.491250E+01 | -9.440492E-03 | -2.345980E-01 | 2.983155E-01 | -2.286935E-01 |
| 81 | 3.864296E+00 | 3.544811E-02 | -1.558796E-01 | 1.413682E-01 | -7.485211E-02 |
| 82 | -2.645158E+00 | -2.276632E-02 | -2.575382E-02 | 1.618176E-02 | 1.445630E-03 |
| 91 | -3.926218E+01 | -9.525249E-02 | 5.660768E-02 | -1.769466E-02 | 3.384211E-03 |
| 92 | -7.104706E+00 | -6.168547E-02 | 2.812742E-02 | -9.562937E-03 | 2.076241E-03 |
| Surface | $a_{12}$ | $a_{14}$ | $a_{16}$ | $a_{18}$ | $a_{20}$ |
| 31 | -1.978074E-01 | 9.932056E-02 | -2.015198E-02 | 0.000000E+00 | 0.000000E+00 |
| 32 | -6.156209E-01 | 2.589617E-01 | -5.032782E-02 | 0.000000E+00 | 0.000000E+00 |
| 41 | -4.752061E-01 | 2.032036E-01 | -4.103782E-02 | 0.000000E+00 | 0.000000E+00 |
| 42 | 1.244639E+00 | -6.582242E-01 | 1.224160E-01 | 0.000000E+00 | 0.000000E+00 |
| 51 | 1.449036E+00 | -7.868822E-01 | 1.555605E-01 | 0.000000E+00 | 0.000000E+00 |
| 52 | 2.137315E-01 | -1.225548E-01 | 2.623756E-02 | 0.000000E+00 | 0.000000E+00 |
| 61 | -6.328868E-02 | 3.229150E-02 | -7.319767E-03 | 0.000000E+00 | 0.000000E+00 |
| 62 | 1.551267E-01 | -6.316072E-02 | 1.144838E-02 | 0.000000E+00 | 0.000000E+00 |
| 71 | 1.618331E-01 | -4.230081E-02 | 3.832307E-03 | 0.000000E+00 | 0.000000E+00 |
| 72 | 1.020193E-01 | -2.324999E-02 | 2.130044E-03 | 0.000000E+00 | 0.000000E+00 |
| 81 | 2.691731E-02 | -5.060129E-03 | 2.998428E-04 | 0.000000E+00 | 0.000000E+00 |
| 82 | -2.408828E-03 | 5.796982E-04 | -5.077647E-05 | 0.000000E+00 | 0.000000E+00 |
| 91 | -3.846398E-04 | 2.379159E-05 | -6.169142E-07 | 0.000000E+00 | 0.000000E+00 |
| 92 | -2.779197E-04 | 2.031788E-05 | -6.055271E-07 | 0.000000E+00 | 0.000000E+00 |

FIG. 17

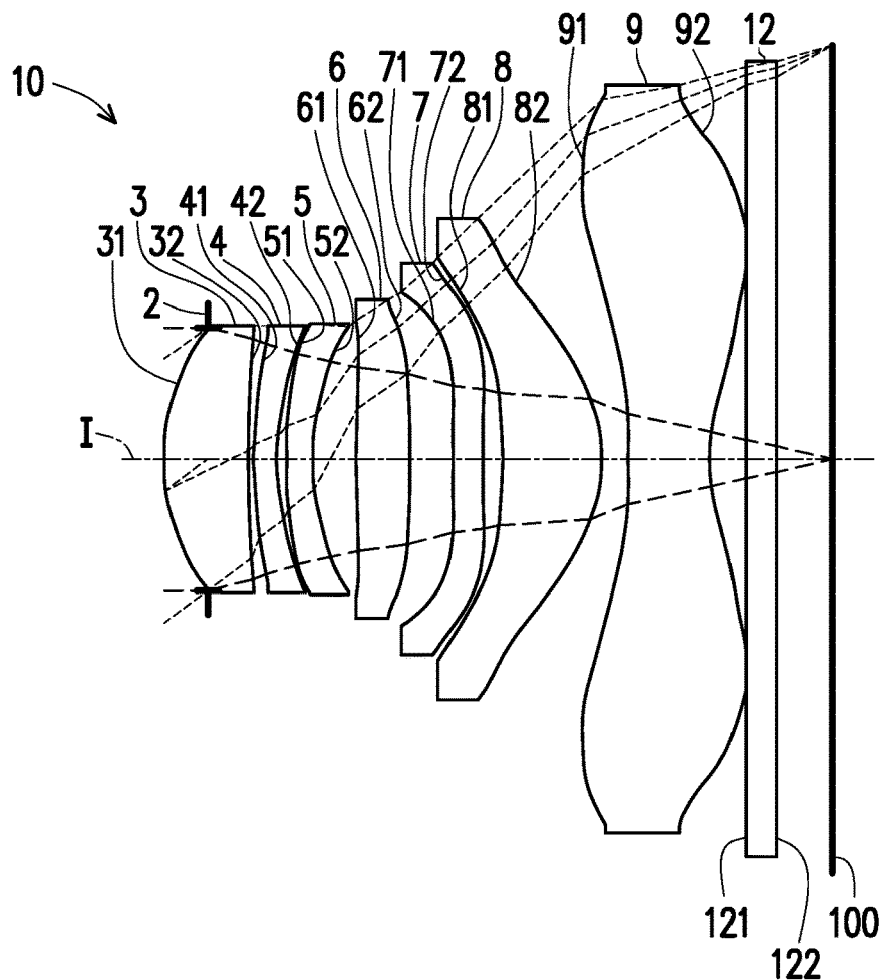
FIG. 18
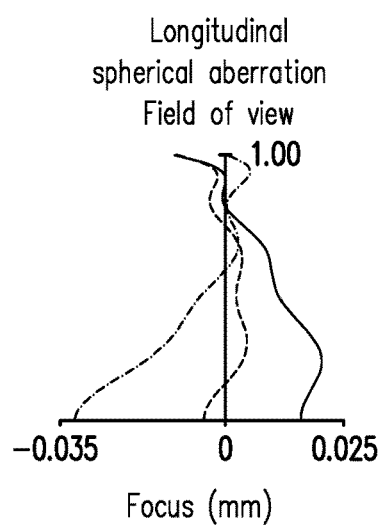
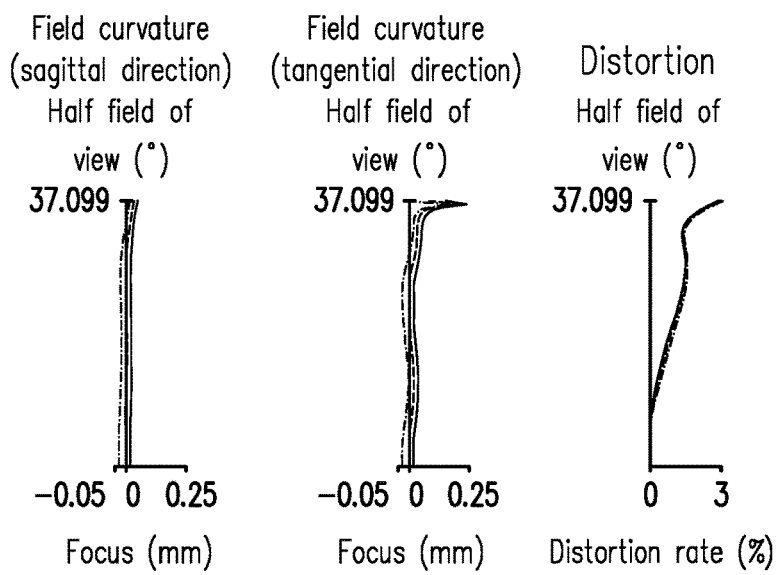
FIG. 19A   FIG. 19B   FIG. 19C   FIG. 19D

| Fourth embodiment | | | | | | |
|---|---|---|---|---|---|---|
| Effective focal length=4.271 mm, Half field of view (HFOV)=37.099°, Fno=2.000, System length=5.363 mm, Image Height=3.33 mm | | | | | | |
| Lens element | Surface | Radius of curvature(mm) | Thickness(mm) | Refractive index | Abbe number | Focal length(mm) |
| Object | | Infinity | Infinity | | | |
| Aperture stop 2 | | Infinity | -0.353 | | | |
| First lens element 3 | Object-side surface 31 | 1.792 | 0.680 | 1.545 | 55.987 | 4.562 |
| | Image-side surface 32 | 5.530 | 0.041 | | | |
| Second lens element 4 | Object-side surface 41 | 2.793 | 0.209 | 1.661 | 20.412 | 15.689 |
| | Image-side surface 42 | 3.696 | 0.052 | | | |
| Third lens element 5 | Object-side surface 51 | 3.765 | 0.215 | 1.661 | 20.412 | -6.230 |
| | Image-side surface 52 | 1.930 | 0.355 | | | |
| Fourth lens element 6 | Object-side surface 61 | 8.784 | 0.418 | 1.535 | 55.690 | 14.502 |
| | Image-side surface 62 | -67.046 | 0.354 | | | |
| Fifth lens element 7 | Object-side surface 71 | 33.896 | 0.246 | 1.661 | 20.412 | -56.930 |
| | Image-side surface 72 | 17.860 | 0.149 | | | |
| Sixth lens element 8 | Object-side surface 81 | -4.344 | 0.806 | 1.545 | 55.987 | 2.678 |
| | Image-side surface 82 | -1.166 | 0.199 | | | |
| Seventh lens element 9 | Object-side surface 91 | -9.460 | 0.658 | 1.535 | 55.690 | -2.227 |
| | Image-side surface 92 | 1.401 | 0.277 | | | |
| Filter 12 | Object-side surface 121 | Infinity | 0.250 | 1.517 | 64.167 | |
| | Image-side surface 122 | Infinity | 0.454 | | | |
| | Image plane 100 | Infinity | | | | |

FIG. 20

| Surface | K | $a_4$ | $a_6$ | $a_8$ | $a_{10}$ |
|---|---|---|---|---|---|
| 31 | 1.335531E-01 | -6.574705E-03 | 3.789898E-02 | -1.159535E-01 | 2.059549E-01 |
| 32 | 4.163048E+00 | -2.451667E-01 | 5.340938E-01 | -8.021390E-01 | 8.634460E-01 |
| 41 | 8.074591E-01 | -2.010484E-01 | 3.664171E-01 | -5.635175E-01 | 6.318366E-01 |
| 42 | 8.957832E+00 | 9.616265E-02 | -2.783368E-01 | 6.271426E-01 | -1.154369E+00 |
| 51 | 6.504175E+00 | 1.652794E-02 | -1.600537E-01 | 5.670927E-01 | -1.246322E+00 |
| 52 | 2.570351E-01 | -1.012747E-01 | 9.206562E-02 | -1.501038E-02 | -1.340369E-01 |
| 61 | -1.272397E+02 | -2.604174E-02 | 3.493684E-03 | -3.896122E-02 | 6.505094E-02 |
| 62 | 2.743158E+03 | -3.590741E-02 | -7.585637E-02 | 1.592637E-01 | -2.097839E-01 |
| 71 | -1.280696E+04 | -3.468032E-02 | -2.194443E-01 | 3.382847E-01 | -3.146959E-01 |
| 72 | 1.934656E+01 | -2.900191E-03 | -2.321660E-01 | 2.982833E-01 | -2.289628E-01 |
| 81 | 4.254954E+00 | 3.777641E-02 | -1.583038E-01 | 1.405926E-01 | -7.493671E-02 |
| 82 | -2.703382E+00 | -2.416419E-02 | -2.606947E-02 | 1.632253E-02 | 1.476424E-03 |
| 91 | -4.476274E+01 | -9.520636E-02 | 5.660737E-02 | -1.769542E-02 | 3.384155E-03 |
| 92 | -7.310997E+00 | -6.143023E-02 | 2.807108E-02 | -9.573365E-03 | 2.075712E-03 |
| Surface | $a_{12}$ | $a_{14}$ | $a_{16}$ | $a_{18}$ | $a_{20}$ |
| 31 | -1.977278E-01 | 9.937871E-02 | -2.000705E-02 | 0.000000E+00 | 0.000000E+00 |
| 32 | -6.150470E-01 | 2.594750E-01 | -5.070005E-02 | 0.000000E+00 | 0.000000E+00 |
| 41 | -4.757085E-01 | 2.029444E-01 | -4.058090E-02 | 0.000000E+00 | 0.000000E+00 |
| 42 | 1.245122E+00 | -6.574496E-01 | 1.234334E-01 | 0.000000E+00 | 0.000000E+00 |
| 51 | 1.450242E+00 | -7.863772E-01 | 1.553400E-01 | 0.000000E+00 | 0.000000E+00 |
| 52 | 2.138532E-01 | -1.222281E-01 | 2.649687E-02 | 0.000000E+00 | 0.000000E+00 |
| 61 | -6.399840E-02 | 3.209361E-02 | -6.121979E-03 | 0.000000E+00 | 0.000000E+00 |
| 62 | 1.554213E-01 | -6.291530E-02 | 1.143298E-02 | 0.000000E+00 | 0.000000E+00 |
| 71 | 1.615853E-01 | -4.223050E-02 | 4.169341E-03 | 0.000000E+00 | 0.000000E+00 |
| 72 | 1.018808E-01 | -2.330646E-02 | 2.106512E-03 | 0.000000E+00 | 0.000000E+00 |
| 81 | 2.692720E-02 | -5.051747E-03 | 3.011989E-04 | 0.000000E+00 | 0.000000E+00 |
| 82 | -2.408928E-03 | 5.782243E-04 | -5.108825E-05 | 0.000000E+00 | 0.000000E+00 |
| 91 | -3.846374E-04 | 2.379329E-05 | -6.165143E-07 | 0.000000E+00 | 0.000000E+00 |
| 92 | -2.778998E-04 | 2.032694E-05 | -6.043937E-07 | 0.000000E+00 | 0.000000E+00 |

FIG. 21

| Fifth embodiment | | | | | | |
|---|---|---|---|---|---|---|
| Effective focal length=4.301 mm, Half field of view (HFOV)=37.688°, Fno=2.001, System length=5.387 mm, Image Height=3.33 mm | | | | | | |
| Lens element | Surface | Radius of curvature(mm) | Thickness(mm) | Refractive index | Abbe number | Focal length(mm) |
| Object | | Infinity | Infinity | | | |
| Aperture stop 2 | | Infinity | -0.225 | | | |
| First lens element 3 | Object-side surface 31 | 1.999 | 0.621 | 1.545 | 55.987 | 4.739 |
| | Image-side surface 32 | 7.809 | 0.042 | | | |
| Second lens element 4 | Object-side surface 41 | 2.560 | 0.205 | 1.661 | 20.412 | 12.480 |
| | Image-side surface 42 | 3.577 | 0.045 | | | |
| Third lens element 5 | Object-side surface 51 | 3.437 | 0.215 | 1.661 | 20.412 | -5.706 |
| | Image-side surface 52 | 1.761 | 0.528 | | | |
| Fourth lens element 6 | Object-side surface 61 | 15.765 | 0.454 | 1.535 | 55.690 | 16.556 |
| | Image-side surface 62 | -20.147 | 0.045 | | | |
| Fifth lens element 7 | Object-side surface 71 | -27.811 | 0.228 | 1.661 | 20.412 | -71.606 |
| | Image-side surface 72 | -66.772 | 0.516 | | | |
| Sixth lens element 8 | Object-side surface 81 | -3.590 | 0.529 | 1.545 | 55.987 | 2.345 |
| | Image-side surface 82 | -0.993 | 0.096 | | | |
| Seventh lens element 9 | Object-side surface 91 | 35.539 | 0.595 | 1.535 | 55.690 | -2.096 |
| | Image-side surface 92 | 1.084 | 0.563 | | | |
| Filter 12 | Object-side surface 121 | Infinity | 0.250 | 1.517 | 64.167 | |
| | Image-side surface 122 | Infinity | 0.454 | | | |
| | Image plane 100 | Infinity | | | | |

FIG. 24

| Surface | K | $a_4$ | $a_6$ | $a_8$ | $a_{10}$ |
|---|---|---|---|---|---|
| 31 | 1.130662E-01 | -8.757251E-03 | 3.935465E-02 | -1.183275E-01 | 2.044663E-01 |
| 32 | 1.011678E+01 | -2.451765E-01 | 5.329100E-01 | -8.033004E-01 | 8.589887E-01 |
| 41 | 3.814570E-01 | -2.062385E-01 | 3.652886E-01 | -5.666214E-01 | 6.348525E-01 |
| 42 | 7.651440E+00 | 1.009296E-01 | -2.861553E-01 | 6.296172E-01 | -1.155372E+00 |
| 51 | 6.137375E+00 | 1.342212E-02 | -1.500567E-01 | 5.594192E-01 | -1.251295E+00 |
| 52 | -1.187985E-02 | -1.118040E-01 | 8.923686E-02 | -7.670451E-03 | -1.380906E-01 |
| 61 | 5.687059E+01 | -3.000388E-02 | 6.143264E-03 | -4.539906E-02 | 6.690682E-02 |
| 62 | 0.000000E+00 | -1.470051E-02 | -8.254511E-02 | 1.588296E-01 | -2.114415E-01 |
| 71 | 0.000000E+00 | -3.010953E-02 | -2.105184E-01 | 3.482033E-01 | -3.118669E-01 |
| 72 | 1.727657E+03 | 1.855086E-03 | -2.248609E-01 | 3.015927E-01 | -2.281885E-01 |
| 81 | 1.055100E+00 | 9.084338E-02 | -1.691349E-01 | 1.374822E-01 | -7.653018E-02 |
| 82 | -3.588447E+00 | -1.672933E-02 | -2.116081E-02 | 1.562522E-02 | 1.221172E-03 |
| 91 | 1.177307E+02 | -1.006426E-01 | 5.665234E-02 | -1.767222E-02 | 3.382640E-03 |
| 92 | -7.241565E+00 | -6.451662E-02 | 2.803613E-02 | -9.570708E-03 | 2.078173E-03 |
| Surface | $a_{12}$ | $a_{14}$ | $a_{16}$ | $a_{18}$ | $a_{20}$ |
| 31 | -1.984052E-01 | 9.937186E-02 | -1.986246E-02 | 0.000000E+00 | 0.000000E+00 |
| 32 | -6.169249E-01 | 2.608974E-01 | -4.842036E-02 | 0.000000E+00 | 0.000000E+00 |
| 41 | -4.731966E-01 | 2.042189E-01 | -3.866687E-02 | 0.000000E+00 | 0.000000E+00 |
| 42 | 1.247068E+00 | -6.531816E-01 | 1.255592E-01 | 0.000000E+00 | 0.000000E+00 |
| 51 | 1.447154E+00 | -7.860420E-01 | 1.591272E-01 | 0.000000E+00 | 0.000000E+00 |
| 52 | 2.089507E-01 | -1.190914E-01 | 2.400503E-02 | 0.000000E+00 | 0.000000E+00 |
| 61 | -6.398996E-02 | 3.375992E-02 | -7.410354E-03 | 0.000000E+00 | 0.000000E+00 |
| 62 | 1.553224E-01 | -6.260483E-02 | 1.078788E-02 | 0.000000E+00 | 0.000000E+00 |
| 71 | 1.612000E-01 | -4.274548E-02 | 4.554946E-03 | 0.000000E+00 | 0.000000E+00 |
| 72 | 1.021212E-01 | -2.322428E-02 | 2.082932E-03 | 0.000000E+00 | 0.000000E+00 |
| 81 | 2.650413E-02 | -5.021638E-03 | 4.215515E-04 | 0.000000E+00 | 0.000000E+00 |
| 82 | -2.468415E-03 | 5.698932E-04 | -4.521666E-05 | 0.000000E+00 | 0.000000E+00 |
| 91 | -3.848948E-04 | 2.378781E-05 | -6.131715E-07 | 0.000000E+00 | 0.000000E+00 |
| 92 | -2.779226E-04 | 2.031426E-05 | -6.045387E-07 | 0.000000E+00 | 0.000000E+00 |

FIG. 25

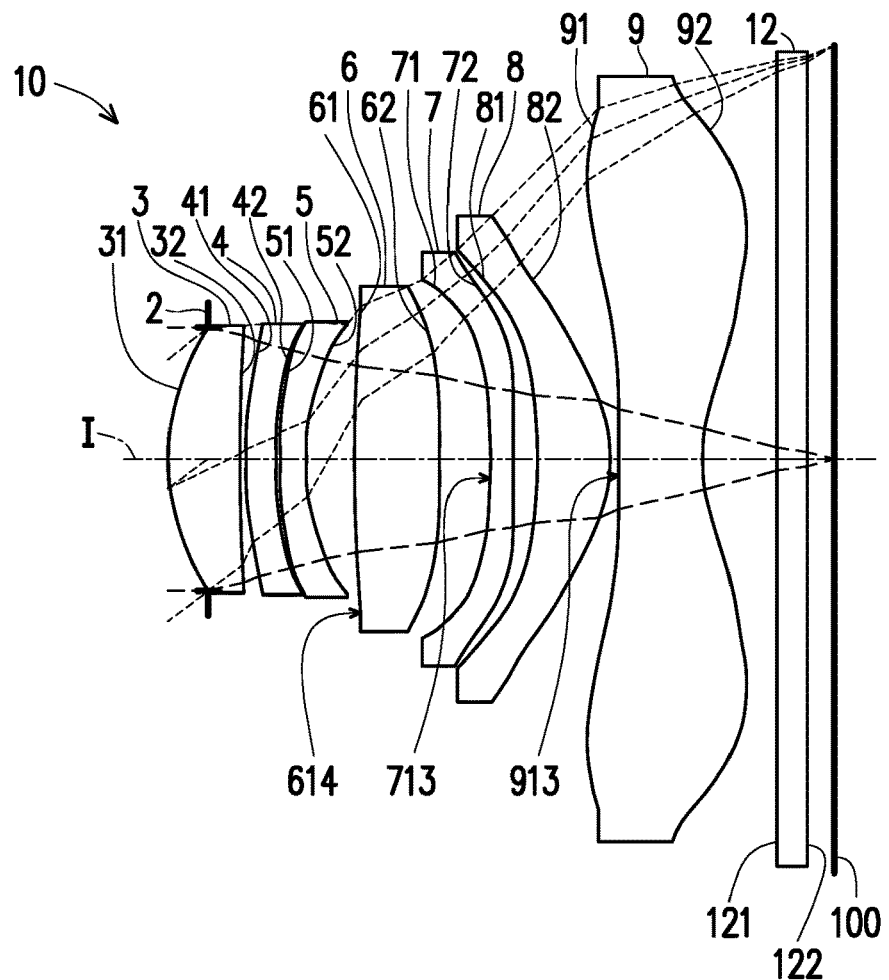
FIG. 26
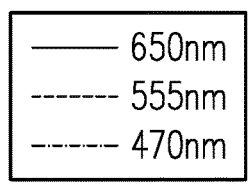
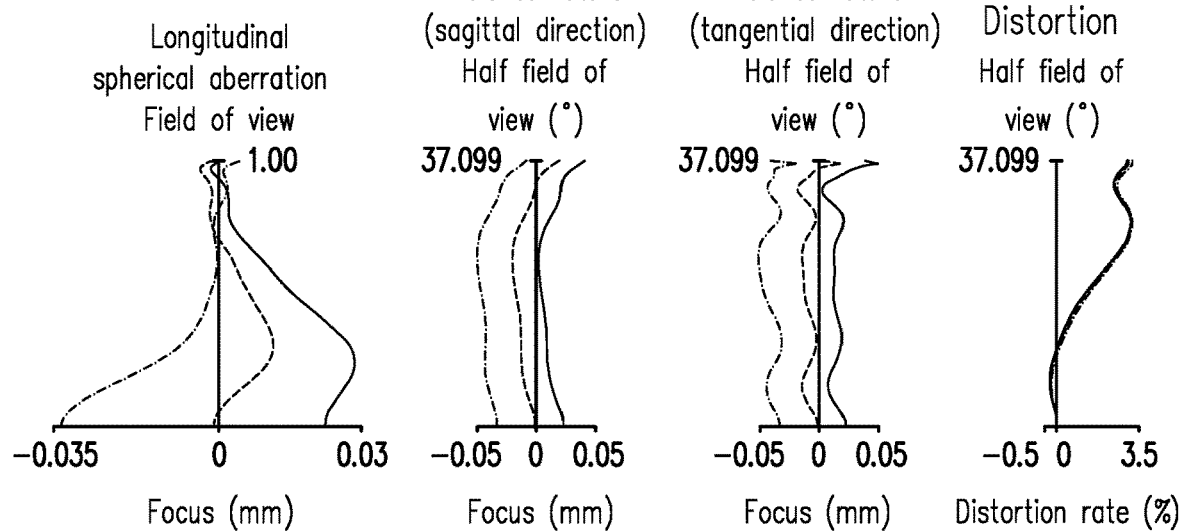
FIG. 27A  FIG. 27B  FIG. 27C  FIG. 27D

| Sixth embodiment ||||||
| --- | --- | --- | --- | --- | --- | --- |
| Effective focal length=4.271 mm, Half field of view (HFOV)=37.099°, Fno=2.000, System length=5.372 mm, Image Height=3.33 mm ||||||
| Lens element | Surface | Radius of curvature(mm) | Thickness(mm) | Refractive index | Abbe number | Focal length(mm) |
| Object | | Infinity | Infinity | | | |
| Aperture stop 2 | | Infinity | -0.311 | | | |
| First lens element 3 | Object-side surface 31 | 1.903 | 0.581 | 1.545 | 55.987 | 4.923 |
| | Image-side surface 32 | 5.802 | 0.036 | | | |
| Second lens element 4 | Object-side surface 41 | 2.558 | 0.243 | 1.661 | 20.412 | 11.364 |
| | Image-side surface 42 | 3.715 | 0.034 | | | |
| Third lens element 5 | Object-side surface 51 | 3.524 | 0.214 | 1.661 | 20.412 | -5.923 |
| | Image-side surface 52 | 1.818 | 0.447 | | | |
| Fourth lens element 6 | Object-side surface 61 | 12.177 | 0.627 | 1.535 | 55.690 | 13.130 |
| | Image-side surface 62 | -16.419 | 0.376 | | | |
| Fifth lens element 7 | Object-side surface 71 | -180.657 | 0.217 | 1.661 | 20.412 | -71.517 |
| | Image-side surface 72 | 64.872 | 0.202 | | | |
| Sixth lens element 8 | Object-side surface 81 | -3.802 | 0.585 | 1.545 | 55.987 | 2.756 |
| | Image-side surface 82 | -1.137 | 0.067 | | | |
| Seventh lens element 9 | Object-side surface 91 | 27.297 | 0.676 | 1.535 | 55.690 | -2.270 |
| | Image-side surface 92 | 1.156 | 0.600 | | | |
| Filter 12 | Object-side surface 121 | Infinity | 0.250 | 1.517 | 64.167 | |
| | Image-side surface 122 | Infinity | 0.218 | | | |
| | Image plane 100 | Infinity | | | | |

FIG. 28

| Surface | K | $a_4$ | $a_6$ | $a_8$ | $a_{10}$ |
|---|---|---|---|---|---|
| 31 | 1.142890E-01 | -8.735583E-03 | 4.093873E-02 | -1.193455E-01 | 2.044405E-01 |
| 32 | -1.784476E+00 | -2.522453E-01 | 5.358932E-01 | -7.983746E-01 | 8.604861E-01 |
| 41 | 4.095972E-01 | -2.058427E-01 | 3.653234E-01 | -5.666413E-01 | 6.336399E-01 |
| 42 | 7.734579E+00 | 1.060433E-01 | -2.905991E-01 | 6.257815E-01 | -1.156081E+00 |
| 51 | 6.039907E+00 | 6.734027E-03 | -1.452265E-01 | 5.604761E-01 | -1.252860E+00 |
| 52 | 1.246823E-01 | -1.092697E-01 | 9.740048E-02 | -1.928749E-03 | -1.387075E-01 |
| 61 | 5.907702E+01 | -3.825873E-02 | 6.001313E-03 | -3.517760E-02 | 6.870461E-02 |
| 62 | -8.835097E+01 | -2.972858E-02 | -7.842385E-02 | 1.606733E-01 | -2.098627E-01 |
| 71 | 1.483757E+04 | -3.326338E-02 | -2.140924E-01 | 3.392686E-01 | -3.125285E-01 |
| 72 | 9.812717E+02 | 6.708617E-03 | -2.337677E-01 | 2.985431E-01 | -2.293824E-01 |
| 81 | 2.658897E+00 | 9.083204E-02 | -1.812142E-01 | 1.394672E-01 | -7.561681E-02 |
| 82 | -3.743012E+00 | -1.028644E-02 | -2.882546E-02 | 1.487563E-02 | 1.433723E-03 |
| 91 | 4.328742E+01 | -1.034399E-01 | 5.667751E-02 | -1.765078E-02 | 3.384832E-03 |
| 92 | -6.802162E+00 | -5.885895E-02 | 2.810918E-02 | -9.599953E-03 | 2.075772E-03 |
| Surface | $a_{12}$ | $a_{14}$ | $a_{16}$ | $a_{18}$ | $a_{20}$ |
| 31 | -1.969329E-01 | 1.005498E-01 | -2.079740E-02 | 0.000000E+00 | 0.000000E+00 |
| 32 | -6.183965E-01 | 2.599884E-01 | -4.735738E-02 | 0.000000E+00 | 0.000000E+00 |
| 41 | -4.732111E-01 | 2.039993E-01 | -3.750249E-02 | 0.000000E+00 | 0.000000E+00 |
| 42 | 1.245670E+00 | -6.517504E-01 | 1.289247E-01 | 0.000000E+00 | 0.000000E+00 |
| 51 | 1.446987E+00 | -7.872142E-01 | 1.608818E-01 | 0.000000E+00 | 0.000000E+00 |
| 52 | 2.075112E-01 | -1.215022E-01 | 2.561422E-02 | 0.000000E+00 | 0.000000E+00 |
| 61 | -6.642740E-02 | 3.046359E-02 | -4.304977E-03 | 0.000000E+00 | 0.000000E+00 |
| 62 | 1.561298E-01 | -6.247552E-02 | 1.051996E-02 | 0.000000E+00 | 0.000000E+00 |
| 71 | 1.615290E-01 | -4.284327E-02 | 4.395673E-03 | 0.000000E+00 | 0.000000E+00 |
| 72 | 1.018875E-01 | -2.319638E-02 | 2.091969E-03 | 0.000000E+00 | 0.000000E+00 |
| 81 | 2.689311E-02 | -4.977972E-03 | 3.489261E-04 | 0.000000E+00 | 0.000000E+00 |
| 82 | -2.383462E-03 | 5.810125E-04 | -4.832218E-05 | 0.000000E+00 | 0.000000E+00 |
| 91 | -3.847891E-04 | 2.378073E-05 | -6.169237E-07 | 0.000000E+00 | 0.000000E+00 |
| 92 | -2.780659E-04 | 2.031390E-05 | -6.030044E-07 | 0.000000E+00 | 0.000000E+00 |

FIG. 29

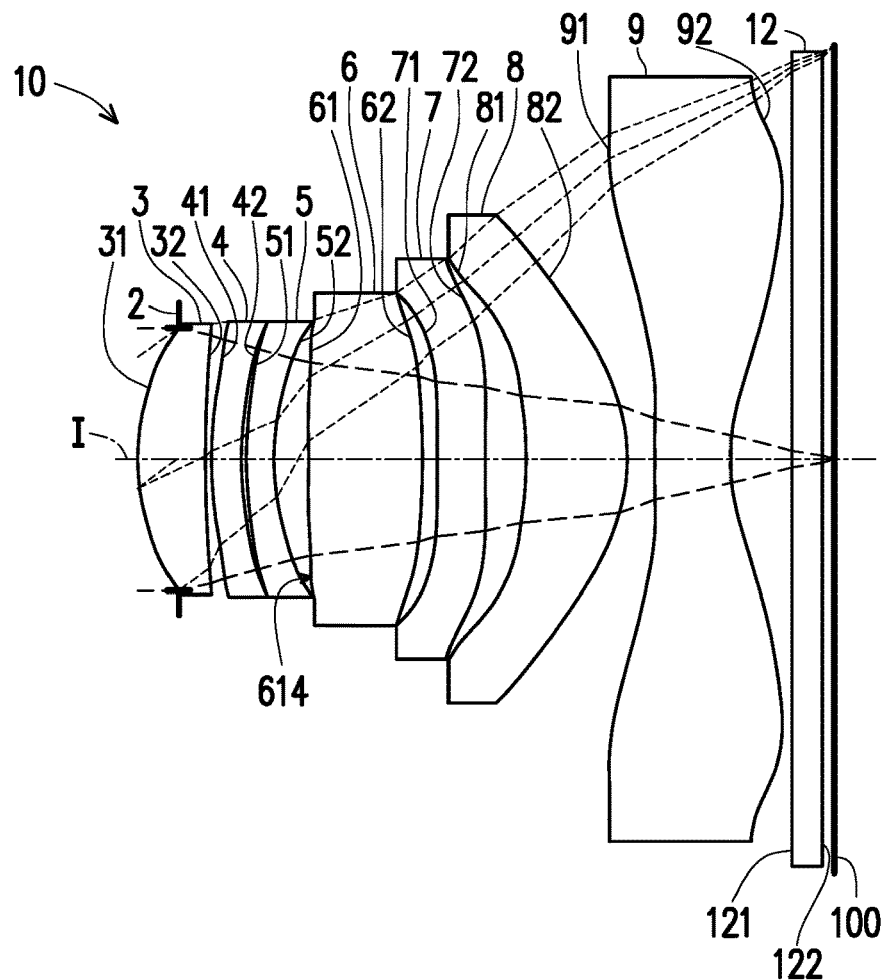
FIG. 30
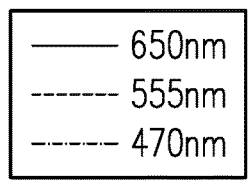
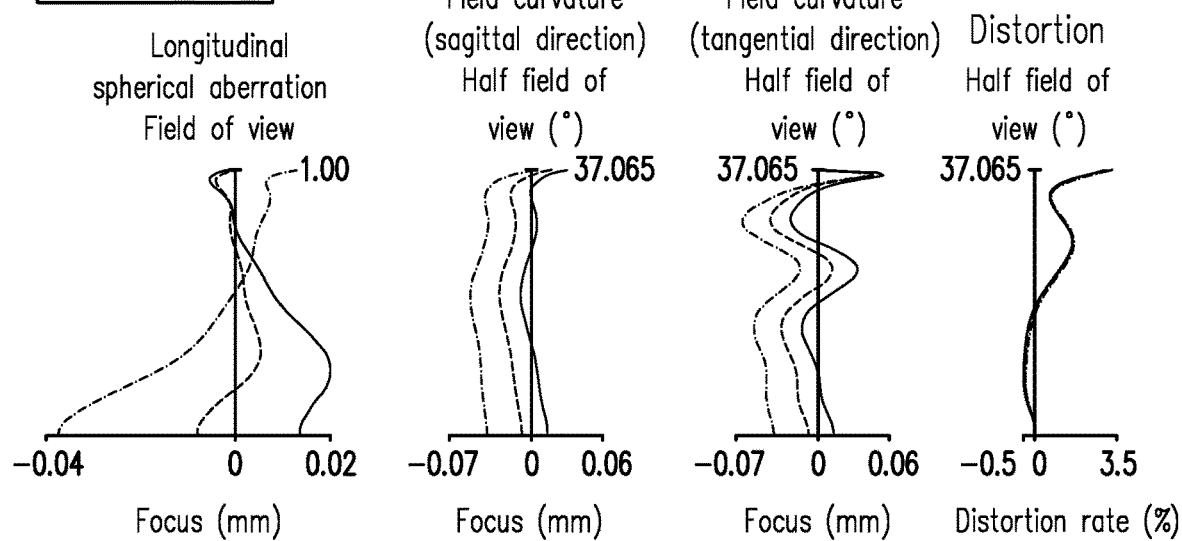
FIG. 31A   FIG. 31B   FIG. 31C   FIG. 31D

| Seventh embodiment ||||||
|---|---|---|---|---|---|
| Effective focal length=4.259 mm, Half field of view (HFOV)=37.065°, Fno=2.000, System length=5.598 mm, Image Height=3.325 mm ||||||
| Lens element | Surface | Radius of curvature(mm) | Thickness(mm) | Refractive index | Abbe number | Focal length(mm) |
| Object | | Infinity | Infinity | | | |
| Aperture stop 2 | | Infinity | -0.311 | | | |
| First lens element 3 | Object-side surface 31 | 1.924 | 0.553 | 1.545 | 55.987 | 4.833 |
| | Image-side surface 32 | 6.375 | 0.036 | | | |
| Second lens element 4 | Object-side surface 41 | 2.593 | 0.241 | 1.661 | 20.412 | 12.218 |
| | Image-side surface 42 | 3.661 | 0.039 | | | |
| Third lens element 5 | Object-side surface 51 | 3.693 | 0.218 | 1.661 | 20.412 | -5.879 |
| | Image-side surface 52 | 1.857 | 0.277 | | | |
| Fourth lens element 6 | Object-side surface 61 | 11.779 | 0.917 | 1.535 | 55.690 | 10.654 |
| | Image-side surface 62 | -10.806 | 0.120 | | | |
| Fifth lens element 7 | Object-side surface 71 | 71.288 | 0.386 | 1.661 | 20.412 | -561.604 |
| | Image-side surface 72 | 59.763 | 0.325 | | | |
| Sixth lens element 8 | Object-side surface 81 | -3.589 | 0.827 | 1.545 | 55.987 | 3.097 |
| | Image-side surface 82 | -1.243 | 0.225 | | | |
| Seventh lens element 9 | Object-side surface 91 | -240.347 | 0.589 | 1.535 | 55.690 | -2.210 |
| | Image-side surface 92 | 1.193 | 0.500 | | | |
| Filter 12 | Object-side surface 121 | Infinity | 0.250 | 1.517 | 64.167 | |
| | Image-side surface 122 | Infinity | 0.096 | | | |
| | Image plane 100 | Infinity | | | | |

FIG. 32

| Surface | K | $a_4$ | $a_6$ | $a_8$ | $a_{10}$ |
|---|---|---|---|---|---|
| 31 | 1.423568E-01 | -7.753325E-03 | 4.103990E-02 | -1.183342E-01 | 2.048451E-01 |
| 32 | 1.047504E+00 | -2.506296E-01 | 5.362731E-01 | -7.987587E-01 | 8.604729E-01 |
| 41 | 2.548184E-01 | -2.081384E-01 | 3.640219E-01 | -5.662561E-01 | 6.340257E-01 |
| 42 | 8.294839E+00 | 1.011891E-01 | -2.943568E-01 | 6.234803E-01 | -1.157930E+00 |
| 51 | 5.608583E+00 | 8.055814E-03 | -1.448178E-01 | 5.587905E-01 | -1.255008E+00 |
| 52 | 1.438079E-03 | -1.152773E-01 | 9.262253E-02 | -1.465821E-03 | -1.380049E-01 |
| 61 | 1.009379E+02 | -2.563151E-02 | 8.583253E-03 | -4.118457E-02 | 6.771609E-02 |
| 62 | 2.480596E+01 | -2.944152E-02 | -7.066794E-02 | 1.616598E-01 | -2.106295E-01 |
| 71 | -8.352276E+03 | -3.334083E-02 | -2.128431E-01 | 3.384747E-01 | -3.120978E-01 |
| 72 | 1.280164E+03 | 1.901340E-02 | -2.333822E-01 | 2.988526E-01 | -2.292993E-01 |
| 81 | 2.768074E+00 | 7.905224E-02 | -1.801970E-01 | 1.398605E-01 | -7.557114E-02 |
| 82 | -3.993491E+00 | -1.655774E-02 | -2.943448E-02 | 1.476170E-02 | 1.419832E-03 |
| 91 | 6.045843E+03 | -1.042074E-01 | 5.678807E-02 | -1.763868E-02 | 3.385594E-03 |
| 92 | -6.839446E+00 | -5.457468E-02 | 2.840286E-02 | -9.595471E-03 | 2.073861E-03 |
| Surface | $a_{12}$ | $a_{14}$ | $a_{16}$ | $a_{18}$ | $a_{20}$ |
| 31 | -1.971386E-01 | 1.003410E-01 | -2.048068E-02 | 0.000000E+00 | 0.000000E+00 |
| 32 | -6.182057E-01 | 2.601718E-01 | -4.723953E-02 | 0.000000E+00 | 0.000000E+00 |
| 41 | -4.730129E-01 | 2.040600E-01 | -3.767176E-02 | 0.000000E+00 | 0.000000E+00 |
| 42 | 1.243730E+00 | -6.535380E-01 | 1.278764E-01 | 0.000000E+00 | 0.000000E+00 |
| 51 | 1.445574E+00 | -7.880273E-01 | 1.599522E-01 | 0.000000E+00 | 0.000000E+00 |
| 52 | 2.075323E-01 | -1.215384E-01 | 2.590707E-02 | 0.000000E+00 | 0.000000E+00 |
| 61 | -6.430772E-02 | 3.225545E-02 | -4.634535E-03 | 0.000000E+00 | 0.000000E+00 |
| 62 | 1.559476E-01 | -6.227882E-02 | 1.080292E-02 | 0.000000E+00 | 0.000000E+00 |
| 71 | 1.620040E-01 | -4.271847E-02 | 4.300471E-03 | 0.000000E+00 | 0.000000E+00 |
| 72 | 1.018891E-01 | -2.320200E-02 | 2.093067E-03 | 0.000000E+00 | 0.000000E+00 |
| 81 | 2.691124E-02 | -4.956072E-03 | 3.620281E-04 | 0.000000E+00 | 0.000000E+00 |
| 82 | -2.381825E-03 | 5.817991E-04 | -4.828988E-05 | 0.000000E+00 | 0.000000E+00 |
| 91 | -3.847906E-04 | 2.376854E-05 | -6.201885E-07 | 0.000000E+00 | 0.000000E+00 |
| 92 | -2.782262E-04 | 2.030777E-05 | -6.022658E-07 | 0.000000E+00 | 0.000000E+00 |

FIG. 33

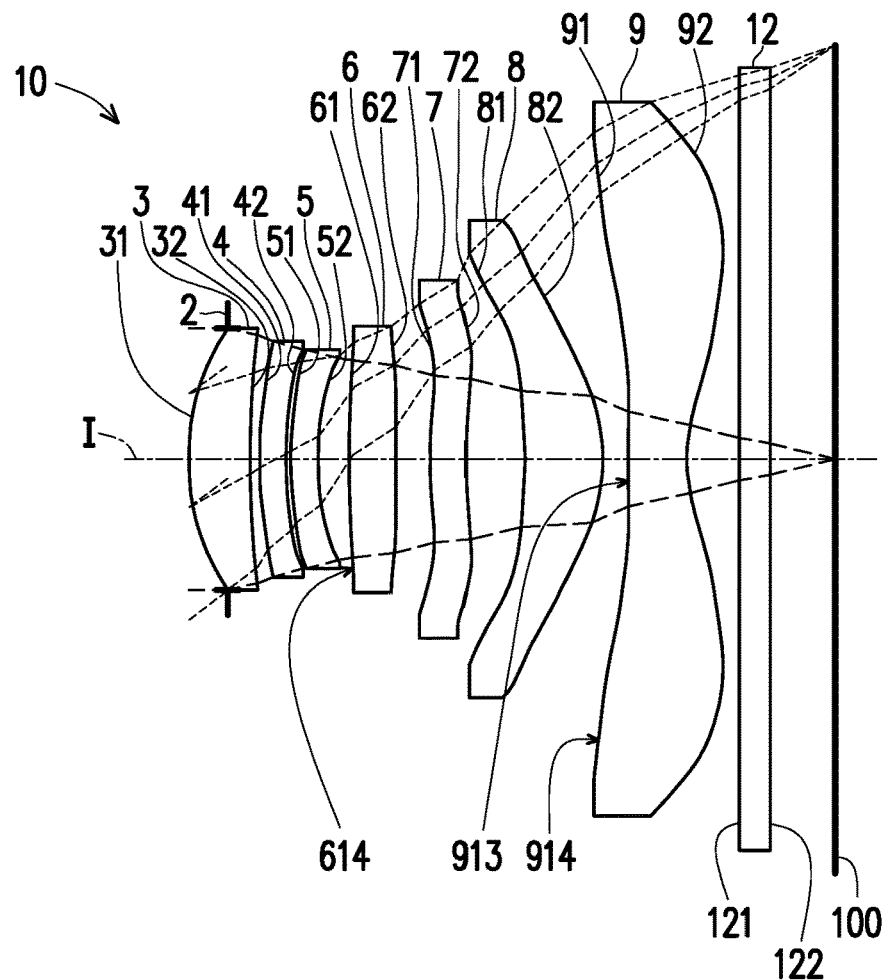
FIG. 34
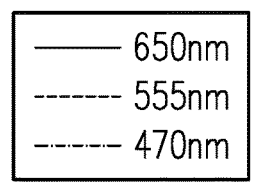
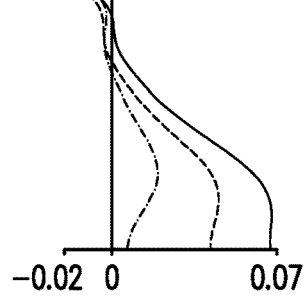
FIG. 35A
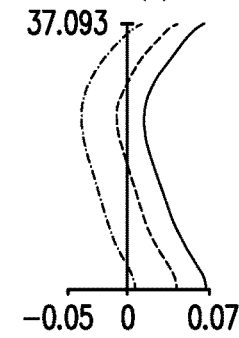
FIG. 35B
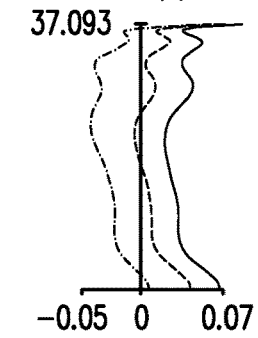
FIG. 35C
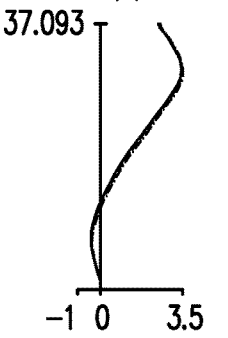
FIG. 35D

| Eighth embodiment ||||||
|---|---|---|---|---|---|---|
| Effective focal length=4.357 mm, Half field of view (HFOV)=37.081°, Fno=2.001, System length=5.229 mm, Image Height=3.33 mm |||||||
| Lens element | Surface | Radius of curvature(mm) | Thickness(mm) | Refractive index | Abbe number | Focal length(mm) |
| Object | | Infinity | Infinity | | | |
| Aperture stop 2 | | Infinity | -0.312 | | | |
| First lens element 3 | Object-side surface 31 | 1.914 | 0.534 | 1.545 | 55.987 | 5.115 |
| | Image-side surface 32 | 5.480 | 0.036 | | | |
| Second lens element 4 | Object-side surface 41 | 2.563 | 0.218 | 1.661 | 20.412 | 11.439 |
| | Image-side surface 42 | 3.727 | 0.042 | | | |
| Third lens element 5 | Object-side surface 51 | 3.529 | 0.212 | 1.661 | 20.412 | -5.893 |
| | Image-side surface 52 | 1.815 | 0.283 | | | |
| Fourth lens element 6 | Object-side surface 61 | 10.677 | 0.359 | 1.535 | 55.690 | 14.782 |
| | Image-side surface 62 | -30.486 | 0.298 | | | |
| Fifth lens element 7 | Object-side surface 71 | 10.795 | 0.300 | 1.661 | 20.412 | -220.981 |
| | Image-side surface 72 | 9.947 | 0.434 | | | |
| Sixth lens element 8 | Object-side surface 81 | -4.124 | 0.638 | 1.545 | 55.987 | 2.801 |
| | Image-side surface 82 | -1.177 | 0.199 | | | |
| Seventh lens element 9 | Object-side surface 91 | 18.196 | 0.479 | 1.535 | 55.690 | -2.388 |
| | Image-side surface 92 | 1.186 | 0.422 | | | |
| Filter 12 | Object-side surface 121 | Infinity | 0.250 | 1.517 | 64.167 | |
| | Image-side surface 122 | Infinity | 0.523 | | | |
| | Image plane 100 | Infinity | | | | |

FIG. 36

| Surface | K | $a_4$ | $a_6$ | $a_8$ | $a_{10}$ |
|---|---|---|---|---|---|
| 31 | 7.716281E-02 | -9.992460E-03 | 4.018389E-02 | -1.197950E-01 | 2.043672E-01 |
| 32 | -2.494604E+00 | -2.526283E-01 | 5.362984E-01 | -7.982362E-01 | 8.603607E-01 |
| 41 | 3.827043E-01 | -2.058112E-01 | 3.645462E-01 | -5.670865E-01 | 6.334178E-01 |
| 42 | 7.466130E+00 | 1.044269E-01 | -2.905602E-01 | 6.252691E-01 | -1.156532E+00 |
| 51 | 6.189628E+00 | 8.232717E-03 | -1.454997E-01 | 5.609329E-01 | -1.252445E+00 |
| 52 | 6.151698E-03 | -1.139971E-01 | 9.661022E-02 | -4.298872E-03 | -1.399133E-01 |
| 61 | 5.491392E+01 | -3.386495E-02 | 3.409900E-03 | -3.368426E-02 | 7.191225E-02 |
| 62 | -6.233240E+02 | -2.720664E-02 | -7.221153E-02 | 1.660766E-01 | -2.074047E-01 |
| 71 | -4.233037E+01 | -2.480971E-02 | -2.155874E-01 | 3.471522E-01 | -3.120434E-01 |
| 72 | -1.649767E+01 | 6.176802E-03 | -2.272195E-01 | 3.009313E-01 | -2.282933E-01 |
| 81 | 1.553583E+00 | 9.766307E-02 | -1.828735E-01 | 1.404399E-01 | -7.544254E-02 |
| 82 | -4.315172E+00 | 4.710683E-03 | -3.050392E-02 | 1.484043E-02 | 1.459751E-03 |
| 91 | -3.359029E+01 | -1.043109E-01 | 5.661549E-02 | -1.764686E-02 | 3.385249E-03 |
| 92 | -7.644473E+00 | -6.168050E-02 | 2.809125E-02 | -9.574274E-03 | 2.078549E-03 |
| Surface | $a_{12}$ | $a_{14}$ | $a_{16}$ | $a_{18}$ | $a_{20}$ |
| 31 | -1.968409E-01 | 1.006260E-01 | -2.084809E-02 | 0.000000E+00 | 0.000000E+00 |
| 32 | -6.185974E-01 | 2.598507E-01 | -4.736004E-02 | 0.000000E+00 | 0.000000E+00 |
| 41 | -4.733456E-01 | 2.038627E-01 | -3.771071E-02 | 0.000000E+00 | 0.000000E+00 |
| 42 | 1.245558E+00 | -6.518029E-01 | 1.281574E-01 | 0.000000E+00 | 0.000000E+00 |
| 51 | 1.446850E+00 | -7.877030E-01 | 1.607719E-01 | 0.000000E+00 | 0.000000E+00 |
| 52 | 2.089931E-01 | -1.194779E-01 | 2.568432E-02 | 0.000000E+00 | 0.000000E+00 |
| 61 | -6.189146E-02 | 3.380726E-02 | -4.125154E-03 | 0.000000E+00 | 0.000000E+00 |
| 62 | 1.560998E-01 | -6.191756E-02 | 1.318818E-02 | 0.000000E+00 | 0.000000E+00 |
| 71 | 1.619695E-01 | -4.233872E-02 | 4.066630E-03 | 0.000000E+00 | 0.000000E+00 |
| 72 | 1.021161E-01 | -2.323067E-02 | 2.037403E-03 | 0.000000E+00 | 0.000000E+00 |
| 81 | 2.690486E-02 | -4.984645E-03 | 3.448628E-04 | 0.000000E+00 | 0.000000E+00 |
| 82 | -2.383172E-03 | 5.789040E-04 | -4.958413E-05 | 0.000000E+00 | 0.000000E+00 |
| 91 | -3.848516E-04 | 2.376223E-05 | -6.184020E-07 | 0.000000E+00 | 0.000000E+00 |
| 92 | -2.779405E-04 | 2.029790E-05 | -6.083123E-07 | 0.000000E+00 | 0.000000E+00 |

FIG. 37

| Ninth embodiment | | | | | | |
|---|---|---|---|---|---|---|
| Effective focal length=4.143 mm, Half field of view (HFOV)=37.099°, Fno=1.937, System length=5.240 mm, Image Height=3.33 mm | | | | | | |
| Lens element | Surface | Radius of curvature(mm) | Thickness(mm) | Refractive index | Abbe number | Focal length(mm) |
| Object | | Infinity | Infinity | | | |
| Aperture stop 2 | | Infinity | -0.286 | | | |
| First lens element 3 | Object-side surface 31 | 2.003 | 0.548 | 1.545 | 55.987 | 5.532 |
| | Image-side surface 32 | 5.365 | 0.032 | | | |
| Second lens element 4 | Object-side surface 41 | 2.723 | 0.390 | 1.661 | 20.412 | 13.324 |
| | Image-side surface 42 | 3.700 | 0.064 | | | |
| Third lens element 5 | Object-side surface 51 | 4.099 | 0.230 | 1.661 | 20.412 | -6.463 |
| | Image-side surface 52 | 2.054 | 0.155 | | | |
| Fourth lens element 6 | Object-side surface 61 | 10.886 | 0.484 | 1.535 | 55.690 | 8.305 |
| | Image-side surface 62 | -7.428 | 0.266 | | | |
| Fifth lens element 7 | Object-side surface 71 | 50.769 | 0.323 | 1.661 | 20.412 | 15122.575 |
| | Image-side surface 72 | 50.896 | 0.397 | | | |
| Sixth lens element 8 | Object-side surface 81 | -4.211 | 0.758 | 1.545 | 55.987 | 2.962 |
| | Image-side surface 82 | -1.243 | 0.224 | | | |
| Seventh lens element 9 | Object-side surface 91 | 241.748 | 0.459 | 1.535 | 55.690 | -2.162 |
| | Image-side surface 92 | 1.154 | 0.500 | | | |
| Filter 12 | Object-side surface 121 | Infinity | 0.250 | 1.517 | 64.167 | |
| | Image-side surface 122 | Infinity | 0.159 | | | |
| | Image plane 100 | Infinity | | | | |

FIG. 40

| Surface | K | $a_4$ | $a_6$ | $a_8$ | $a_{10}$ |
|---|---|---|---|---|---|
| 31 | 3.483615E-02 | -1.303150E-02 | 4.112233E-02 | -1.179790E-01 | 2.048876E-01 |
| 32 | -1.607571E+01 | -2.572381E-01 | 5.371149E-01 | -7.972898E-01 | 8.608745E-01 |
| 41 | 1.889450E-01 | -2.077971E-01 | 3.615564E-01 | -5.676399E-01 | 6.334874E-01 |
| 42 | 8.170950E+00 | 9.762483E-02 | -2.948680E-01 | 6.224524E-01 | -1.158971E+00 |
| 51 | 5.588246E+00 | 5.686817E-03 | -1.448024E-01 | 5.596400E-01 | -1.254295E+00 |
| 52 | 3.875305E-02 | -1.075106E-01 | 8.786913E-02 | -4.547561E-03 | -1.397057E-01 |
| 61 | 7.734769E+01 | -8.815839E-03 | 2.284408E-02 | -3.336029E-02 | 7.095869E-02 |
| 62 | -5.884402E+01 | -1.242431E-02 | -5.621673E-02 | 1.684542E-01 | -2.077934E-01 |
| 71 | 1.450007E+03 | -1.689149E-02 | -2.119902E-01 | 3.360516E-01 | -3.128767E-01 |
| 72 | 1.060213E+03 | 1.866949E-02 | -2.340634E-01 | 2.991637E-01 | -2.290409E-01 |
| 81 | 2.856518E+00 | 7.796588E-02 | -1.795666E-01 | 1.406338E-01 | -7.544550E-02 |
| 82 | -5.169049E+00 | -8.240233E-03 | -2.857194E-02 | 1.474671E-02 | 1.415029E-03 |
| 91 | 1.395149E+03 | -1.030990E-01 | 5.674902E-02 | -1.764707E-02 | 3.384649E-03 |
| 92 | -7.651744E+00 | -5.699611E-02 | 2.834422E-02 | -9.597615E-03 | 2.074743E-03 |
| Surface | $a_{12}$ | $a_{14}$ | $a_{16}$ | $a_{18}$ | $a_{20}$ |
| 31 | -1.972661E-01 | 1.001820E-01 | -2.059146E-02 | 0.000000E+00 | 0.000000E+00 |
| 32 | -6.185100E-01 | 2.596433E-01 | -4.771687E-02 | 0.000000E+00 | 0.000000E+00 |
| 41 | -4.733790E-01 | 2.036296E-01 | -3.814965E-02 | 0.000000E+00 | 0.000000E+00 |
| 42 | 1.242910E+00 | -6.541373E-01 | 1.274285E-01 | 0.000000E+00 | 0.000000E+00 |
| 51 | 1.445977E+00 | -7.878852E-01 | 1.599348E-01 | 0.000000E+00 | 0.000000E+00 |
| 52 | 2.066680E-01 | -1.218687E-01 | 2.597309E-02 | 0.000000E+00 | 0.000000E+00 |
| 61 | -6.348880E-02 | 3.133186E-02 | -6.767291E-03 | 0.000000E+00 | 0.000000E+00 |
| 62 | 1.571263E-01 | -6.110169E-02 | 1.233029E-02 | 0.000000E+00 | 0.000000E+00 |
| 71 | 1.625205E-01 | -4.217479E-02 | 4.225979E-03 | 0.000000E+00 | 0.000000E+00 |
| 72 | 1.020113E-01 | -2.315091E-02 | 2.111320E-03 | 0.000000E+00 | 0.000000E+00 |
| 81 | 2.687989E-02 | -4.987417E-03 | 3.497713E-04 | 0.000000E+00 | 0.000000E+00 |
| 82 | -2.383113E-03 | 5.815240E-04 | -4.837621E-05 | 0.000000E+00 | 0.000000E+00 |
| 91 | -3.848634E-04 | 2.376898E-05 | -6.183767E-07 | 0.000000E+00 | 0.000000E+00 |
| 92 | -2.782028E-04 | 2.030268E-05 | -6.035082E-07 | 0.000000E+00 | 0.000000E+00 |

FIG. 41

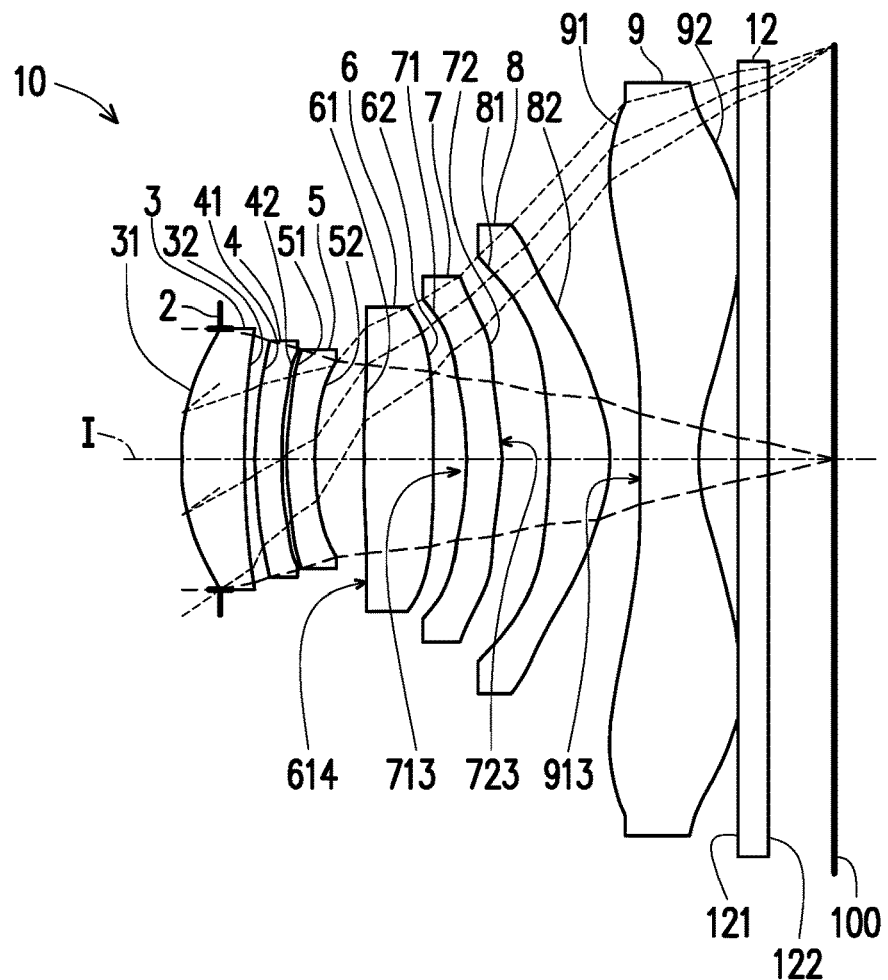
FIG. 42
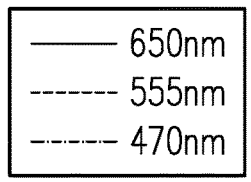
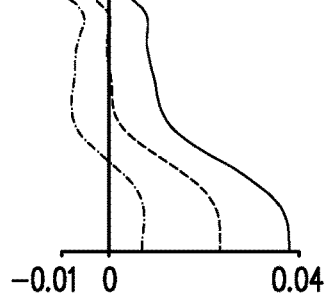
FIG. 43A
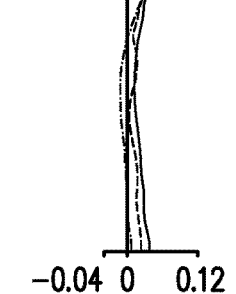
FIG. 43B
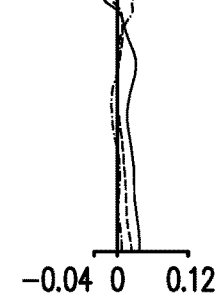
FIG. 43C
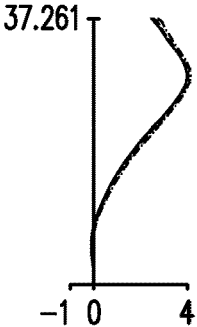
FIG. 43D

| Tenth embodiment | | | | | | |
|---|---|---|---|---|---|---|
| Effective focal length=4.302 mm, Half field of view (HFOV)=37.259°, Fno=2.000, System length=5.270 mm, Image Height=3.33 mm | | | | | | |
| Lens element | Surface | Radius of curvature(mm) | Thickness(mm) | Refractive index | Abbe number | Focal length(mm) |
| Object | | Infinity | Infinity | | | |
| Aperture stop 2 | | Infinity | -0.312 | | | |
| First lens element 3 | Object-side surface 31 | 1.904 | 0.559 | 1.545 | 55.987 | 4.992 |
| | Image-side surface 32 | 5.651 | 0.037 | | | |
| Second lens element 4 | Object-side surface 41 | 2.548 | 0.215 | 1.617 | 30.973 | 12.207 |
| | Image-side surface 42 | 3.718 | 0.045 | | | |
| Third lens element 5 | Object-side surface 51 | 3.563 | 0.224 | 1.661 | 20.412 | -5.825 |
| | Image-side surface 52 | 1.812 | 0.396 | | | |
| Fourth lens element 6 | Object-side surface 61 | 10.433 | 0.552 | 1.535 | 55.690 | 13.086 |
| | Image-side surface 62 | -21.078 | 0.212 | | | |
| Fifth lens element 7 | Object-side surface 71 | -272.428 | 0.286 | 1.661 | 20.412 | -449.196 |
| | Image-side surface 72 | -2995.413 | 0.437 | | | |
| Sixth lens element 8 | Object-side surface 81 | -4.115 | 0.493 | 1.545 | 55.987 | 2.913 |
| | Image-side surface 82 | -1.196 | 0.239 | | | |
| Seventh lens element 9 | Object-side surface 91 | 22.473 | 0.471 | 1.535 | 55.690 | -2.350 |
| | Image-side surface 92 | 1.185 | 0.322 | | | |
| Filter 12 | Object-side surface 121 | Infinity | 0.250 | 1.517 | 64.167 | |
| | Image-side surface 122 | Infinity | 0.531 | | | |
| | Image plane 100 | Infinity | | | | |

FIG. 44

| Surface | K | $a_4$ | $a_6$ | $a_8$ | $a_{10}$ |
|---|---|---|---|---|---|
| 31 | 9.124093E-02 | -1.010603E-02 | 4.105059E-02 | -1.193989E-01 | 2.044413E-01 |
| 32 | -1.256764E+00 | -2.519356E-01 | 5.353061E-01 | -7.986445E-01 | 8.603245E-01 |
| 41 | 3.015335E-01 | -2.075362E-01 | 3.657022E-01 | -5.665906E-01 | 6.333167E-01 |
| 42 | 7.551564E+00 | 1.071952E-01 | -2.929781E-01 | 6.241823E-01 | -1.156046E+00 |
| 51 | 5.954515E+00 | 4.008534E-03 | -1.444455E-01 | 5.609938E-01 | -1.253571E+00 |
| 52 | 1.715396E-01 | -1.056332E-01 | 9.549847E-02 | -4.977980E-03 | -1.384826E-01 |
| 61 | 6.023792E+01 | -3.249017E-02 | 5.853171E-03 | -3.386850E-02 | 6.814820E-02 |
| 62 | 1.101107E+01 | -3.148923E-02 | -7.901064E-02 | 1.605793E-01 | -2.111476E-01 |
| 71 | 4.289697E+04 | -2.824729E-02 | -2.197102E-01 | 3.431382E-01 | -3.133852E-01 |
| 72 | 4.037730E+06 | 7.066050E-03 | -2.295344E-01 | 2.992017E-01 | -2.290236E-01 |
| 81 | 2.266911E+00 | 9.589960E-02 | -1.825522E-01 | 1.398028E-01 | -7.597723E-02 |
| 82 | -4.450737E+00 | 3.420487E-03 | -3.098333E-02 | 1.477755E-02 | 1.455576E-03 |
| 91 | 3.893607E+01 | -1.035882E-01 | 5.663517E-02 | -1.765082E-02 | 3.384955E-03 |
| 92 | -7.005937E+00 | -5.968611E-02 | 2.812312E-02 | -9.575073E-03 | 2.078378E-03 |
| Surface | $a_{12}$ | $a_{14}$ | $a_{16}$ | $a_{18}$ | $a_{20}$ |
| 31 | -1.969074E-01 | 1.005182E-01 | -2.095096E-02 | 0.000000E+00 | 0.000000E+00 |
| 32 | -6.185566E-01 | 2.598074E-01 | -4.754181E-02 | 0.000000E+00 | 0.000000E+00 |
| 41 | -4.736283E-01 | 2.037008E-01 | -3.756050E-02 | 0.000000E+00 | 0.000000E+00 |
| 42 | 1.246511E+00 | -6.514715E-01 | 1.275758E-01 | 0.000000E+00 | 0.000000E+00 |
| 51 | 1.445729E+00 | -7.878843E-01 | 1.612161E-01 | 0.000000E+00 | 0.000000E+00 |
| 52 | 2.100944E-01 | -1.203599E-01 | 2.392713E-02 | 0.000000E+00 | 0.000000E+00 |
| 61 | -6.756521E-02 | 3.002643E-02 | -3.736559E-03 | 0.000000E+00 | 0.000000E+00 |
| 62 | 1.548964E-01 | -6.289677E-02 | 1.063288E-02 | 0.000000E+00 | 0.000000E+00 |
| 71 | 1.610209E-01 | -4.283541E-02 | 4.329980E-03 | 0.000000E+00 | 0.000000E+00 |
| 72 | 1.019494E-01 | -2.320175E-02 | 2.098949E-03 | 0.000000E+00 | 0.000000E+00 |
| 81 | 2.676584E-02 | -4.981491E-03 | 3.629424E-04 | 0.000000E+00 | 0.000000E+00 |
| 82 | -2.385030E-03 | 5.790018E-04 | -4.874224E-05 | 0.000000E+00 | 0.000000E+00 |
| 91 | -3.848145E-04 | 2.377658E-05 | -6.157552E-07 | 0.000000E+00 | 0.000000E+00 |
| 92 | -2.779203E-04 | 2.030787E-05 | -6.063289E-07 | 0.000000E+00 | 0.000000E+00 |

FIG. 45

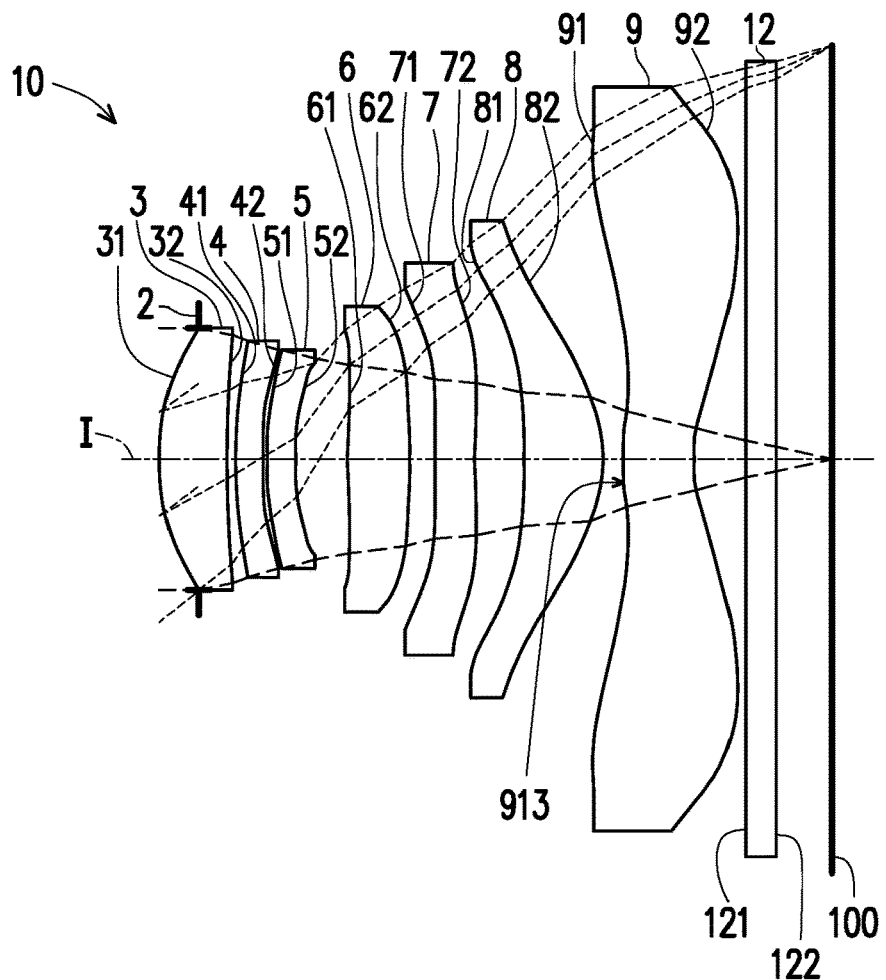
FIG. 46
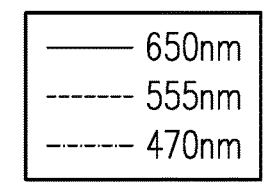
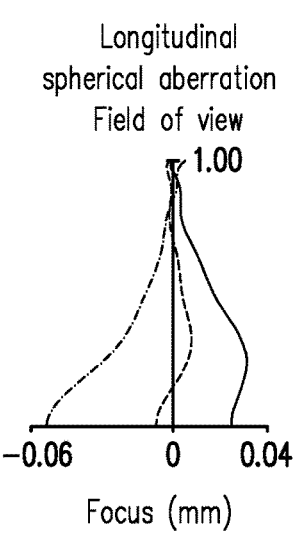
FIG. 47A
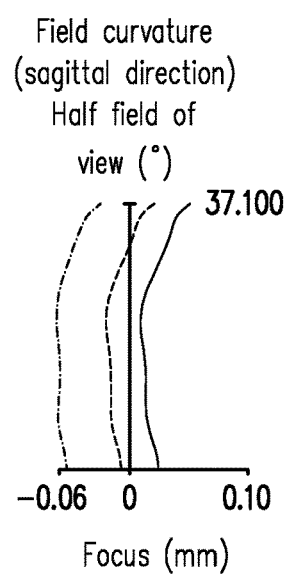
FIG. 47B
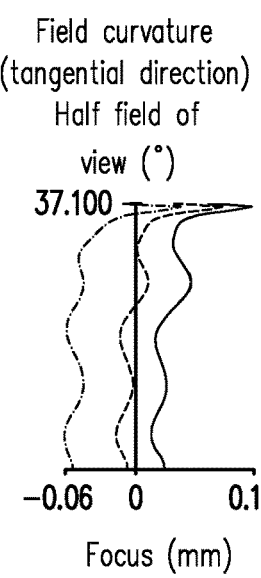
FIG. 47C
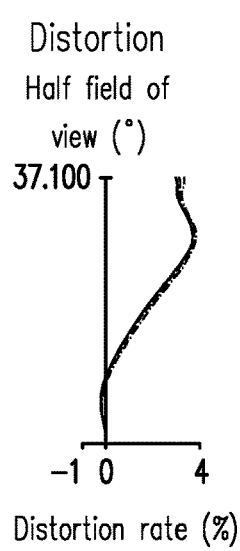
FIG. 47D

| Eleventh embodiment |||||||
|---|---|---|---|---|---|---|
| Effective focal length=4.262 mm, Half field of view (HFOV)=37.102°, Fno=2.000, System length=5.413 mm, Image Height=3.33 mm |||||||
| Lens element | Surface | Radius of curvature(mm) | Thickness(mm) | Refractive index | Abbe number | Focal length(mm) |
| Object | | Infinity | Infinity | | | |
| Aperture stop 2 | | Infinity | -0.312 | | | |
| First lens element 3 | Object-side surface 31 | 1.902 | 0.572 | 1.545 | 55.987 | 4.867 |
| | Image-side surface 32 | 5.977 | 0.042 | | | |
| Second lens element 4 | Object-side surface 41 | 2.712 | 0.215 | 1.661 | 20.412 | 14.208 |
| | Image-side surface 42 | 3.678 | 0.040 | | | |
| Third lens element 5 | Object-side surface 51 | 3.518 | 0.220 | 1.617 | 30.973 | -6.157 |
| | Image-side surface 52 | 1.787 | 0.432 | | | |
| Fourth lens element 6 | Object-side surface 61 | 14.349 | 0.494 | 1.535 | 55.690 | 12.215 |
| | Image-side surface 62 | -11.920 | 0.204 | | | |
| Fifth lens element 7 | Object-side surface 71 | 33.492 | 0.323 | 1.661 | 20.412 | -38.350 |
| | Image-side surface 72 | 14.449 | 0.404 | | | |
| Sixth lens element 8 | Object-side surface 81 | -3.923 | 0.626 | 1.545 | 55.987 | 2.765 |
| | Image-side surface 82 | -1.152 | 0.202 | | | |
| Seventh lens element 9 | Object-side surface 91 | 9.021 | 0.528 | 1.535 | 55.690 | -2.414 |
| | Image-side surface 92 | 1.109 | 0.422 | | | |
| Filter 12 | Object-side surface 121 | Infinity | 0.250 | 1.517 | 64.167 | |
| | Image-side surface 122 | Infinity | 0.438 | | | |
| | Image plane 100 | Infinity | | | | |

FIG. 48

| Surface | K | $a_4$ | $a_6$ | $a_8$ | $a_{10}$ |
|---|---|---|---|---|---|
| 31 | 9.296120E-02 | -9.162038E-03 | 4.043921E-02 | -1.197889E-01 | 2.042324E-01 |
| 32 | -6.892605E+00 | -2.549258E-01 | 5.359678E-01 | -7.981884E-01 | 8.603830E-01 |
| 41 | 2.296989E-01 | -2.080442E-01 | 3.651229E-01 | -5.658209E-01 | 6.346957E-01 |
| 42 | 7.679368E+00 | 1.083370E-01 | -2.904354E-01 | 6.245420E-01 | -1.157721E+00 |
| 51 | 6.195239E+00 | 9.542658E-03 | -1.448684E-01 | 5.601255E-01 | -1.253852E+00 |
| 52 | 3.532058E-02 | -1.135391E-01 | 9.709213E-02 | -2.421871E-04 | -1.376878E-01 |
| 61 | 6.315851E+01 | -2.942878E-02 | 2.436721E-03 | -4.352081E-02 | 6.162031E-02 |
| 62 | 3.122906E+01 | -3.131303E-02 | -7.624552E-02 | 1.585377E-01 | -2.134563E-01 |
| 71 | -2.400820E+03 | -3.568967E-02 | -2.162075E-01 | 3.476496E-01 | -3.119407E-01 |
| 72 | 7.386245E+01 | 6.151914E-03 | -2.330328E-01 | 3.020143E-01 | -2.282985E-01 |
| 81 | 7.040876E-01 | 9.771370E-02 | -1.771619E-01 | 1.399455E-01 | -7.595186E-02 |
| 82 | -3.747259E+00 | -1.238245E-02 | -2.570043E-02 | 1.550798E-02 | 1.339394E-03 |
| 91 | -1.853536E+02 | -1.066556E-01 | 5.700377E-02 | -1.763184E-02 | 3.384094E-03 |
| 92 | -6.368723E+00 | -6.030011E-02 | 2.823498E-02 | -9.608747E-03 | 2.080135E-03 |
| Surface | $a_{12}$ | $a_{14}$ | $a_{16}$ | $a_{18}$ | $a_{20}$ |
| 31 | -1.970466E-01 | 1.004306E-01 | -2.099136E-02 | 0.000000E+00 | 0.000000E+00 |
| 32 | -6.186833E-01 | 2.596694E-01 | -4.759979E-02 | 0.000000E+00 | 0.000000E+00 |
| 41 | -4.725009E-01 | 2.040194E-01 | -3.828573E-02 | 0.000000E+00 | 0.000000E+00 |
| 42 | 1.244185E+00 | -6.528214E-01 | 1.281002E-01 | 0.000000E+00 | 0.000000E+00 |
| 51 | 1.445562E+00 | -7.882438E-01 | 1.613938E-01 | 0.000000E+00 | 0.000000E+00 |
| 52 | 2.060172E-01 | -1.227521E-01 | 2.784371E-02 | 0.000000E+00 | 0.000000E+00 |
| 61 | -6.526339E-02 | 3.217273E-02 | -7.708427E-03 | 0.000000E+00 | 0.000000E+00 |
| 62 | 1.549598E-01 | -6.216058E-02 | 1.058546E-02 | 0.000000E+00 | 0.000000E+00 |
| 71 | 1.620772E-01 | -4.242710E-02 | 4.221653E-03 | 0.000000E+00 | 0.000000E+00 |
| 72 | 1.018625E-01 | -2.329754E-02 | 2.064307E-03 | 0.000000E+00 | 0.000000E+00 |
| 81 | 2.682484E-02 | -4.971081E-03 | 3.540391E-04 | 0.000000E+00 | 0.000000E+00 |
| 82 | -2.432919E-03 | 5.766398E-04 | -4.514455E-05 | 0.000000E+00 | 0.000000E+00 |
| 91 | -3.850145E-04 | 2.375728E-05 | -6.170552E-07 | 0.000000E+00 | 0.000000E+00 |
| 92 | -2.776603E-04 | 2.029871E-05 | -6.108879E-07 | 0.000000E+00 | 0.000000E+00 |

FIG. 49

| Conditional expression | First embodiment | Second embodiment | Third embodiment | Fourth embodiment | Fifth embodiment | Sixth embodiment |
|---|---|---|---|---|---|---|
| EFL | 4.32 | 4.33 | 4.26 | 4.27 | 4.30 | 4.27 |
| T1 | 0.68 | 0.57 | 0.70 | 0.68 | 0.62 | 0.58 |
| G12 | 0.04 | 0.04 | 0.04 | 0.04 | 0.04 | 0.04 |
| T2 | 0.21 | 0.21 | 0.20 | 0.21 | 0.21 | 0.24 |
| G23 | 0.05 | 0.04 | 0.06 | 0.05 | 0.05 | 0.03 |
| T3 | 0.22 | 0.21 | 0.21 | 0.21 | 0.21 | 0.21 |
| G34 | 0.39 | 0.43 | 0.28 | 0.35 | 0.53 | 0.45 |
| T4 | 0.39 | 1.00 | 0.44 | 0.42 | 0.45 | 0.63 |
| G45 | 0.32 | 0.05 | 0.30 | 0.35 | 0.05 | 0.38 |
| T5 | 0.24 | 0.22 | 0.22 | 0.25 | 0.23 | 0.22 |
| G56 | 0.17 | 0.57 | 0.16 | 0.15 | 0.52 | 0.20 |
| T6 | 0.76 | 0.43 | 0.92 | 0.81 | 0.53 | 0.58 |
| G67 | 0.16 | 0.15 | 0.18 | 0.20 | 0.10 | 0.07 |
| T7 | 0.80 | 0.52 | 0.67 | 0.66 | 0.59 | 0.68 |
| G7F | 0.28 | 0.35 | 0.29 | 0.28 | 0.56 | 0.60 |
| TF | 0.25 | 0.25 | 0.25 | 0.25 | 0.25 | 0.25 |
| GFP | 0.45 | 0.45 | 0.45 | 0.45 | 0.45 | 0.22 |
| BFL | 0.98 | 1.05 | 0.99 | 0.98 | 1.27 | 1.07 |
| ALT | 3.30 | 3.16 | 3.36 | 3.23 | 2.85 | 3.14 |
| AAG | 1.12 | 1.29 | 1.03 | 1.15 | 1.27 | 1.16 |
| TL | 4.42 | 4.45 | 4.39 | 4.38 | 4.12 | 4.30 |
| TTL | 5.40 | 5.50 | 5.38 | 5.36 | 5.39 | 5.37 |

FIG. 50

| Conditional expression | First embodiment | Second embodiment | Third embodiment | Fourth embodiment | Fifth embodiment | Sixth embodiment |
|---|---|---|---|---|---|---|
| V2 | 20.37 | 20.37 | 20.37 | 20.37 | 20.37 | 20.37 |
| TTL/(G34+BFL) | 3.95 | 3.71 | 4.23 | 4.02 | 3.00 | 3.55 |
| TL/(T4+G34) | 5.72 | 3.12 | 6.08 | 5.67 | 4.20 | 4.01 |
| AAG/(G34+G45) | 1.58 | 2.70 | 1.77 | 1.62 | 2.22 | 1.41 |
| ALT/(T1+G34) | 3.10 | 3.16 | 3.43 | 3.12 | 2.48 | 3.06 |
| EFL/(T1+T4+G34) | 2.97 | 2.17 | 3.00 | 2.94 | 2.68 | 2.58 |
| (T2+G23+T3)/G34 | 1.22 | 1.10 | 1.70 | 1.34 | 0.88 | 1.10 |
| (T5+T6+G67)/T1 | 1.71 | 1.40 | 1.90 | 1.84 | 1.37 | 1.50 |
| (T6+G67+T7)/(T1+T4) | 1.61 | 0.70 | 1.56 | 1.51 | 1.13 | 1.10 |
| V3 | 20.37 | 20.37 | 20.37 | 20.37 | 20.37 | 20.37 |
| TTL/(G56+BFL) | 4.71 | 3.39 | 4.67 | 4.75 | 3.02 | 4.23 |
| TL/(T4+G56) | 8.00 | 2.84 | 7.27 | 7.73 | 4.24 | 5.19 |
| AAG/(G45+G56) | 2.29 | 2.09 | 2.22 | 2.29 | 2.27 | 2.01 |
| ALT/(T1+G56) | 3.90 | 2.78 | 3.90 | 3.90 | 2.50 | 4.02 |
| EFL/(T1+T4+G56) | 3.50 | 2.03 | 3.27 | 3.43 | 2.70 | 3.03 |
| (T2+G23+T3)/G56 | 2.85 | 0.83 | 2.93 | 3.20 | 0.90 | 2.44 |
| (T5+T6+G67)/T4 | 3.00 | 0.80 | 3.00 | 2.99 | 1.88 | 1.38 |
| (T6+G67+T7)/(G34+G56) | 3.13 | 1.10 | 4.00 | 3.30 | 1.17 | 2.05 |

FIG. 51

| Conditional expression | Seventh embodiment | Eighth embodiment | Ninth embodiment | Tenth embodiment | Eleventh embodiment |
|---|---|---|---|---|---|
| EFL | 4.26 | 4.36 | 4.14 | 4.30 | 4.26 |
| T1 | 0.55 | 0.53 | 0.55 | 0.56 | 0.57 |
| G12 | 0.04 | 0.04 | 0.03 | 0.04 | 0.04 |
| T2 | 0.24 | 0.22 | 0.39 | 0.21 | 0.21 |
| G23 | 0.04 | 0.04 | 0.06 | 0.04 | 0.04 |
| T3 | 0.22 | 0.21 | 0.23 | 0.22 | 0.22 |
| G34 | 0.28 | 0.28 | 0.16 | 0.40 | 0.43 |
| T4 | 0.92 | 0.36 | 0.48 | 0.55 | 0.49 |
| G45 | 0.12 | 0.30 | 0.27 | 0.21 | 0.20 |
| T5 | 0.39 | 0.30 | 0.32 | 0.29 | 0.32 |
| G56 | 0.32 | 0.43 | 0.40 | 0.44 | 0.40 |
| T6 | 0.83 | 0.64 | 0.76 | 0.49 | 0.63 |
| G67 | 0.22 | 0.20 | 0.22 | 0.24 | 0.20 |
| T7 | 0.59 | 0.48 | 0.46 | 0.47 | 0.53 |
| G7F | 0.50 | 0.42 | 0.50 | 0.32 | 0.42 |
| TF | 0.25 | 0.25 | 0.25 | 0.25 | 0.25 |
| GFP | 0.10 | 0.52 | 0.16 | 0.53 | 0.44 |
| BFL | 0.85 | 1.20 | 0.91 | 1.10 | 1.11 |
| ALT | 3.73 | 2.74 | 3.19 | 2.80 | 2.98 |
| AAG | 1.02 | 1.29 | 1.14 | 1.37 | 1.32 |
| TL | 4.75 | 4.03 | 4.33 | 4.17 | 4.30 |
| TTL | 5.60 | 5.23 | 5.24 | 5.27 | 5.41 |

FIG. 52

| Conditional expression | Seventh embodiment | Eighth embodiment | Ninth embodiment | Tenth embodiment | Eleventh embodiment |
|---|---|---|---|---|---|
| V2 | 20.37 | 20.37 | 20.37 | 30.97 | 20.41 |
| TTL/(G34+BFL) | 4.99 | 3.54 | 4.92 | 3.51 | 3.51 |
| TL/(T4+G34) | 3.98 | 6.28 | 6.77 | 4.39 | 4.65 |
| AAG/(G34+G45) | 2.57 | 2.22 | 2.70 | 2.24 | 2.08 |
| ALT/(T1+G34) | 4.50 | 3.35 | 4.54 | 2.93 | 2.97 |
| EFL/(T1+T4+G34) | 2.44 | 3.70 | 3.49 | 2.85 | 2.85 |
| (T2+G23+T3)/G34 | 1.80 | 1.67 | 4.40 | 1.22 | 1.10 |
| (T5+T6+G67)/T1 | 2.60 | 2.13 | 2.38 | 1.82 | 2.01 |
| (T6+G67+T7)/(T1+T4) | 1.12 | 1.47 | 1.40 | 1.08 | 1.27 |
| V3 | 20.37 | 20.37 | 20.37 | 20.41 | 30.97 |
| TTL/(G56+BFL) | 4.78 | 3.21 | 4.01 | 3.42 | 3.58 |
| TL/(T4+G56) | 3.83 | 5.09 | 4.92 | 4.21 | 4.79 |
| AAG/(G45+G56) | 2.30 | 1.77 | 1.72 | 2.10 | 2.18 |
| ALT/(T1+G56) | 4.25 | 2.83 | 3.38 | 2.81 | 3.05 |
| EFL/(T1+T4+G56) | 2.37 | 3.28 | 2.90 | 2.78 | 2.90 |
| (T2+G23+T3)/G56 | 1.53 | 1.09 | 1.72 | 1.11 | 1.18 |
| (T5+T6+G67)/T4 | 1.57 | 3.16 | 2.70 | 1.84 | 2.33 |
| (T6+G67+T7)/(G34+G56) | 2.73 | 1.84 | 2.61 | 1.45 | 1.62 |

FIG. 53

OPTICAL IMAGING LENS

CROSS-REFERENCE TO RELATED APPLICATION

This application is a continuation application of and claims the priority benefit of U.S. patent application Ser. No. 15/441,259, filed on Feb. 24, 2017, now allowed, which claims the priority benefit of China application serial no. 201611253471.9, filed on Dec. 30, 2016. The entirety of each of the above-mentioned patent applications is hereby incorporated by reference herein and made a part of this specification.

BACKGROUND OF THE INVENTION

1. Field of the Invention

The present invention relates to an optical lens, and in particular, to an optical imaging lens.

2. Description of Related Art

In recent years, as use of portable electronic devices (e.g., mobile phones and digital cameras) becomes ubiquitous, techniques related to producing image modules have also been developed significantly, wherein the image module mainly includes an optical imaging lens, a module holder unit and a sensor, and the demand for minimized image module increases due to the compact and slim design of mobile phones and digital cameras. Moreover, as dimensions of a charged coupled device (CCD) and complementary metal-oxide semiconductor (CMOS) are reduced and significant progress is made in related technology, the length of optical imaging lens in the image module is correspondingly reduced. However, in order to avoid reduction in optical performance and quality, good optical properties should also be achieved while the length of optical imaging lens is shortened. Image quality and image volume are two of the most important characteristics for an optical imaging lens.

On the other hand, the specification of portable electronic products (such as cell phone, cameras, tablet PC, personal digital assistant, photographic device used in car, etc.) is ever-changing, and the key components, i.e. optical imaging lens, is also developed diversely. In addition to improvement of image quality, a larger aperture stop and a larger field of view are prior development items of an optical imaging lens.

However, a minimized optical imaging lens that has good image quality cannot be made by purely scaling down a lens that has good image quality; the design process involves material characteristics, and actual problems on the aspect of production, such as manufacturing and assembling yields must be considered. In terms of the lens structure having seven lens elements, how to produce an optical imaging lens that meets requirements of consumer electronic products and has an improved image quality, an excellent field of view, a large aperture stop, and a shortened length is always a goal in the industry and academy.

SUMMARY OF THE INVENTION

The invention provides an optical imaging lens having good and stable image quality while the length of lens system is shortened.

An embodiment of the invention provides an optical imaging lens including a first lens element, a second lens element, a third lens element, a fourth lens element, a fifth lens element, a sixth lens element, and a seventh lens element arranged in sequence from an object side to an image side along an optical axis, and each of the first lens element to the seventh lens element includes an object-side surface that faces the object side and allows imaging rays to pass through and an image-side surface that faces the image side and allows the imaging rays to pass through. The object-side surface of the second lens element has a convex portion in a vicinity of the optical axis; the third lens element has negative refracting power, and the object-side surface of the third lens element has a convex portion in a vicinity of the optical axis; the image-side surface of the fourth lens element has a convex portion in a vicinity of the optical axis; the fifth lens element has negative refracting power; the seventh lens element has negative refracting power, and the object-side surface of the seventh lens element has a convex portion in a vicinity of the optical axis; and wherein the optical imaging lens satisfies: V1>V2+V5, V1 is an Abbe number of the first lens element, V2 is an Abbe number of the second lens element, and V5 is an Abbe number of the fifth lens element.

An embodiment of the invention provides an optical imaging lens including a first lens element, a second lens element, a third lens element, a fourth lens element, a fifth lens element, a sixth lens element, and a seventh lens element arranged in sequence from an object side to an image side along an optical axis, and each of the first lens element to the seventh lens element includes an object-side surface that faces the object side and allows imaging rays to pass through and an image-side surface that faces the image side and allows the imaging rays to pass through. The third lens element has negative refracting power; the image-side surface of the fourth lens element has a convex portion in a vicinity of the optical axis; the sixth lens element has positive refracting power, and the object-side surface of the seventh lens element has a convex portion in a vicinity of a periphery of the seventh lens element; and wherein the optical imaging lens satisfies: V1>V2+V5, V1 is an Abbe number of the first lens element, V2 is an Abbe number of the second lens element, and V5 is an Abbe number of the fifth lens element.

An embodiment of the invention provides an optical imaging lens including a first lens element, a second lens element, a third lens element, a fourth lens element, a fifth lens element, a sixth lens element, and a seventh lens element arranged in sequence from an object side to an image side along an optical axis, and each of the first lens element to the seventh lens element includes an object-side surface that faces the object side and allows imaging rays to pass through and an image-side surface that faces the image side and allows the imaging rays to pass through. The image-side surface of the first lens element has a concave portion in a vicinity of the optical axis; the third lens element has negative refracting power; the sixth lens element has positive refracting power; and the object-side surface of the seventh lens element has a convex portion in a vicinity of a periphery of the seventh lens element; and wherein the optical imaging lens satisfies: V1>V2+V5, V1 is an Abbe number of the first lens element, V2 is an Abbe number of the second lens element, and V5 is an Abbe number of the fifth lens element.

Based on the above, in the embodiments of the invention, the optical imaging lens can bring the following advantageous effect: by means of the concave and convex shape design and arrangement of the object-side surfaces or image-side surfaces of the foregoing lens elements, the optical imaging lens has an excellent field of view and a large aperture stop while the length of lens system is shortened. In addition, the optical imaging lens has good optical performance and provides good image quality, and it is not difficult to design and process the optical imaging lens.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a schematic view illustrating a surface structure of a lens element.

FIG. 2 is a schematic view illustrating a concave and convex surface structure of a lens element and a ray focal point.

FIG. 3 is a schematic view illustrating a surface structure of a lens element according to a first example.

FIG. 4 is a schematic view illustrating a surface structure of a lens element according to a second example.

FIG. 5 is a schematic view illustrating a surface structure of a lens element according to a third example.

FIG. 6 is a schematic view illustrating an optical imaging lens according to a first embodiment of the invention.

FIGS. 7A to 7D are diagrams illustrating longitudinal spherical aberration and other aberrations of the optical imaging lens according to the first embodiment of the invention.

FIG. 8 shows detailed optical data pertaining to the optical imaging lens according to the first embodiment of the invention.

FIG. 9 shows aspheric parameters pertaining to the optical imaging lens according to the first embodiment of the invention.

FIG. 10 is a schematic view illustrating an optical imaging lens according to a second embodiment of the invention.

FIGS. 11A to 11D are diagrams illustrating longitudinal spherical aberration and other aberrations of the optical imaging lens according to the second embodiment of the invention.

FIG. 12 shows detailed optical data pertaining to the optical imaging lens according to the second embodiment of the invention.

FIG. 13 shows aspheric parameters pertaining to the optical imaging lens according to the second embodiment of the invention.

FIG. 14 is a schematic view illustrating an optical imaging lens according to a third embodiment of the invention.

FIGS. 15A to 15D are diagrams illustrating longitudinal spherical aberration and other aberrations of the optical imaging lens according to the third embodiment of the invention.

FIG. 16 shows detailed optical data pertaining to the optical imaging lens according to the third embodiment of the invention.

FIG. 17 shows aspheric parameters pertaining to the optical imaging lens according to the third embodiment of the invention.

FIG. 18 is a schematic view illustrating an optical imaging lens according to a fourth embodiment of the invention.

FIGS. 19A to 19D are diagrams illustrating longitudinal spherical aberration and other aberrations of the optical imaging lens according to the fourth embodiment of the invention.

FIG. 20 shows detailed optical data pertaining to the optical imaging lens according to the fourth embodiment of the invention.

FIG. 21 shows aspheric parameters pertaining to the optical imaging lens according to the fourth embodiment of the invention.

FIG. 24 shows detailed optical data pertaining to the optical imaging lens according to the fifth embodiment of the invention.

FIG. 25 shows aspheric parameters pertaining to the optical imaging lens according to the fifth embodiment of the invention.

FIG. 26 is a schematic view illustrating an optical imaging lens according to a sixth embodiment of the invention.

FIGS. 27A to 27D are diagrams illustrating longitudinal spherical aberration and other aberrations of the optical imaging lens according to the sixth embodiment of the invention.

FIG. 28 shows detailed optical data pertaining to the optical imaging lens according to the sixth embodiment of the invention.

FIG. 29 shows aspheric parameters pertaining to the optical imaging lens according to the sixth embodiment of the invention.

FIG. 30 is a schematic view illustrating an optical imaging lens according to a seventh embodiment of the invention.

FIGS. 31A to 31D are diagrams illustrating longitudinal spherical aberration and other aberrations of the optical imaging lens according to the seventh embodiment of the invention.

FIG. 32 shows detailed optical data pertaining to the optical imaging lens according to the seventh embodiment of the invention.

FIG. 33 shows aspheric parameters pertaining to the optical imaging lens according to the seventh embodiment of the invention.

FIG. 34 is a schematic view illustrating an optical imaging lens according to an eighth embodiment of the invention.

FIGS. 35A to 35D are diagrams illustrating longitudinal spherical aberration and other aberrations of the optical imaging lens according to the eighth embodiment of the invention.

FIG. 36 shows detailed optical data pertaining to the optical imaging lens according to the eighth embodiment of the invention.

FIG. 37 shows aspheric parameters pertaining to the optical imaging lens according to the eighth embodiment of the invention.

FIG. 40 shows detailed optical data pertaining to the optical imaging lens according to the ninth embodiment of the invention.

FIG. 41 shows aspheric parameters pertaining to the optical imaging lens according to the ninth embodiment of the invention.

FIG. 42 is a schematic view illustrating an optical imaging lens according to a tenth embodiment of the invention.

FIGS. 43A to 43D are diagrams illustrating longitudinal spherical aberration and other aberrations of the optical imaging lens according to the tenth embodiment of the invention.

FIG. 44 shows detailed optical data pertaining to the optical imaging lens according to the tenth embodiment of the invention.

FIG. 45 shows aspheric parameters pertaining to the optical imaging lens according to the tenth embodiment of the invention.

FIG. 46 is a schematic view illustrating an optical imaging lens according to an eleventh embodiment of the invention.

FIGS. 47A to 47D are diagrams illustrating longitudinal spherical aberration and other aberrations of the optical imaging lens according to the eleventh embodiment of the invention.

FIG. 48 shows detailed optical data pertaining to the optical imaging lens according to the eleventh embodiment of the invention.

FIG. 49 shows aspheric parameters pertaining to the optical imaging lens according to the eleventh embodiment of the invention.

FIGS. 50 and 51 show important parameters and relation values thereof pertaining to the optical imaging lens according to the first through the sixth embodiments of the invention.

FIGS. 52 and 53 show important parameters and relation values thereof pertaining to the optical imaging lens according to the seventh through the eleventh embodiments of the invention.

DESCRIPTION OF THE EMBODIMENTS

Figure 22:
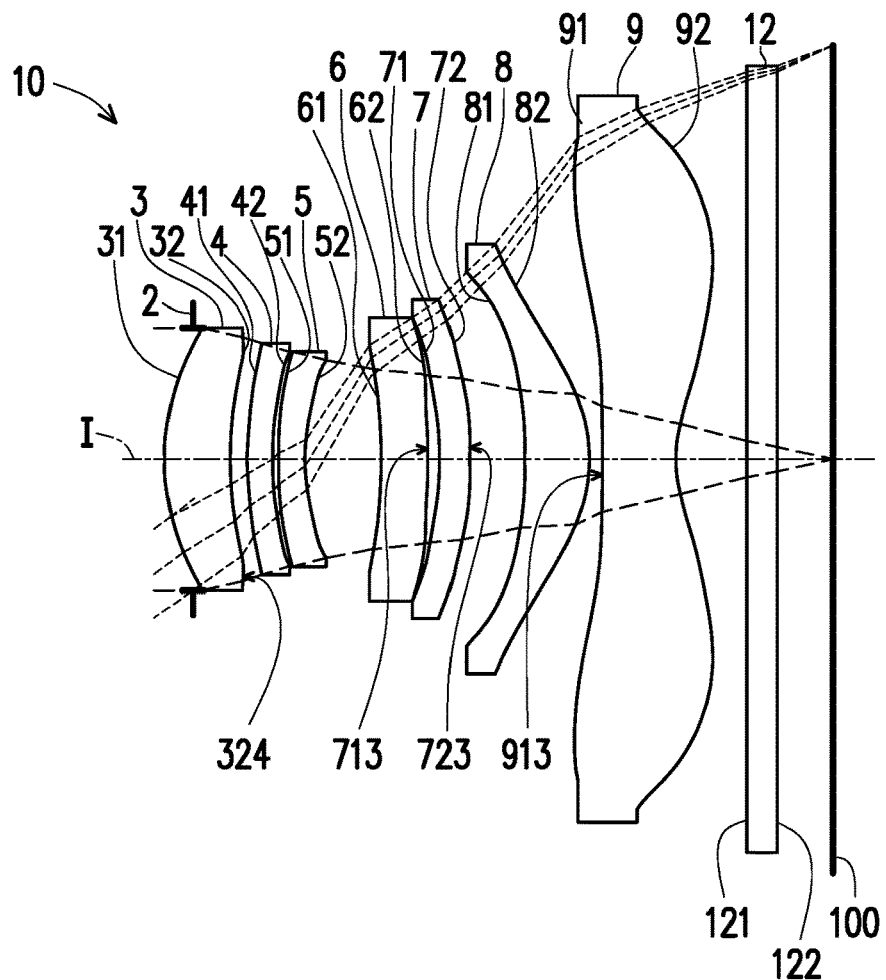
FIG. 22 is a schematic view illustrating an optical imaging lens according to a fifth embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

In the present specification, the description "a lens element having positive refracting power (or negative refracting power)" means that the paraxial refracting power of the lens element in Gaussian optics is positive (or negative). The description "An object-side (or image-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted. The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

FIG. 1 is a radial cross-sectional view of a lens element. Before determining boundaries of those aforesaid portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value which is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

For none transition point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Referring to the first example depicted in FIG. 3, only one transition point, namely a first transition point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to the R value at the image-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 4, a first transition point and a second transition point exist on the object-side surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the object-side surface of the lens element is positive. The portion in a vicinity of a periphery of the lens element (portion III) has a convex shape. What is more, there is another portion having a concave shape existing between the first and second transition point (portion II).

Referring to a third example depicted in FIG. 5, no transition point exists on the object-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

FIG. 6 is a schematic view illustrating an optical imaging lens according to a first embodiment of the invention, and FIGS. 7A to 7D are diagrams illustrating longitudinal spherical aberration and other aberrations of the optical imaging lens according to the first embodiment of the invention. Referring to FIG. 6 first, an optical imaging lens 10 in the first embodiment of the invention includes an aperture stop 2, a first lens element 3, a second lens element 4, a third lens element 5, a fourth lens element 6, a fifth lens element 7, a sixth lens element 8, a seventh lens element 9, and a filter 12 arranged in sequence from an object side to an image side along an optical axis I of the optical imaging lens 10. When rays emitted from an object to be shot enter the optical imaging lens 10, the rays pass through the aperture stop 2, the first lens element 3, the second lens element 4, the third lens element 5, the fourth lens element 6, the fifth lens element 7, the sixth lens element 8, the seventh lens element 9, and the filter 12, so as to form an image on an image plane 100. The filter 12, for example, is an IR cut filter, and is configured to preventing infrared rays on some wavebands in the rays from being transmitted to the image plane 100 and affecting image quality. It should be added that the object side is a side facing the object to be shot, and the image side is a side facing the image plane 100.

The first lens element 3, the second lens element 4, the third lens element 5, the fourth lens element 6, the fifth lens element 7, the sixth lens element 8, the seventh lens element 9, and the filter 12 respectively have object-side surfaces 31, 41, 51, 61, 71, 81, 91, and 121 facing the object side and allowing imaging rays to pass through, and respectively have image-side surfaces 32, 42, 52, 62, 72, 82, 92, and 122 facing the image side and allowing the imaging rays to pass through.

In addition, to satisfy light-weight requirements of products, the first lens element 3 through the seventh lens element 9 all have refracting power and are made of plastic materials. However, the invention provides no limitation to the materials of the first lens element 3 through the seventh lens element 9.

The first lens element 3 has positive refracting power. The object-side surface 31 of the first lens element 3 is a convex surface, and has a convex portion 311 in a vicinity of the optical axis I and a convex portion 312 in a vicinity of a periphery of the first lens element 3. The image-side surface 32 of the first lens element 3 is a concave surface, and has a concave portion 321 in a vicinity of the optical axis I and a concave portion 322 in a vicinity of a periphery of the first lens element 3. In the present embodiment, the object-side surface 31 and the image-side surface 32 of the first lens element 3 are both aspheric surfaces.

The second lens element 4 has positive refracting power. The object-side surface 41 of the second lens element 4 is a convex surface, has a convex portion 411 in a vicinity of the optical axis I and a convex portion 412 in a vicinity of a periphery of the second lens element 4. The image-side surface 42 of the second lens element 4 is a concave surface, and has a concave portion 421 in a vicinity of the optical axis I and a concave portion 422 in a vicinity of a periphery of the second lens element 4. In the present embodiment, the object-side surface 41 and the image-side surface 42 of the second lens element 4 are both aspheric surfaces.

The third lens element 5 has negative refracting power. The object-side surface 51 of the third lens element 5 is a convex surface, has a convex portion 511 in a vicinity of the optical axis I and a convex portion 512 in a vicinity of a periphery of the third lens element 5. The object-side surface 52 of the third lens element 5 is a concave surface, and has a concave portion 521 in a vicinity of the optical axis I and a concave portion 522 in a vicinity of a periphery of the third lens element 5. In the present embodiment, the object-side surface 51 and the image-side surface 52 of the third lens element 5 are both aspheric surfaces.

The fourth lens element 6 has positive refracting power. The object-side surface 61 of the fourth lens element 6 has a convex portion 611 in a vicinity of the optical axis I and a concave portion 612 in a vicinity of a periphery of the fourth lens element 6. The image-side surface 62 of the fourth lens element 6 is a convex surface, and has a convex portion 621 in a vicinity of the optical axis I and a convex portion 622 in a vicinity of a periphery of the fourth lens element 6. In the present embodiment, the object-side surface 61 and the image-side surface 62 of the fourth lens element 6 are both aspheric surfaces.

The fifth lens element 7 has negative refracting power. The object-side surface 71 of the fifth lens element 7 has a convex portion 711 in a vicinity of the optical axis I and a concave portion 712 in a vicinity of a periphery of the fifth lens element 7. The image-side surface 72 of the fifth lens element 7 has a concave portion 721 in a vicinity of the optical axis I and a convex portion 722 in a vicinity of a periphery of the fifth lens element 7. In the present embodiment, the object-side surface 71 and the image-side surface 72 of the fifth lens element 7 are both aspheric surfaces.

The sixth lens element 8 has positive refracting power. The object-side surface 81 of the sixth lens element 8 is a concave surface, and has a concave portion 811 in a vicinity of the optical axis I and a concave portion 812 in a vicinity of a periphery of the sixth lens element 8. The image-side surface 82 of the sixth lens element 8 is a convex surface, and has a convex portion 821 in a vicinity of the optical axis I and a convex portion 822 in a vicinity of a periphery of the sixth lens element 8. In the present embodiment, the object-side surface 81 and the image-side surface 82 of the sixth lens element 8 are both aspheric surfaces.

The seventh lens element 9 has negative refracting power. The object-side surface 91 of the seventh lens element 9 has a concave portion 911 in a vicinity of the optical axis I and a convex portion 912 in a vicinity of a periphery of the seventh lens element 9. The image-side surface 92 of the seventh lens element 9 has a concave portion 921 in a vicinity of the optical axis I and a convex portion 922 in a vicinity of a periphery of the seventh lens element 9. In the present embodiment, the object-side surface 91 and the image-side surface 92 of the seventh lens element 9 are both aspheric surfaces.

The detailed optical data in the first embodiment is described in FIG. 8. In the first embodiment, the effective focal length (EFL) of the total system (i.e. the whole optical imaging lens 10) is 4.319 mm, the half field of view (HFOV) thereof is 37.645°, the f-number (Fno) thereof is 2.001, the system length of the total system is 5.405 mm, and the image height is 3.33 mm. Wherein, the system length refers to a distance from the object-side surface 31 of the first lens element 3 to the image plane 100 along the optical axis I.

In addition, in the embodiment, a total of fourteen surfaces, namely the object-side surfaces 31, 41, 51, 61, 71, 81, 91 and the image-side surfaces 32, 42, 52, 62, 72, 82 and 92 of the first lens element 3, the second lens element 4, the third lens element 5, the fourth lens element 6, the fifth lens element 7, the sixth lens element 8, and the seventh lens element 9 are aspheric surfaces. The aspheric surfaces are defined by the following formula.

$$Z(Y) = \frac{Y^2}{R} / \left(1 + \sqrt{1 - (1+K)\frac{Y^2}{R^2}}\right) + \sum_{i=1}^{n} a_i \times Y^i \quad (1)$$

wherein:

Y: a distance from a point on an aspheric curve to the optical axis I;

Z: depth of the aspheric surface (i.e. a perpendicular distance between the point on the aspheric surface that is spaced by the distance Y from the optical axis I and a tangent plane tangent to a vertex of the aspheric surface on the optical axis I);

R: radius of curvature of the surface of the lens element near the optical axis I;

K: conic constant;

$a_i$: ith aspheric coefficient.

The aspheric coefficients of the object-side surface 31 of the first lens element 3 through the image-side surface 92 of the seventh lens element 9 in the formula (1) are shown in FIG. 9. Wherein the column reference number 31 in FIG. 9 represents the aspheric coefficient of the object-side surface 31 of the first lens element 3 and so forth.

In addition, the relations among important parameters pertaining to the optical imaging lens 10 in the first embodiment are shown in FIGS. 50 and 51.

Wherein,

EFL represents an effective focal length of the optical imaging lens 10;

T1 represents a thickness of the first lens element 3 along the optical axis I;

T2 represents a thickness of the second lens element 4 along the optical axis I;

T3 represents a thickness of the third lens element 5 along the optical axis I;

T4 represents a thickness of the fourth lens element 6 along the optical axis I;

T5 represents a thickness of the fifth lens element 7 along the optical axis I;

T6 represents a thickness of the sixth lens element 8 along the optical axis I;

T7 represents a thickness of the seventh lens element 9 along the optical axis I;

G12 represents an air gap from the first lens element 3 to the second lens element 4 along the optical axis I (namely, the distance from the image-side surface 32 of the first lens element 3 to the object-side surface 41 of the second lens element 4 along the optical axis I);

G23 represents an air gap from the second lens element 4 to the third lens element 5 along the optical axis I (namely, the distance from the image-side surface 42 of the second lens element 4 to the object-side surface 51 of the third lens element 5 along the optical axis I);

G34 represents an air gap from the third lens element 5 to the fourth lens element 6 along the optical axis I (namely, the distance from the image-side surface 52 of the third lens element 5 to the object-side surface 61 of the fourth lens element 6 along the optical axis I);

G45 represents an air gap from the fourth lens element 6 to the fifth lens element 7 along the optical axis I (namely, the distance from the image-side surface 62 of the fourth lens element 6 to the object-side surface 71 of the fifth lens element 7 along the optical axis I);

G56 represents an air gap from the fifth lens element 7 to the sixth lens element 8 along the optical axis I (namely, the distance from the image-side surface 72 of the fifth lens element 7 to the object-side surface 81 of the sixth lens element 8 along the optical axis I);

G67 represents an air gap from the sixth lens element 8 to the seventh lens element 9 along the optical axis I (namely, the distance from the image-side surface 82 of the sixth lens element 8 to the object-side surface 91 of the seventh lens element 9 along the optical axis I);

G7F is an air gap from the seventh lens element 9 to the filter 12 along the optical axis I (namely, the distance from the image-side surface 92 of the seventh lens element 9 to the object-side surface 121 of the filter 12 along the optical axis I);

TF represents a thickness of the filter 12 along the optical axis I;

GFP represents an air gap from the filter 12 to the image plane 100 along the optical axis I (namely, the distance from the image-side surface 122 of the filter 12 to the image plane 100 along the optical axis I);

TTL represents a distance from the object-side surface 31 of the first lens element 3 to the image plane 100 along the optical axis I, namely, the system length of the optical imaging lens 10;

BFL represents a distance from the image-side surface 92 of the seventh lens element 9 to the image plane 100 along the optical axis I;

ALT represents a sum of thicknesses of the first lens element 3, the second lens element 4, the third lens element 5, the fourth lens element 6, the fifth lens element 7, the sixth lens element 8, and the seventh lens element 9 along the optical axis I, namely, a sum of T1, T2, T3, T4, T5, T6, and T7;

AAG represents a sum of six air gaps from the first lens element 3 to the seventh lens element 9 along the optical axis I, namely, a sum of G12, G23, G34, G45, G56, and G67; and TL is the distance from the object-side surface 31 of the first lens element 3 to the image-side surface 92 of the seventh lens element 9 along the optical axis I.

In addition, it is defined that:

f1 is a focal length of the first lens element 3;
f2 is a focal length of the second lens element 4;
f3 is a focal length of the third lens element 5;
f4 is a focal length of the fourth lens element 6;
f5 is a focal length of the fifth lens element 7;
f6 is a focal length of the sixth lens element 8;
f7 is a focal length of the seventh lens element 9;
n1 is a refractive index of the first lens element 3;
n2 is a refractive index of the second lens element 4;
n3 is a refractive index of the third lens element 5;
n4 is a refractive index of the fourth lens element 6;
n5 is a refractive index of the fifth lens element 7;
n6 is a refractive index of the sixth lens element 8;
n7 is a refractive index of the seventh lens element 9;
V1 is an Abbe number of the first lens element 3;
V2 is an Abbe number of the second lens element 4;
V3 is an Abbe number of the third lens element 5;
V4 is an Abbe number of the fourth lens element 6;
V5 is an Abbe number of the fifth lens element 7;
V6 is an Abbe number of the sixth lens element 8; and
V7 is an Abbe number of the seventh lens element 9.

Further referring to FIGS. 7A to 7D, FIG. 7A illustrates the longitudinal spherical aberration of the first embodiment, FIGS. 7B to 7C are diagrams respectively illustrating field curvature aberration regarding sagittal direction on the image plane 100 and field curvature aberration regarding the tangential direction on the image plane 100 in the first embodiment, and FIG. 7D is a diagram illustrating distortion aberration on the image plane 100 in the first embodiment. The longitudinal spherical aberration of the first embodiment shown in FIG. 7A is simulated in the condition that the pupil radius is 1.0650 mm. Otherwise, in FIG. 7A which describes the longitudinal spherical aberration in the first embodiment, the curve of each wavelength is close to one another and near the middle position, which shows that the off-axis ray of each wavelength at different heights are focused near the imaging point. The skew margin of the curve of each wavelength shows that the imaging point deviation of the off-axis ray at different heights is controlled within ±0.033 mm. Accordingly, it is evident that the embodiment can significantly improve the spherical aberration of the same wavelength. In addition, the curves of red, green, and blue representative wavelengths are close to one another, which represents that the imaging positions of the rays with different wavelengths are concentrated, therefore, the chromatic aberration can be significantly improved.

In FIGS. 7B and 7C which illustrate two diagrams of field curvature aberration, the focal length variation of the three representative wavelengths in the entire field of view falls within ±0.35 mm, which represents that the optical system in the first embodiment can effectively eliminate aberration. In FIG. 7D, the diagram of distortion aberration shows that the distortion aberration in the first embodiment can be maintained within ±0.7%, which shows that the distortion aberration in the first embodiment can meet the image quality requirement of the optical system. Based on the above, it is shown that the first embodiment can provide better image quality compared with existing optical lens under the condition where the system length of the optical lens is shortened to about 5.405 mm. Therefore, a length of the optical imaging lens of the first embodiment can be shortened to realize slim design of product while broadening a shooting angle and having a large aperture stop. In addition, the optical imaging lens has good optical performance and can provide good image quality.

FIG. 10 is a schematic view illustrating an optical imaging lens according to a second embodiment of the invention, FIGS. 11A to 11D are diagrams illustrating longitudinal spherical aberration and other aberrations of the optical imaging lens according to the second embodiment of the invention. Referring to FIG. 10 first, the second embodiment of the optical imaging lens 10 of the invention is similar to the first embodiment, and the difference lies in optical data, aspheric coefficients and the parameters of the lens elements 3, 4, 5, 6, 7, 8, and 9. In the second embodiment, the object-side surface 61 of the fourth lens element 6 is a concave surface, and has a concave portion 613 in a vicinity of the optical axis I and a concave portion 612 in a vicinity of a periphery of the fourth lens element 6. The object-side surface 91 of the seventh lens element 9 is a convex surface, and has a convex portion 913 in a vicinity of the optical axis I and a convex portion 912 in a vicinity of a periphery of the seventh lens element 9. It should be noted that, in order to show the view clearly, some numerals which are the same as those used for the concave portion and convex portion in the first embodiment are omitted in FIG. 10.

The detailed optical data pertaining to the optical imaging lens 10 is shown in FIG. 12, and the effective focal length of the total system in the second embodiment is 4.329 mm, the HFOV thereof is 37.497°, Fno thereof is 2.000, the system length thereof is 5.501 mm, and the image height is 3.32 mm.

FIG. 13 shows the aspheric coefficients used in the formula (1) of the object-side surface 31 of the first lens element 3 through the image-side surface 92 of the seventh lens element 9 in the second embodiment.

In addition, the relations among important parameters pertaining to the optical imaging lens 10 in the second embodiment are shown in FIGS. 50 and 51.

The longitudinal spherical aberration of the second embodiment shown in FIG. 11A is simulated in the condition that the pupil radius is 1.0650 mm. According to the longitudinal spherical aberration diagram of the second embodiment shown in FIG. 11A, a deviation of the imaging points of the off-axis rays of different heights is controlled within a range of ±0.036 mm. According to the two field curvature aberration diagrams of FIG. 11B and FIG. 11C, a focal length variation of the three representative wavelengths in the whole field of view falls within ±0.35 mm. According to the distortion aberration diagram of FIG. 11D, a distortion aberration of the second embodiment is maintained within the range of ±3.5%. Therefore, compared to the existing optical lens, the second embodiment may also achieve the good optical performance under a condition that the system length is reduced to about 5.501 mm.

According to the above description, compared to the first embodiment, the advantages of the second embodiment are as follows: the Fno of the second embodiment is smaller than that of the first embodiment, that is, the aperture stop of the second embodiment is greater than that of the first embodiment; and the range of field curvature aberration regarding the sagittal direction in the second embodiment is smaller than the range of field curvature aberration regarding the sagittal direction in the first embodiment. In addition, differences between thicknesses of the lens elements in the second embodiment in a vicinity of the optical axis and thicknesses of the lens elements in the second embodiment in a vicinity of a periphery of the lens elements of the second embodiment are smaller than those of the first embodiment. The optical imaging lens of the second embodiment is easier to be fabricated compared to that of the first embodiment, so that a production yield is relatively high.

FIG. 14 is a schematic view illustrating an optical imaging lens according to a third embodiment of the invention, FIGS. 15A to 15D are diagrams illustrating longitudinal spherical aberration and other aberrations of the optical imaging lens according to the third embodiment of the invention. Referring to FIG. 14 first, the third embodiment of the optical imaging lens 10 of the invention is similar to the first embodiment, and the difference lies in optical data, aspheric coefficients and the parameters of the lens elements 3, 4, 5, 6, 7, 8, and 9. In the third embodiment, the image-side surface 62 of the fourth lens element 6 has a concave portion 623 in a vicinity of the optical axis I and a convex portion 622 in a vicinity of a periphery of the fourth lens element 6. It should be noted that, in order to show the view clearly, some numerals which are the same as those used for the concave portion and convex portion in the first embodiment are omitted in FIG. 14.

The detailed optical data pertaining to the optical imaging lens 10 is shown in FIG. 16, and the effective focal length of the total system in the third embodiment is 4.260 mm, the HFOV thereof is 37.098°, the Fno thereof is 1.994, the system length thereof is 5.383 mm, and the image height is 3.33 mm.

FIG. 17 shows the aspheric coefficients used in the formula (1) of the object-side surface 31 of the first lens element 3 through the image-side surface 92 of the seventh lens element 9 in the third embodiment.

In addition, the relations among important parameters pertaining to the optical imaging lens 10 in the third embodiment are shown in FIGS. 50 and 51.

The longitudinal spherical aberration of the third embodiment shown in FIG. 15A is simulated in the condition that the pupil radius is 1.0650 mm. According to the longitudinal spherical aberration diagram of the third embodiment shown in FIG. 15A, a deviation of the imaging points of the off-axis rays of different heights is controlled within a range of ±0.031 mm. According to the two field curvature aberration diagrams of FIG. 15B and FIG. 15C, a focal length variation of the three representative wavelengths in the whole field of view falls within ±0.12 mm. According to the distortion aberration diagram of FIG. 15D, a distortion aberration of the third embodiment is maintained within the range of ±3.5%. Therefore, compared to the existing optical lens, the third embodiment may also achieve the good optical performance under a condition that the system length is reduced to about 5.383 mm.

According to the above description, compared to the first embodiment, the advantages of the third embodiment are as follows: the system length of the third embodiment is shorter than the system length of the first embodiment; the Fno of the third embodiment is smaller than that of the first embodiment, that is, the aperture stop of the third embodiment is greater than that of the first embodiment; a range of the longitudinal spherical aberration of the third embodiment is less than that of the first embodiment; the range of field curvature aberration regarding the sagittal direction in the third embodiment is smaller than the range of field curvature aberration regarding the sagittal direction in the first embodiment; and the range of field curvature aberration regarding the tangential direction in the third embodiment is smaller than the range of field curvature aberration regarding the tangential direction in the first embodiment. In addition, differences between thicknesses of the lens elements in the third embodiment in a vicinity of the optical axis and thicknesses of the lens elements in the third embodiment in a vicinity of a periphery of the lens elements of the third embodiment are smaller than those of the first embodiment. The optical imaging lens of the third embodiment is easier to be fabricated compared to that of the first embodiment, so that a production yield is relatively high.

FIG. 18 is a schematic view illustrating an optical imaging lens according to a fourth embodiment of the invention, FIGS. 19A to 19D are diagrams illustrating longitudinal spherical aberration and other aberrations of the optical imaging lens according to the fourth embodiment of the invention. Referring to FIG. 18 first, the fourth embodiment of the optical imaging lens 10 of the invention is similar to the first embodiment, and the difference lies in optical data, aspheric coefficients and the parameters of the lens elements 3, 4, 5, 6, 7, 8, and 9. It should be noted that, in order to show the view clearly, some numerals which are the same as those used for the concave portion and convex portion in the first embodiment are omitted in FIG. 18.

The detailed optical data pertaining to the optical imaging lens 10 is shown in FIG. 20, and the effective focal length of the total system in the fourth embodiment is 4.271 mm, the HFOV thereof is 37.099°, the Fno thereof is 2.000, the system length thereof is 5.363 mm, and the image height is 3.33 mm.

FIG. 21 shows the aspheric coefficients used in the formula (1) of the object-side surface 31 of the first lens element 3 through the image-side surface 92 of the seventh lens element 9 in the fourth embodiment.

In addition, the relations among important parameters pertaining to the optical imaging lens 10 in the fourth embodiment are shown in FIGS. 50 and 51.

The longitudinal spherical aberration of the fourth embodiment shown in FIG. 19A is simulated in the condition that the pupil radius is 1.0650 mm. According to the longitudinal spherical aberration diagram of the fourth embodiment shown in FIG. 19A, a deviation of the imaging points of the off-axis rays of different heights is controlled within a range of ±0.032 mm. According to the two field curvature aberration diagrams of FIG. 19B and FIG. 19C, a focal length variation of the three representative wavelengths in the whole field of view falls within ±0.25 mm. According to the distortion aberration diagram of FIG. 19D, a distortion aberration of the fourth embodiment is maintained within the range of ±3%. Therefore, compared to the existing optical lens, the fourth embodiment may also achieve the good optical performance under a condition that the system length is reduced to about 5.363 mm.

According to the above description, compared to the first embodiment, the advantages of the fourth embodiment are as follows: the system length of the fourth embodiment is shorter than the system length of the first embodiment; the Fno of the fourth embodiment is smaller than that of the first embodiment, that is, the aperture stop of the fourth embodiment is greater than that of the first embodiment; a range of the longitudinal spherical aberration of the fourth embodiment is smaller than that of the first embodiment; the range of field curvature aberration regarding the sagittal direction in the fourth embodiment is smaller than the range of field curvature aberration regarding the sagittal direction in the first embodiment; and the range of field curvature aberration regarding the tangential direction in the fourth embodiment is smaller than the range of field curvature aberration regarding the tangential direction in the first embodiment. In addition, differences between thicknesses of the lens elements in the fourth embodiment in a vicinity of the optical axis and thicknesses of the lens elements in the fourth embodiment in a vicinity of a periphery of the lens elements of the fourth embodiment are smaller than those of the first embodiment. The optical imaging lens of the fourth embodiment is easier to be fabricated compared to that of the first embodiment, so that a production yield is relatively high.

FIG. 22 is a schematic view illustrating an optical imaging lens according to a fifth embodiment of the invention, FIGS. 23A to 23D are diagrams illustrating longitudinal spherical aberration and other aberrations of the optical imaging lens according to the fifth embodiment of the invention. Referring to FIG. 22 first, the fifth embodiment of the optical imaging lens 10 of the invention is similar to the first embodiment, and the difference lies in optical data, aspheric coefficients and the parameters of the lens elements 3, 4, 5, 6, 7, 8 and 9. In the fifth embodiment, the image-side surface 32 of the first lens element 3 has a concave portion 321 in a vicinity of the optical axis I and a convex portion 324 in a vicinity of a periphery of the first lens element 3. The object-side surface 71 of the fifth lens element 7 is a concave surface, and has a concave portion 713 in a vicinity of the optical axis I and a concave portion 712 in a vicinity of a periphery of the fifth lens element 7. The image-side surface 72 of the fourth lens element 7 is a convex surface, and has a convex portion 723 in a vicinity of the optical axis I and a convex portion 722 in a vicinity of a periphery of the fifth lens element 7. The object-side surface 91 of the seventh lens element 9 is a convex surface, and has a convex portion 913 in a vicinity of the optical axis I and a convex portion 912 in a vicinity of a periphery of the seventh lens element 9. It should be noted that, in order to show the view clearly, some numerals which are the same as those used for the concave portion and convex portion in the first embodiment are omitted in FIG. 22.

The detailed optical data pertaining to the optical imaging lens 10 is shown in FIG. 24, and the effective focal length of the total system in the fifth embodiment is 4.301 mm, the HFOV thereof is 37.688°, the Fno thereof is 2.001, the system length thereof is 5.387 mm, and the image height is 3.33 mm.

FIG. 25 shows the aspheric coefficients used in the formula (1) of the object-side surface 31 of the first lens element 3 through the image-side surface 92 of the seventh lens element 9 in the fifth embodiment.

In addition, the relations among important parameters pertaining to the optical imaging lens 10 in the fifth embodiment are shown in FIGS. 50 and 51.

Figures 23A, 23B, 23C, 23D:
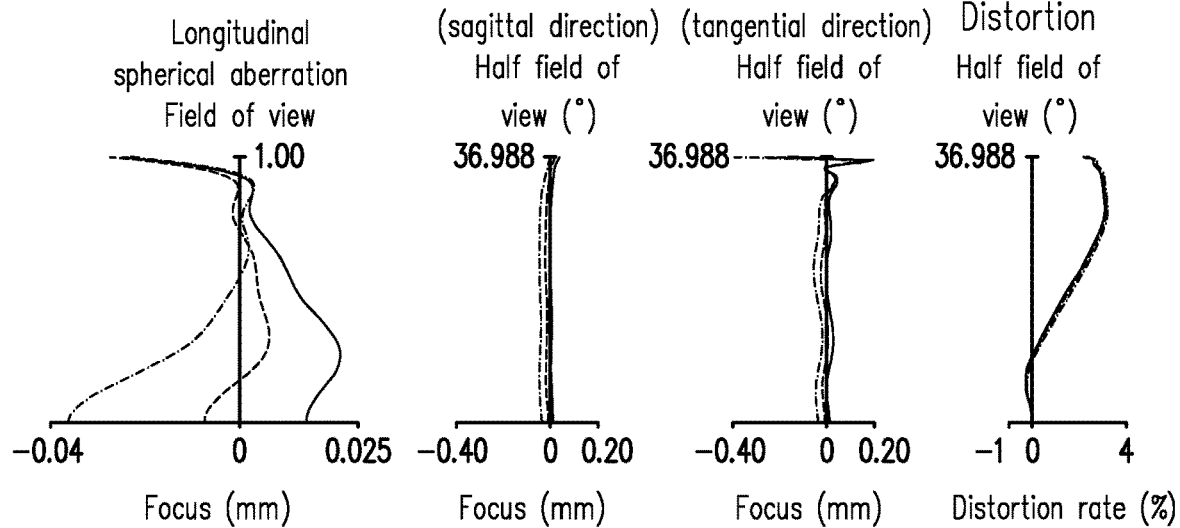
FIGS. 23A to 23D are diagrams illustrating longitudinal spherical aberration and other aberrations of the optical imaging lens according to the fifth embodiment of the invention.

The longitudinal spherical aberration of the fifth embodiment shown in FIG. 23A is simulated in the condition that the pupil radius is 1.0650 mm. According to the longitudinal spherical aberration diagram of the fifth embodiment shown in FIG. 23A, a deviation of the imaging points of the off-axis rays of different heights is controlled within a range of ±0.037 mm. According to the two field curvature aberration diagrams of FIG. 23B and FIG. 23C, a focal length variation of the three representative wavelengths in the whole field of view falls within ±0.40 mm. According to the distortion aberration diagram of FIG. 23D, a distortion aberration of the fifth embodiment is maintained within the range of ±3.5%. Therefore, compared to the existing optical lens, the fifth embodiment may also achieve the good optical performance under a condition that the system length is reduced to about 5.387 mm.

According to the above description, compared to the first embodiment, the advantages of the fifth embodiment are as follows: the system length of the fifth embodiment is shorter than the system length of the first embodiment; the HFOV of the fifth embodiment is greater than that of the first embodiment; and the range of field curvature aberration regarding the sagittal direction in the fifth embodiment is smaller than the range of field curvature aberration regarding the sagittal direction in the first embodiment. In addition, differences between thicknesses of the lens elements in the fifth embodiment in a vicinity of the optical axis and thicknesses of the lens elements in the fifth embodiment in a vicinity of a periphery of the lens elements of the fifth embodiment are smaller than those of the first embodiment. The optical imaging lens of the fifth embodiment is easier to be fabricated compared to that of the first embodiment, so that a production yield is relatively high.

FIG. 26 is a schematic view illustrating an optical imaging lens according to a sixth embodiment of the invention, FIGS. 27A to 27D are diagrams illustrating longitudinal spherical aberration and other aberrations of the optical imaging lens according to the sixth embodiment of the invention. Referring to FIG. 26 first, the sixth embodiment of the optical imaging lens 10 of the invention is similar to the first embodiment, and the difference lies in optical data, aspheric coefficients and the parameters of the lens elements 3, 4, 5, 6, 7, 8 and 9. In the sixth embodiment, the object-side surface 61 of the fourth lens element 6 is a convex surface, and has a convex portion 611 in a vicinity of the optical axis I and a convex portion 614 in a vicinity of a periphery of the fourth lens element 6; The object-side surface 71 of the fifth lens element 7 is a concave surface, and has a concave portion 713 in a vicinity of the optical axis I and a concave portion 712 in a vicinity of a periphery of the fifth lens element 7. The object-side surface 91 of the seventh lens element 9 is a convex surface, and has a convex portion 913 in a vicinity of the optical axis I and a convex portion 912 in a vicinity of a periphery of the seventh lens element 9. It should be noted that, in order to show the view clearly, some numerals which are the same as those used for the concave portion and convex portion in the first embodiment are omitted in FIG. 26.

The detailed optical data pertaining to the optical imaging lens 10 is shown in FIG. 28, and the effective focal length of the total system in the sixth embodiment is 4.271 mm, the HFOV thereof is 37.099°, the Fno thereof is 2.000, the system length thereof is 5.372 mm, and the image height is 3.33 mm.

FIG. 29 shows the aspheric coefficients used in the formula (1) of the object-side surface 31 of the first lens element 3 through the image-side surface 92 of the seventh lens element 9 in the sixth embodiment.

In addition, the relations among important parameters pertaining to the optical imaging lens 10 in the sixth embodiment are shown in FIGS. 50 and 51.

The longitudinal spherical aberration of the sixth embodiment shown in FIG. 27A is simulated in the condition that the pupil radius is 1.0650 mm. According to the longitudinal spherical aberration diagram of the sixth embodiment shown in FIG. 27A, a deviation of the imaging points of the off-axis rays of different heights is controlled within a range of ±0.034 mm. According to the two field curvature aberration diagrams of FIG. 27B and FIG. 27C, a focal length variation of the three representative wavelengths in the whole field of view falls within ±0.06 mm. According to the distortion aberration diagram of FIG. 27D, a distortion aberration of the sixth embodiment is maintained within the range of ±3.5%. Therefore, compared to the existing optical lens, the sixth embodiment may also achieve the good optical performance under a condition that the system length is reduced to about 5.372 mm.

According to the above description, compared to the first embodiment, the advantages of the sixth embodiment are as follows: the system length of the sixth embodiment is shorter than the system length of the first embodiment; the Fno of the sixth embodiment is smaller than that of the first embodiment, that is, the aperture stop of the sixth embodiment is greater than that of the first embodiment; the range of field curvature aberration regarding the sagittal direction in the sixth embodiment is smaller than the range of field curvature aberration regarding the sagittal direction in the first embodiment; and the range of field curvature aberration regarding the tangential direction in the sixth embodiment is smaller than the range of field curvature aberration regarding the tangential direction in the first embodiment. In addition, differences between thicknesses of the lens elements in the sixth embodiment in a vicinity of the optical axis and thicknesses of the lens elements in the sixth embodiment in a vicinity of a periphery of the lens elements of the sixth embodiment are smaller than those of the first embodiment. The optical imaging lens of the sixth embodiment is easier to be fabricated compared to that of the first embodiment, so that a production yield is relatively high.

FIG. 30 is a schematic view illustrating an optical imaging lens according to a seventh embodiment of the invention, FIGS. 31A to 31D are diagrams illustrating longitudinal spherical aberration and other aberrations of the optical imaging lens according to the seventh embodiment of the invention. Referring to FIG. 30 first, the seventh embodiment of the optical imaging lens 10 of the invention is similar to the first embodiment, and the difference lies in optical data, aspheric coefficients and the parameters of the lens elements 3, 4, 5, 6, 7, 8, and 9. In the seventh embodiment, the object-side surface 61 of the fourth lens element 6 is a convex surface, and has a convex portion 611 in a vicinity of the optical axis I and a convex portion 614 in a vicinity of a periphery of the fourth lens element 6. It should be noted that, in order to show the view clearly, some numerals which are the same as those used for the concave portion and convex portion in the first embodiment are omitted in FIG. 30.

The detailed optical data pertaining to the optical imaging lens 10 is shown in FIG. 32, and the effective focal length of the total system in the seventh embodiment is 4.259 mm, the HFOV thereof is 37.065°, the Fno thereof is 2.000, the system length thereof is 5.598 mm, and the image height is 3.325 mm.

FIG. 33 shows the aspheric coefficients used in the formula (1) of the object-side surface 31 of the first lens element 3 through the image-side surface 92 of the seventh lens element 9 in the seventh embodiment.

In addition, the relations among important parameters pertaining to the optical imaging lens 10 in the seventh embodiment are shown in FIGS. 52 and 53.

The longitudinal spherical aberration of the seventh embodiment shown in FIG. 31A is simulated in the condition that the pupil radius is 1.0650 mm. According to the longitudinal spherical aberration diagram of the seventh embodiment shown in FIG. 31A, a deviation of the imaging points of the off-axis rays of different heights is controlled within a range of ±0.038 mm. According to the two field curvature aberration diagrams of FIG. 31B and FIG. 31C, a focal length variation of the three representative wavelengths in the whole field of view falls within ±0.07 mm. According to the distortion aberration diagram of FIG. 31D, a distortion aberration of the seventh embodiment is maintained within the range of ±3.5%. Therefore, compared to the existing optical lens, the seventh embodiment may also achieve the good optical performance under a condition that the system length is reduced to about 5.598 mm.

According to the above description, compared to the first embodiment, the advantages of the seventh embodiment are as follows: the Fno of the seventh embodiment is smaller than that of the first embodiment, that is, the aperture stop of the seventh embodiment is greater than that of the first embodiment; and the range of field curvature aberration regarding the tangential direction in the seventh embodiment is smaller than the range of field curvature aberration regarding the tangential direction in the first embodiment. In addition, differences between thicknesses of the lens elements in the seventh embodiment in a vicinity of the optical axis and thicknesses of the lens elements in the seventh embodiment in a vicinity of a periphery of the lens elements of the seventh embodiment are smaller than those of the first embodiment. The optical imaging lens of the seventh embodiment is easier to be fabricated compared to that of the first embodiment, so that a production yield is relatively high.

FIG. 34 is a schematic view illustrating an optical imaging lens according to an eighth embodiment of the invention, FIGS. 35A to 35D are diagrams illustrating longitudinal spherical aberration and other aberrations of the optical imaging lens according to the eighth embodiment of the invention. Referring to FIG. 34 first, the eighth embodiment of the optical imaging lens 10 of the invention is similar to the first embodiment, and the difference lies in optical data, aspheric coefficients and the parameters of the lens elements 3, 4, 5, 6, 7, 8, and 9. In the eighth embodiment, the object-side surface 61 of the fourth lens element 6 is a convex surface, and has a convex portion 611 in a vicinity of the optical axis I and a convex portion 614 in a vicinity of a periphery of the fourth lens element 6. The object-side surface 91 of the seventh lens element 9 has a convex portion 913 in a vicinity of the optical axis I and a concave portion 914 in a vicinity of a periphery of the seventh lens element 9. It should be noted that, in order to show the view clearly, some numerals which are the same as those used for the concave portion and convex portion in the first embodiment are omitted in FIG. 34.

The detailed optical data pertaining to the optical imaging lens 10 is shown in FIG. 36, and the effective focal length of the total system in the eighth embodiment is 4.357 mm, the HFOV thereof is 37.081°, Fno thereof is 2.001, the system length thereof is 5.229 mm, and the image height is 3.33 mm.

FIG. 37 shows the aspheric coefficients used in the formula (1) of the object-side surface 31 of the first lens element 3 through the image-side surface 92 of the seventh lens element 9 in the eighth embodiment.

In addition, the relations among important parameters pertaining to the optical imaging lens 10 in the eighth embodiment are shown in FIGS. 52 and 53.

The longitudinal spherical aberration of the eighth embodiment shown in FIG. 35A is simulated in the condition that the pupil radius is 1.0650 mm. According to the longitudinal spherical aberration diagram of the eighth embodiment shown in FIG. 35A, a deviation of the imaging points of the off-axis rays of different heights is controlled within a range of ±0.07 mm. According to the two field curvature aberration diagrams of FIG. 35B and FIG. 35C, a focal length variation of the three representative wavelengths in the whole field of view falls within ±0.07 mm. According to the distortion aberration diagram of FIG. 35D, a distortion aberration of the eighth embodiment is maintained within the range of ±3.5%. Therefore, compared to the existing optical lens, the eighth embodiment may also achieve the good optical performance under a condition that the system length is reduced to about 5.229 mm.

According to the above description, compared to the first embodiment, the advantages of the eighth embodiment are as follows: the system length of the eighth embodiment is shorter than the system length of the first embodiment; and the range of field curvature aberration regarding the tangential direction in the eighth embodiment is smaller than the range of field curvature aberration regarding the tangential direction in the first embodiment. In addition, differences between thicknesses of the lens elements in the eighth embodiment in a vicinity of the optical axis and thicknesses of the lens elements in the eighth embodiment in a vicinity of a periphery of the lens elements of the eighth embodiment are smaller than those of the first embodiment. The optical imaging lens of the eighth embodiment is easier to be fabricated compared to that of the first embodiment, so that a production yield is relatively high.

Figure 38:
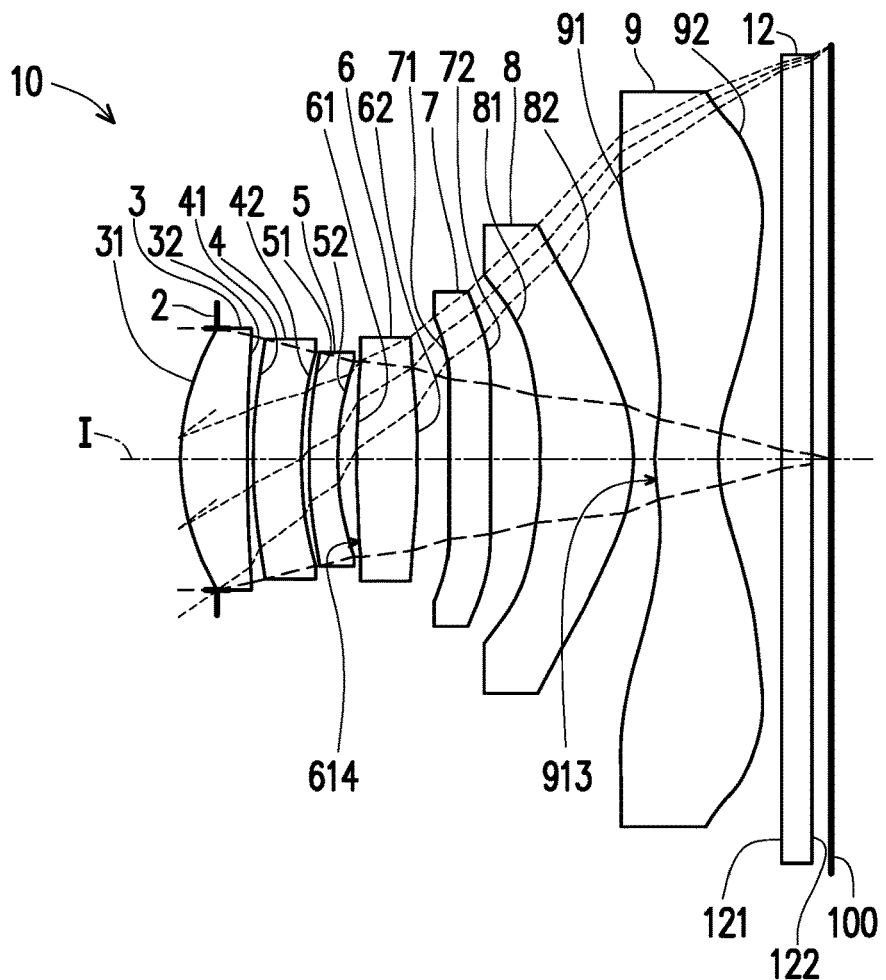
FIG. 38 is a schematic view illustrating an optical imaging lens according to a ninth embodiment of the invention.

FIG. 38 is a schematic view illustrating an optical imaging lens according to a ninth embodiment of the invention, FIGS. 39A to 39D are diagrams illustrating longitudinal spherical aberration and other aberrations of the optical imaging lens according to the ninth embodiment of the invention. Referring to FIG. 38 first, the ninth embodiment of the optical imaging lens 10 of the invention is similar to the first embodiment, and the difference lies in optical data, aspheric coefficients and the parameters of the lens elements 3, 4, 5, 6, 7, 8 and 9. In the ninth embodiment, the fifth lens element 7 has positive refracting power. The object-side surface 61 of the fourth lens element 6 is a convex surface, and has a convex portion 611 in a vicinity of the optical axis I and a convex portion 614 in a vicinity of a periphery of the fourth lens element 6. The object-side surface 91 of the seventh lens element 9 is a convex surface, and has a convex portion 913 in a vicinity of the optical axis I and a convex portion 912 in a vicinity of a periphery of the seventh lens element 9. It should be noted that, in order to show the view clearly, some numerals which are the same as those used for the concave portion and convex portion in the first embodiment are omitted in FIG. 38.

The detailed optical data pertaining to the optical imaging lens 10 is shown in FIG. 40, and the effective focal length of the total system in the ninth embodiment is 4.143 mm, the HFOV thereof is 37.099°, Fno thereof is 1.937, the system length thereof is 5.240 mm, and the image height is 3.33 mm.

FIG. 41 shows the aspheric coefficients used in the formula (1) of the object-side surface 31 of the first lens element 3 through the image-side surface 92 of the seventh lens element 9 in the ninth embodiment.

In addition, the relations among important parameters pertaining to the optical imaging lens 10 in the ninth embodiment are shown in FIGS. 52 and 53.

Figure 39A:
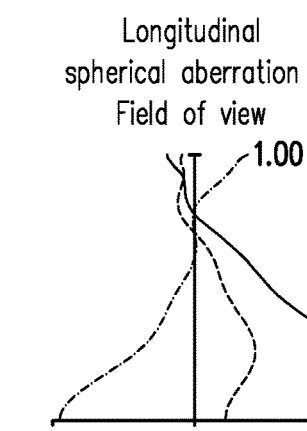
FIGS. 39A to 39D are diagrams illustrating longitudinal spherical aberration and other aberrations of the optical imaging lens according to the ninth embodiment of the invention.
Figure 39B:
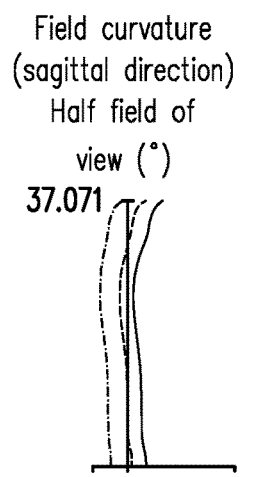
Figure 39C:
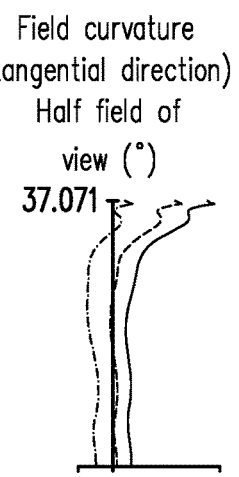
Figure 39D:
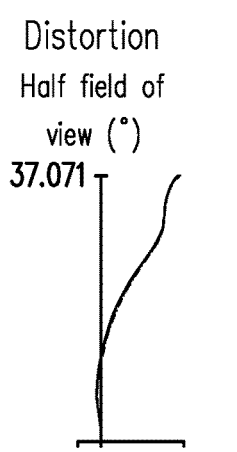

The longitudinal spherical aberration of the ninth embodiment shown in FIG. 39A is simulated in the condition that the pupil radius is 1.0650 mm. According to the longitudinal spherical aberration diagram of the ninth embodiment shown in FIG. 39A, a deviation of the imaging points of the off-axis rays of different heights is controlled within a range of ±0.034 mm. According to the two field curvature aberration diagrams of FIG. 39B and FIG. 39C, a focal length variation of the three representative wavelengths in the whole field of view falls within ±0.18 mm. According to the distortion aberration diagram of FIG. 39D, a distortion aberration of the ninth embodiment is maintained within the range of ±7%. Therefore, compared to the existing optical lens, the ninth embodiment may also achieve the good optical performance under a condition that the system length is reduced to about 5.240 mm.

According to the above description, compared to the first embodiment, the advantages of the ninth embodiment are as follows: the system length of the ninth embodiment is shorter than the system length of the first embodiment; the Fno of the ninth embodiment is smaller than that of the first embodiment, that is, the aperture stop of the ninth embodiment is greater than that of the first embodiment; and the range of field curvature aberration regarding the tangential direction in the ninth embodiment is smaller than the range of field curvature aberration regarding the tangential direction in the first embodiment. In addition, differences between thicknesses of the lens elements in the ninth embodiment in a vicinity of the optical axis and thicknesses of the lens elements in the ninth embodiment in a vicinity of a periphery of the lens elements of the ninth embodiment are smaller than those of the first embodiment. The optical imaging lens of the ninth embodiment is easier to be fabricated compared to that of the first embodiment, so that a production yield is relatively high.

FIG. 42 is a schematic view illustrating an optical imaging lens according to a tenth embodiment of the invention, FIGS. 43A to 43D are diagrams illustrating longitudinal spherical aberration and other aberrations of the optical imaging lens according to the tenth embodiment of the invention. Referring to FIG. 42 first, the tenth embodiment of the optical imaging lens 10 of the invention is similar to the first embodiment, and the difference lies in optical data, aspheric coefficients and the parameters of the lens elements 3, 4, 5, 6, 7, 8 and 9. In the tenth embodiment, the object-side surface 61 of the fourth lens element 6 is a convex surface, and has a convex portion 611 in a vicinity of the optical axis I and a convex portion 614 in a vicinity of a periphery of the fourth lens element 6. The object-side surface 71 of the fifth lens element 7 is a concave surface, and has a concave portion 713 in a vicinity of the optical axis I and a concave portion 712 in a vicinity of a periphery of the fifth lens element 7. The image-side surface 72 of the fourth lens element 7 is a convex surface, and has a convex portion 723 in a vicinity of the optical axis I and a convex portion 722 in a vicinity of a periphery of the fifth lens element 7. The object-side surface 91 of the seventh lens element 9 is a convex surface, and has a convex portion 913 in a vicinity of the optical axis I and a convex portion 912 in a vicinity of a periphery of the seventh lens element 9. It should be noted that, in order to show the view clearly, some numerals which are the same as those used for the concave portion and convex portion in the first embodiment are omitted in FIG. 42.

The detailed optical data pertaining to the optical imaging lens 10 is shown in FIG. 44, and the effective focal length of the total system in the tenth embodiment is 4.302 mm, the HFOV thereof is 37.259°, the Fno thereof is 2.000, the system length thereof is 5.270 mm, and the image height is 3.33 mm.

FIG. 45 shows the aspheric coefficients used in the formula (1) of the object-side surface 31 of the first lens element 3 through the image-side surface 92 of the seventh lens element 9 in the tenth embodiment.

In addition, the relations among important parameters pertaining to the optical imaging lens 10 in the tenth embodiment are shown in FIGS. 52 and 53.

The longitudinal spherical aberration of the tenth embodiment shown in FIG. 43A is simulated in the condition that the pupil radius is 1.0650 mm. According to the longitudinal spherical aberration diagram of the tenth embodiment shown in FIG. 43A, a deviation of the imaging points of the off-axis rays of different heights is controlled within a range of ±0.038 mm. According to the two field curvature aberration diagrams of FIG. 43B and FIG. 43C, a focal length variation of the three representative wavelengths in the whole field of view falls within ±0.12 mm. According to the distortion aberration diagram of FIG. 43D, a distortion aberration of the tenth embodiment is maintained within the range of ±4%. Therefore, compared to the existing optical lens, the tenth embodiment may also achieve the good optical performance under a condition that the system length is reduced to about 5.270 mm.

According to the above description, compared to the first embodiment, the advantages of the tenth embodiment are as follows: the system length of the tenth embodiment is shorter than the system length of the first embodiment; the Fno of the tenth embodiment is smaller than that of the first embodiment, that is, the aperture stop of the tenth embodiment is greater than that of the first embodiment; the range of field curvature aberration regarding the sagittal direction in the tenth embodiment is smaller than the range of field curvature aberration regarding the sagittal direction in the first embodiment; and the range of field curvature aberration regarding the tangential direction in the tenth embodiment is smaller than the range of field curvature aberration regarding the tangential direction in the first embodiment. In addition, differences between thicknesses of the lens elements in the tenth embodiment in a vicinity of the optical axis and thicknesses of the lens elements in the tenth embodiment in a vicinity of a periphery of the lens elements of the tenth embodiment are smaller than those of the first embodiment. The optical imaging lens of the tenth embodiment is easier to be fabricated compared to that of the first embodiment, so that a production yield is relatively high.

FIG. 46 is a schematic view illustrating an optical imaging lens according to an eleventh embodiment of the invention, FIGS. 47A to 47D are diagrams illustrating longitudinal spherical aberration and other aberrations of the optical imaging lens according to the eleventh embodiment of the invention. Referring to FIG. 46 first, the eleventh embodiment of the optical imaging lens 10 of the invention is similar to the first embodiment, and the difference lies in optical data, aspheric coefficients and the parameters of the lens elements 3, 4, 5, 6, 7, 8 and 9. In the eleventh embodiment, the object-side surface 91 of the seventh lens element 9 is a convex surface, and has a convex portion 913 in a vicinity of the optical axis I and a convex portion 912 in a vicinity of a periphery of the seventh lens element 9. It should be noted that, in order to show the view clearly, some numerals which are the same as those used for the concave portion and convex portion in the first embodiment are omitted in FIG. 46.

The detailed optical data pertaining to the optical imaging lens 10 is shown in FIG. 48, and the effective focal length of the total system in the eleventh embodiment is 4.262 mm, the HFOV thereof is 37.102°, the Fno thereof is 2.000, the system length thereof is 5.413 mm, and the image height is 3.33 mm.

FIG. 49 shows the aspheric coefficients used in the formula (1) of the object-side surface 31 of the first lens element 3 through the image-side surface 92 of the seventh lens element 9 in the eleventh embodiment.

In addition, the relations among important parameters pertaining to the optical imaging lens 10 in the eleventh embodiment are shown in FIGS. 52 and 53.

The longitudinal spherical aberration of the eleventh embodiment shown in FIG. 47A is simulated in the condition that the pupil radius is 1.0650 mm. According to the longitudinal spherical aberration diagram of the eleventh embodiment shown in FIG. 47A, a deviation of the imaging points of the off-axis rays of different heights is controlled within a range of ±0.055 mm. According to the two field curvature aberration diagrams of FIG. 47B and FIG. 47C, a focal length variation of the three representative wavelengths in the whole field of view falls within ±0.10 mm. According to the distortion aberration diagram of FIG. 47D, a distortion aberration of the eleventh embodiment is maintained within the range of ±4%. Therefore, compared to the existing optical lens, the eleventh embodiment may also achieve the good optical performance under a condition that the system length is reduced to about 5.413 mm.

According to the above description, compared to the first embodiment, the advantages of the eleventh embodiment are as follows: the Fno of the eleventh embodiment is smaller than that of the first embodiment, that is, the aperture stop of the eleventh embodiment is greater than that of the first embodiment; and the range of field curvature aberration regarding the tangential direction in the eleventh embodiment is smaller than the range of field curvature aberration regarding the tangential direction in the first embodiment. In addition, differences between thicknesses of the lens elements in the eleventh embodiment in a vicinity of the optical axis and thicknesses of the lens elements in the eleventh embodiment in a vicinity of a periphery of the lens elements of the eleventh embodiment are smaller than those of the first embodiment. The optical imaging lens of the eleventh embodiment is easier to be fabricated compared to that of the first embodiment, so that a production yield is relatively high.

Referring to FIG. 50 to FIG. 53, FIGS. 50 and 51 are table diagrams of optical parameters of each of the above-mentioned first through the sixth embodiments, and FIGS. 52 and 53 are table diagrams of optical parameters of each of the above-mentioned seventh through the eleventh embodiments of the invention. The first lens element 3 of the optical imaging lens 10 of the embodiments of the present invention has positive refracting power, so as to facilitate ray convergence. The image-side surface 32 of the first lens element 3 has a concave portion 321 in a vicinity of the optical axis I, and the object-side surface 41 of the second lens element 4 has a convex portion 412 in a vicinity of a periphery of the second lens element 4, so as to facilitate cooperation between the first lens element 3 and the second lens element 4 to adjust the longitudinal spherical aberration. Or, in some embodiments, the image-side surface 32 of the first lens element 3 has a concave portion 322 in a vicinity of a periphery of the first lens element 3, which also facilitates cooperation between the first lens element 3 and the second lens element 4 to adjust the longitudinal spherical aberration. In addition, the third lens element 5 has negative refracting power, and the image-side surface 52 of the third lens element 5 has a concave portion 522 in a vicinity of a periphery of the third lens element 5, so as to facilitate correction of aberrations generated by the first lens element 3 and the second lens element 4. At least one of the object-side surface 61 and the image-side surface 62 of the fourth lens element 6 is an aspheric surface, and at least one of the object-side surface 71 and the image-side surface 72 of the fifth lens element 7 is an aspheric surface, so as to facilitate fine adjustment of the entire optical imaging lens 10. In addition, the sixth lens element 8 has positive refracting power, so as to facilitate shortening of the effective focal length of the total system of the optical imaging lens 10, thereby shortening the system length of the optical imaging lens 10. The image-side surface 92 of the seventh lens element 9 has a concave portion 921 in a vicinity of the optical axis I, so as to facilitate correction of the aberration generated by the sixth lens element 8 that has positive refracting power.

When the optical imaging lens 10 of the embodiments of the invention satisfies the following conditional expression, a lens element of a material with an Abbe number falling within a range of 18 to 35 (the second lens element 4) can be selected to correct a chromatic aberration generated by the first lens element 3:

$V2 \leq 35.00$.

In addition, when the optical imaging lens 10 of the embodiments of the invention satisfies the following conditional expression, a lens element of a material with an Abbe number falling within a range of 18 to 35 (the third lens element 5) can be selected to correct a chromatic aberration generated by the first lens element 3 and adjust a chromatic aberration of the entire optical imaging lens 10:

$V3 \leq 35.00$.

When the relation of the optical parameters of the optical imaging lens 10 in the embodiments of the invention satisfies at least one of following conditional expressions, it assists a designer to design a technically feasible optical imaging lens having good optical performance and having a total length that is effectively reduced.

1. Under the circumstance that the value limitations in any one of the following conditional expressions are satisfied, the effective focal length and various optical parameters of the lens keep a suitable value, so as to prevent any of the parameters being too large so that the correction of an overall aberration of the optical imaging lens 10 is difficult or to prevent any of the parameters being too small so that assembly is adversely affected or the difficulty in production is increased:

$EFL/(T1+T4+G34) \leq 3.71$, preferably $2.17 \leq EFL/(T1+T4+G34) \leq 3.71$; and $EFL/(T1+T4+G56) \leq 3.51$, preferably $2.03 \leq EFL/(T1+T4+G56) \leq 3.51$.

2. In order to shorten the length of the lens system and maintain image quality of the optical imaging lens, the thicknesses of the lens elements and the air gaps among the lens elements in the embodiments of the invention are suitably shortened, though considering a difficulty level of an assembling process of the lens elements and under the premise that the imaging quality has to be ensured, the thicknesses of the lens elements and the air gaps among the lens elements have to be suitably adjusted, so as to keep the thickness of and the space for each lens at a suitable value to prevent any of the parameters being too large so that the miniaturization of the entire optical imaging lens 10 is difficult or to prevent any of the parameters being too small so that assembly is adversely affected or the difficulty in production is increased. Therefore, under the circumstance that the value limitations in any one of the following conditional expressions are satisfied, the optical imaging system may achieve better configuration:

$TTL/(G34+BFL) \leq 5.00$, preferably $3.00 \leq TTL/(G34+BFL) \leq 5.00$;

$TL/(T4+G34) \leq 7.50$, preferably $3.11 \leq TL/(T4+G34) \leq 7.50$;

$AAG/(G34+G45) \leq 2.71$, preferably $1.40 \leq AAG/(G34+G45) \leq 2.71$;

$ALT/(T1+G34) \leq 4.54$, preferably $2.40 \leq ALT/(T1+G34) \leq 4.54$;

$(T2+G23+T3)/G34 \leq 4.40$, preferably $0.88 \leq (T2+G23+T3)/G34 \leq 4.40$;

$(T5+T6+G67)/T1 \leq 2.70$, preferably $1.37 \leq (T5+T6+G67)/T1 \leq 2.70$;

$(T6+G67+T7)/(T1+T4) \leq 1.65$, preferably $0.70 \leq (T6+G67+T7)/(T1+T4) \leq 1.65$;

$TTL/(G56+BFL) \leq 4.80$, preferably $2.62 \leq TTL/(G56+BFL) \leq 4.80$;

$TL/(T4+G56) \leq 8.00$, preferably $2.84 \leq TL/(T4+G56) \leq 8.00$;

$AAG/(G45+G56) \leq 2.30$, preferably $1.00 \leq AAG/(G45+G56) \leq 2.30$;

$ALT/(T1+G56) \leq 4.26$, preferably $2.30 \leq ALT/(T1+G56) \leq 4.26$;

$(T2+G23+T3)/G56 \leq 3.20$, preferably $0.83 \leq (T2+G23+T3)/G56 \leq 3.20$;

$(T5+T6+G67)/T4 \leq 3.17$, preferably $0.80 \leq (T5+T6+G67)/T4 \leq 3.17$; and $(T6+G67+T7)/(G34+G56) \leq 4.00$, preferably $1.10 \leq (T6+G67+T7)/(G34+G56) \leq 4.00$.

However, due to the unpredictability in the design of an optical system, with the framework of the embodiments of the invention, under the circumstances where the above-described conditions are satisfied, the lens according to the embodiments of the invention with shorter length, bigger aperture availability, increased field of angle, improved image quality or better yield rate can be preferably achieved so as to improve the shortcoming of prior art.

In addition, the aforementioned limitation relations are provided in an exemplary sense and can be randomly and selectively combined and applied to the embodiments of the invention in different manners; the invention should not be limited to the above examples. In implementation of the invention, apart from the above-described relations, it is also possible to add additional detailed structure such as more concave and convex curvatures arrangement of a specific lens element or a plurality of lens elements so as to enhance control of system property and/or resolution. For example, it is optional to form an additional convex portion in the vicinity of the optical axis on the object-side surface of the first lens. It should be noted that the above-described details can be optionally combined and applied to the other embodiments of the invention under the condition where they are not in conflict with one another.

Based on the above, the optical imaging lens 10 in the embodiment of the invention may achieve the following effects and advantages.

1. The longitudinal spherical aberrations, astigmatism aberrations and distortion aberrations of each of the embodiments of the invention are all complied with usage specifications. Moreover, the off-axis rays of different heights of the three representative wavelengths 650 nm, 555 nm and 470 nm are all gathered around imaging points, and according to a deviation range of each curve, it can be seen that deviations of the imaging points of the off-axis rays of different heights are all controlled to achieve a good capability to suppress spherical aberration, astigmatism aberration and distortion aberration. Further referring to the imaging quality data, distances among the three representative wavelengths 650 nm, 555 nm and 470 nm are fairly close, which represents that the optical imaging lens of the embodiments of the invention has a good concentration of rays with different wavelengths and under different states, and have an excellent capability to suppress dispersion, so it is learned that the optical imaging lens of the embodiments of the invention has good optical performance.

2. The first lens element 3 of the optical imaging lens 10 of the embodiments of the invention has positive refracting power, which can facilitate ray convergence. The image-side surface 32 of the first lens element 3 has a concave portion 321 in a vicinity of the optical axis I, and the object-side surface 41 of the second lens element 4 has a convex portion 412 in a vicinity of a periphery of the second lens element 4, so as to facilitate cooperation between the first lens element 3 and the second lens element 4 to adjust the longitudinal spherical aberration. Or, in some embodiments, the image-side surface 32 of the first lens element 3 has a concave portion 322 in a vicinity of a periphery of the first lens element 3, which also facilitates cooperation between the first lens element 3 and the second lens element 4 to adjust the longitudinal spherical aberration. In addition, the third lens element 5 has negative refracting power, and the image-side surface 52 of the third lens element 5 has a concave portion 522 in a vicinity of a periphery of the third lens element 5, so as to facilitate correction of aberrations generated by the first lens element 3 and the second lens element 4. At least one of the object-side surface 61 and the image-side surface 62 of the fourth lens element 6 is an aspheric surface, and at least one of the object-side surface 71 and the image-side surface 72 of the fifth lens element 7 is an aspheric surface, so as to facilitate fine adjustment of the entire optical imaging lens 10. In addition, the sixth lens element 8 has positive refracting power, so as to facilitate shortening of the effective focal length of the total system of the optical imaging lens 10, thereby shortening the system length of the optical imaging lens 10. The image-side surface 92 of the seventh lens element 9 has a concave portion 921 in a vicinity of the optical axis I, so as to facilitate correction of the aberration generated by the sixth lens element 8 that has positive refracting power. Therefore, the optical imaging lens 10 has an excellent field of view and a large aperture stop while the length of lens system is shortened, and the optical imaging lens 10 has good optical performance and provides good image quality.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical imaging lens, comprising a first lens element, a second lens element, a third lens element, a fourth lens element, a fifth lens element, a sixth lens element, and a seventh lens element arranged in sequence from an object side to an image side along an optical axis, each of the first lens element to the seventh lens element comprising an object-side surface facing the object side and allowing imaging rays to pass through and an image-side surface facing the image side and allowing the imaging rays to pass through, wherein the object-side surface of the second lens element has a convex portion in a vicinity of the optical axis;

the third lens element has negative refracting power, and the object-side surface of the third lens element has a convex portion in a vicinity of the optical axis;

the image-side surface of the fourth lens element has a convex portion in a vicinity of the optical axis;

the fifth lens element has negative refracting power;

the seventh lens element has negative refracting power, and the object-side surface of the seventh lens element has a convex portion in a vicinity of the optical axis;

wherein lens elements having refracting power of the optical imaging lens are only the seven lens elements described above; and wherein an Abbe number of the first lens element is greater than a sum of an Abbe number of the second lens element and an Abbe number of the fifth lens element, and the optical imaging lens satisfies V3≤35.00, wherein V3 is an Abbe number of the third lens element.

2. The optical imaging lens according to claim 1, wherein the optical imaging lens satisfies:

$$(T5+T6+G67)/T1 \leq 2.70,$$

T1 is a thickness of the first lens element along the optical axis, T5 is a thickness of the fifth lens element along the optical axis, T6 is a thickness of the sixth lens element along the optical axis, and G67 is an air gap from the sixth lens element to the seventh lens element along the optical axis.

3. The optical imaging lens according to claim 1, wherein the optical imaging lens satisfies:

$$TTL/(G56+BFL) \leq 4.80,$$

TTL is a distance from the object-side surface of the first lens element to an image plane along the optical axis, G56 is an air gap from the fifth lens element to the sixth lens element along the optical axis, and BFL is a distance from the image-side surface of the seventh lens element to the image plane of the optical imaging lens along the optical axis.

4. The optical imaging lens according to claim 1, wherein the optical imaging lens satisfies:

$$AAG/(G45+G56) \leq 2.30,$$

AAG is a sum of six air gaps from the first lens element to the seventh lens element along the optical axis, G45 is an air gap from the fourth lens element to the fifth lens element along the optical axis, and G56 is an air gap from the fifth lens element to the sixth lens element along the optical axis.

5. The optical imaging lens according to claim 1, wherein the optical imaging lens satisfies:

$$ALT/(T1+G56) \leq 4.26,$$

ALT is a sum of thicknesses of the first lens element, the second lens element, the third lens element, the fourth lens element, the fifth lens element, the sixth lens element, and the seventh lens element along the optical axis, T1 is a thickness of the first lens element along the optical axis, and G56 is an air gap from the fifth lens element to the sixth lens element along the optical axis.

6. The optical imaging lens according to claim 1, wherein the optical imaging lens satisfies:

$$EFL/(T1+T4+G56) \leq 3.51,$$

EFL is an effective focal length of the optical imaging lens, T1 is a thickness of the first lens element along the optical axis, T4 is a thickness of the fourth lens element along the optical axis, and G56 is an air gap from the fifth lens element to the sixth lens element along the optical axis.

7. The optical imaging lens according to claim 1, wherein the optical imaging lens satisfies:

$$(T2+G23+T3)/G56 \leq 3.20,$$

T2 is a thickness of the second lens element along the optical axis, T3 is a thickness of the third lens element along the optical axis, G23 is an air gap from the second lens element to the third lens element along the optical axis I, and G56 is an air gap from the fifth lens element to the sixth lens element along the optical axis.

8. An optical imaging lens, comprising a first lens element, a second lens element, a third lens element, a fourth lens element, a fifth lens element, a sixth lens element, and a seventh lens element arranged in sequence from an object side to an image side along an optical axis, each of the first lens element to the seventh lens element comprising an object-side surface facing the object side and allowing imaging rays to pass through and an image-side surface facing the image side and allowing the imaging rays to pass through, wherein
the third lens element has negative refracting power;
the image-side surface of the fourth lens element has a convex portion in a vicinity of the optical axis;
the sixth lens element has positive refracting power, and
the object-side surface of the seventh lens element has a convex portion in a vicinity of a periphery of the seventh lens element;
wherein lens elements having refracting power of the optical imaging lens are only the seven lens elements described above; and wherein
an Abbe number of the first lens element is greater than a sum of an Abbe number of the second lens element and an Abbe number of the fifth lens element.

9. The optical imaging lens according to claim 8, wherein the optical imaging lens satisfies:

$$(T6+G67+T7)/(T1+T4) \leq 1.65,$$

T1 is a thickness of the first lens element along the optical axis, T4 is a thickness of the fourth lens element along the optical axis, T6 is a thickness of the sixth lens element along the optical axis, T7 is a thickness of the seventh lens element along the optical axis, and G67 an air gap from the sixth lens element to the seventh lens element along the optical axis.

10. The optical imaging lens according to claim 8, wherein the optical imaging lens satisfies:

$$V3 \leq 35.00,$$

V3 is an Abbe number of the third lens element.

11. The optical imaging lens according to claim 8, wherein the optical imaging lens satisfies:

$$TTL/(G34+BFL) \leq 5.00,$$

TTL is a distance from the object-side surface of the first lens element to an image plane along the optical axis, G34 is an air gap from the third lens element to the fourth lens element along the optical axis, and BFL is a distance from the image-side surface of the seventh lens element to the image plane of the optical imaging lens along the optical axis.

12. The optical imaging lens according to claim 8, wherein the optical imaging lens satisfies:

$$TL/(T4+G34) \leq 7.50,$$

TL is a distance from the object-side surface of the first lens element to the image-side surface of the seventh lens element along the optical axis, T4 is a thickness of the fourth lens element along the optical axis, and G34 is an air gap from the third lens element to the fourth lens element along the optical axis.

13. The optical imaging lens according to claim 8, wherein the optical imaging lens satisfies:

$$AAG/(G34+G45) \leq 2.71,$$

AAG is a sum of six air gaps from the first lens element to the seventh lens element along the optical axis, G34 is an air gap from the third lens element to the fourth lens element along the optical axis, and G45 is an air gap from the fourth lens element to the fifth lens element along the optical axis.

14. The optical imaging lens according to claim 8, wherein the optical imaging lens satisfies:

$$ALT/(T1+G34) \leq 4.54,$$

ALT is a sum of thicknesses of the first lens element, the second lens element, the third lens element, the fourth lens element, the fifth lens element, the sixth lens element, and the seventh lens element along the optical axis, T1 is a thickness of the first lens element along the optical axis, and G34 is an air gap from the third lens element to the fourth lens element along the optical axis.

15. An optical imaging lens, comprising a first lens element, a second lens element, a third lens element, a fourth lens element, a fifth lens element, a sixth lens element, and a seventh lens element arranged in sequence from an object side to an image side along an optical axis, each of the first lens element to the seventh lens element comprising an object-side surface facing the object side and allowing imaging rays to pass through and an image-side surface facing the image side and allowing the imaging rays to pass through, wherein the image-side surface of the first lens element has a concave portion in a vicinity of the optical axis;

the third lens element has negative refracting power;

the sixth lens element has positive refracting power; and the object-side surface of the seventh lens element has a convex portion in a vicinity of a periphery of the seventh lens element;

wherein lens elements having refracting power of the optical imaging lens are only the seven lens elements described above; and wherein an Abbe number of the first lens element is greater than a sum of an Abbe number of the second lens element and an Abbe number of the fifth lens element.

16. The optical imaging lens according to claim 15, wherein the optical imaging lens satisfies:

$EFL/(T1+T4+G34) \leq 3.71$,

EFL is an effective focal length of the optical imaging lens, T1 is a thickness of the first lens element along the optical axis, T4 is a thickness of the fourth lens element along the optical axis, and G34 is an air gap from the third lens element to the fourth lens element along the optical axis.

17. The optical imaging lens according to claim 15, wherein the optical imaging lens satisfies:

$(T5+T6+G67)/T1 \leq 2.70$,

T1 is a thickness of the first lens element along the optical axis, T5 is a thickness of the fifth lens element along the optical axis, T6 is a thickness of the sixth lens element along the optical axis, and G67 an air gap from the sixth lens element to the seventh lens element along the optical axis.

18. The optical imaging lens according to claim 15, wherein the optical imaging lens satisfies:

$TL/(T4+G56) \leq 8.00$

TL is a distance from the object-side surface of the first lens element to the image-side surface of the seventh lens element along the optical axis, T4 is a thickness of the fourth lens element along the optical axis, and G56 is an air gap from the fifth lens element to the sixth lens element along the optical axis.

19. The optical imaging lens according to claim 15, wherein the optical imaging lens satisfies:

$EFL/(T1+T4+G56) \leq 3.51$

EFL is an effective focal length of the optical imaging lens, T1 is a thickness of the first lens element along the optical axis, T4 is a thickness of the fourth lens element along the optical axis, and G56 is an air gap from the fifth lens element to the sixth lens element along the optical axis.

20. The optical imaging lens according to claim 15, wherein the optical imaging lens satisfies:

$(T5+T6+G67)/T4 \leq 3.17$,

T4 is a thickness of the fourth lens element along the optical axis, T5 is a thickness of the fifth lens element along the optical axis, T6 is a thickness of the sixth lens element along the optical axis, and G67 an air gap from the sixth lens element to the seventh lens element along the optical axis.

* * * * *

UNITED STATES PATENT AND TRADEMARK OFFICE
CERTIFICATE OF CORRECTION

| | |
|---|---|
| PATENT NO. | : 11,054,616 B2 |
| APPLICATION NO. | : 16/432938 |
| DATED | : July 6, 2021 |
| INVENTOR(S) | : Jinhui Gong et al. |

It is certified that error appears in the above-identified patent and that said Letters Patent is hereby corrected as shown below:

On the Title Page

Item (63) Related U.S. Application Data should read:
Continuation of application No. 15/441,259, filed on Feb. 24, 2017, now Pat. No. 10,365,457.

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*